United States Patent
Campbell et al.

(10) Patent No.: US 10,642,930 B2
(45) Date of Patent: May 5, 2020

(54) NOTIFICATIONS FOR RICH DATA TYPES

(71) Applicant: Microsoft Technology Licensing, LLC, Redmond, WA (US)

(72) Inventors: John Campbell, Woodinville, WA (US); Carlos Augusto Otero, Seattle, WA (US); Benjamin Edward Rampson, Woodinville, WA (US); Allison Rutherford, Seattle, WA (US); Christian Canton, Bellevue, WA (US); Andrew Becker, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/340,422

(22) Filed: Nov. 1, 2016

(65) Prior Publication Data
US 2017/0124054 A1     May 4, 2017

(51) Int. Cl.
*G06F 17/24*     (2006.01)
*G06F 3/0484*    (2013.01)
(Continued)

(52) U.S. Cl.
CPC .......... *G06F 17/246* (2013.01); *G06F 3/0482* (2013.01); *G06F 3/04817* (2013.01); *G06F 3/04842* (2013.01); *G06F 3/04845* (2013.01); *G06F 3/04847* (2013.01); *G06F 3/04883* (2013.01); *G06F 3/162* (2013.01); *G06F 3/165* (2013.01); *G06F 17/212* (2013.01); *G06F 17/2288* (2013.01); *G06F 17/245* (2013.01); *G06K 9/00* (2013.01); *G06K 9/00442* (2013.01); *G06K 9/00449* (2013.01);
(Continued)

(58) Field of Classification Search
CPC .................................................... G06F 17/246
See application file for complete search history.

(56) References Cited

U.S. PATENT DOCUMENTS

| | | |
|---|---|---|
| 5,255,356 A | 10/1993 | Michelman et al. |
| 5,317,686 A | 5/1994 | Salas et al. |

(Continued)

FOREIGN PATENT DOCUMENTS

| | | |
|---|---|---|
| WO | 157744 | 8/2001 |
| WO | 2015065864 | 5/2015 |

OTHER PUBLICATIONS

Robin Abraham & Martin Erwig, How to communicate unit error messages in spreadsheets, 30 ACM SIGSOFT Software Engineering Notes, 1-5 (2005).*

(Continued)

*Primary Examiner* — Asher D Kells

(57) ABSTRACT

The present disclosure is directed to systems and methods for implementing notifications for rich data types in a spreadsheet application. Generally, a value being of a rich data type is as a type of value that has context and established relationships with other types of data. In particular, a rich data type is a data value having associated context, which may be units (e.g., inches, miles, meters, kilograms, seconds, joules, hertz, Fahrenheit, etc.) or other information about the data's type (e.g., city, stock, NCAA football team, car, restaurant, school, etc.). Additionally, a value being of a rich data type further includes established relationships with other types of data.

21 Claims, 30 Drawing Sheets

(51) Int. Cl.
| | |
|---|---|
| *G06T 11/60* | (2006.01) |
| *G06F 3/0482* | (2013.01) |
| *G06F 3/0488* | (2013.01) |
| *G06F 3/16* | (2006.01) |
| *G06F 3/0481* | (2013.01) |
| *G06T 11/20* | (2006.01) |
| *G10L 15/26* | (2006.01) |
| *G06K 9/00* | (2006.01) |
| *G10L 13/033* | (2013.01) |
| *G06F 17/21* | (2006.01) |
| *G06F 17/22* | (2006.01) |
| *G11B 27/00* | (2006.01) |
| *G06T 1/00* | (2006.01) |

(52) U.S. Cl.
CPC ........ *G06K 9/00463* (2013.01); *G06T 11/206* (2013.01); *G06T 11/60* (2013.01); *G10L 13/033* (2013.01); *G10L 15/26* (2013.01); *G11B 27/00* (2013.01); *G06T 1/0007* (2013.01); *G06T 2200/24* (2013.01)

(56) References Cited

U.S. PATENT DOCUMENTS

| | | | |
|---|---|---|---|
| 5,510,980 A * | 4/1996 | Peters | G06F 17/246 |
| | | | 705/32 |
| 5,548,703 A | 8/1996 | Berry et al. | |
| 5,890,174 A * | 3/1999 | Khanna | G06F 17/246 |
| | | | 715/209 |
| 5,933,638 A | 8/1999 | Cencik | |
| 5,983,268 A | 11/1999 | Freivald et al. | |
| 6,138,130 A | 10/2000 | Adler et al. | |
| 6,292,811 B1 | 9/2001 | Clancey et al. | |
| 6,317,758 B1 * | 11/2001 | Madsen | G06F 17/246 |
| | | | 715/220 |
| 6,377,965 B1 | 4/2002 | Hachamovitch et al. | |
| 6,606,633 B1 | 8/2003 | Tabuchi | |
| 6,631,497 B1 | 10/2003 | Jamshidi et al. | |
| 6,640,234 B1 | 10/2003 | Coffen | |
| 6,701,485 B1 | 3/2004 | Igra et al. | |
| 6,986,099 B2 * | 1/2006 | Todd | G06F 17/246 |
| | | | 715/212 |
| 6,988,241 B1 | 1/2006 | Guttman et al. | |
| 7,007,033 B1 | 2/2006 | Rothschiller et al. | |
| 7,076,491 B2 | 7/2006 | Tsao | |
| 7,099,890 B2 | 8/2006 | Cahill et al. | |
| 7,350,141 B2 | 3/2008 | Kotler et al. | |
| 7,424,668 B2 | 9/2008 | DeSpain | |
| 7,461,077 B1 | 12/2008 | Greenwood | |
| 7,647,551 B2 | 1/2010 | Vigesaa et al. | |
| 7,735,003 B1 | 6/2010 | Hearn et al. | |
| 7,761,782 B1 | 7/2010 | Warren et al. | |
| 7,962,436 B2 | 6/2011 | Brelage et al. | |
| 8,091,024 B2 | 1/2012 | Graeber | |
| 8,166,385 B2 | 4/2012 | Garcia-Molina et al. | |
| 8,370,750 B2 | 2/2013 | Adachi et al. | |
| 8,601,361 B2 | 12/2013 | Berger et al. | |
| 8,640,022 B2 | 1/2014 | Waldman et al. | |
| 9,020,999 B2 | 4/2015 | Rai | |
| 9,098,484 B2 | 8/2015 | Viry | |
| 9,798,889 B1 | 10/2017 | Karpel et al. | |
| 10,331,771 B2 | 6/2019 | Maresca | |
| 2003/0004853 A1 | 1/2003 | Ram et al. | |
| 2003/0182413 A1 | 9/2003 | Allen et al. | |
| 2005/0097464 A1 * | 5/2005 | Graeber | G06F 17/246 |
| | | | 715/700 |
| 2005/0119990 A1 | 6/2005 | Lee et al. | |
| 2006/0048044 A1 | 3/2006 | Genesereth et al. | |
| 2006/0179012 A1 | 8/2006 | Jacobs | |
| 2006/0212469 A1 | 9/2006 | Babanov et al. | |
| 2007/0050702 A1 | 3/2007 | Chopin et al. | |
| 2007/0078872 A1 | 4/2007 | Cohen | |
| 2007/0136652 A1 | 6/2007 | Ellis et al. | |
| 2008/0046804 A1 | 2/2008 | Rui et al. | |
| 2008/0134089 A1 | 6/2008 | Adachi et al. | |
| 2008/0215959 A1 | 9/2008 | Lection | |
| 2009/0006466 A1 | 1/2009 | Ellis et al. | |
| 2009/0044090 A1 | 2/2009 | Gur et al. | |
| 2009/0160861 A1 | 6/2009 | Nakano | |
| 2009/0307190 A1 | 12/2009 | Maresca | |
| 2010/0083079 A1 | 4/2010 | Rapp et al. | |
| 2011/0022629 A1 | 1/2011 | Glover | |
| 2011/0314365 A1 | 12/2011 | Messerly | |
| 2012/0151315 A1 | 6/2012 | Campbell et al. | |
| 2012/0192050 A1 | 7/2012 | Campbell et al. | |
| 2012/0324421 A1 | 12/2012 | Boeckenhauer et al. | |
| 2013/0036346 A1 | 2/2013 | Cicerone | |
| 2013/0067305 A1 | 3/2013 | Golan | |
| 2013/0110884 A1 | 5/2013 | Eakins | |
| 2013/0298002 A1 | 11/2013 | Viry | |
| 2014/0074878 A1 | 3/2014 | Bornea et al. | |
| 2014/0122516 A1 | 5/2014 | Brewer et al. | |
| 2014/0359417 A1 | 12/2014 | Bar-On | |
| 2014/0372854 A1 * | 12/2014 | Otero | G06F 17/246 |
| | | | 715/219 |
| 2014/0372857 A1 | 12/2014 | Otero et al. | |
| 2014/0372952 A1 | 12/2014 | Otero et al. | |
| 2015/0019540 A1 | 1/2015 | Ganjam et al. | |
| 2015/0142418 A1 | 5/2015 | Byron | |
| 2015/0161250 A1 | 6/2015 | Elbaz | |
| 2015/0242093 A1 | 8/2015 | Yost et al. | |
| 2016/0070733 A1 | 3/2016 | Gould | |
| 2016/0117412 A1 | 4/2016 | Mungi et al. | |
| 2017/0124049 A1 | 5/2017 | Campbell et al. | |
| 2017/0124050 A1 | 5/2017 | Campbell et al. | |
| 2017/0124051 A1 | 5/2017 | Campbell et al. | |
| 2017/0124052 A1 | 5/2017 | Campbell et al. | |
| 2017/0124053 A1 | 5/2017 | Campbell et al. | |
| 2017/0337040 A1 | 11/2017 | Salvi et al. | |

OTHER PUBLICATIONS

Wilbert O. Galitz, The Essential Guide to User Interface Design 535 (2d ed. Wiley 2002).*
PCT International Search Report in PCT/US2016/060025, dated Apr. 7, 2017, 23 pages.
"Setting up Excel Spreadsheets for Single Item or Compound Object Metadata", Published on: Sep. 7, 2015, 6 pages, available at: http://www.nyheritage.org/sites/default/files/docs/MetadataExcel.pdf.
An Introduction to Data Validation in Excel, Published on: Mar. 15, 2014, http://trumpexcel.com/2014/03/learn-all-about-data-validation-in-excel/, 4 pages.
Canton et al., "Compound Data Types", Oct. 2, 2015, 16 pages.
Canton et al., "Condensed Core Design", Jul. 30, 2015, 312 pages.
Canton et al., "Rich Data Types", Jul. 30, 2015, 217 pages.
Chang, et al., "A spreadsheet model for using web service data", In Proceedings of IEEE Symposium on Visual Languages and Human-Centric Computing, Jul. 28, 2014, 8 pages.
Chang, et al., "Creating interactive web data applications with spreadsheets", In Proceedings of the 27th annual ACM symposium on User interface software and technology, Oct. 5, 2014, pp. 87-96.
Create an Excel Drop Down list with Search Suggestions, Published on: Oct. 19, 2013, http://trumpexcel.com/2013/10/excel-drop-down-list-with-search-suggestions/, 11 pages.
French, Ted, "Convert Measurements in Excel", Published on: Mar. 18, 2011, http://spreadsheets.about.com/od/excel2010functions/ss/2011-03-18-Convert-Measurements-In-Excel-2010.htm, 4 pages.
Hoydahl, Jan, "Cominvent AS—Enterprise Search Consultants", Published on: Jan. 25, 2012, http://www.cominvent.com/2012/01/25/super-flexible-autocomplete-with-solr/, 4 pages.
In-Cell Dropdown and Validation in Spreadsheets, Published on: Aug. 26, 2010, http://googledrive.blogspot.in/2010/08/in-cell-dropdown-and-validation-in.html, 27 pages.
Levoy Marc, "Spreadsheets for Images", In Proceedings of 21st International ACM Conference on Computer Graphics and Interactive Techniques, Jul. 24, 1994, 8 pages.

(56) References Cited

OTHER PUBLICATIONS

Lim Jon "Google Spreadsheets: Count with Multiple Values in Cells", Published on: Apr. 7, 2014, http://jonlim.ca/2014/04/google-spreadsheets-count-multiple-values-cells/, 5 pages.
Sartain, JD., "How to create relational databases in Excel 2013", Published on: Aug. 7, 2014, http://www.pcworld.com/article/2462281/how-to-create-relational-databases-in-excel-2013.html, 11 pages.
Singh, et al., "Transforming Spreadsheet Data Types using Examples", In Proceedings of Annual Symposium on Principles of Programming Languages, Oct. 26, 2015, 13 pages.
Trevi, Javier, "Showing all available MySQL data types when creating a new table with MySQL for Excel", Published on: Jul. 23, 2014, https://blogs.oracle.com/MySqlOnWindows/entry/showing_all_available_mysql_data, 8 pages.
Use Formula AutoComplete, Retrieved on: Oct. 26, 2015, https://support.office.com/en-us/article/Use-Formula-AutoComplete-6d13daa5-e003-4431-abab-9edef51fae6b, 4 pages.
PCT International Search Report in PCT/US2016/060190, dated Feb. 9, 2017, 13 pages.
Kongdenfha et al., "Rapid development of spreadsheet-based web mashups", International World Wide Web Conference 18th ACM, Madrid, Apr. 20, 2009, 10 pages.
PCT International Search Report in PCT/US2016/060188, dated Feb. 15, 2017, 13 pages.
Bakke et al., "A spreadsheet-based user interface for managing plural relationships in structured data", Human Factors in Computing Systems, May 7, 2011, 10 pages.
Kapros et al., "Updating database schemas without breaking the UI: modeling using cognitive semantic categories" Proceedings of the 2014 ACM SIGCHI Symposhium on Engineering Interactive Computing System, Jun. 17, 2014, 9 pages.
European Communications in Application 16798045.7, dated Jun. 8, 2018, 4 pages.
"Creating Compound Objects", Retrieved From: https://mediawiki.middlebury.edu/wikis/LIS/images/b/bd/Compound-wizard.pdf, Retrieved on: Sep. 2, 2010, pp. 1-34.
"Non Final Office Action Issued in U.S. Appl. No. 15/340,251", dated Aug. 10, 2018, 17 Pages.
"Non Final Office Action Issued in U.S. Appl. No. 15/340,321", dated Oct. 17, 2018, 11 Pages.
"Non Final Office Action Issued in U.S. Appl. No. 15/340,374", dated Sep. 7, 2018, 10 Pages.
Chang, et al., "A Spreadsheet Model for Handling Streaming Data", In Proceedings of the 33rd Annual ACM Conference on Human Factors in Computing Systems, Apr. 18, 2015, 4 pages.
PCT Invitation to Pay Additional Fees in PCT/US2016/060180, dated Feb. 9, 2017, 8 pages.
Brian C. Whitmer, "Brigham Young University Improving Spreadsheets for Complex Problems", All These and Dissertations, Paper 1713, Apr. 8, 2008, http://scholarsarchive.byu.edu/cgi/viewcontent.cgl?artcile=2712&context=etd, pp. 1-7, 15-26.
PCT International Search Report and Written Opinion in PCT/US2016/060180, dated Jul. 12, 2012, 22 pages.
Han et al., "Situational data integration with data services and nested table", Service Oriented Computing and Applications, vol. 7, No. 2, Apr. 27, 2012, pp. 129-150.
PCT Second Written Opinion in PCT/US2016/060188, dated Sep. 13, 2017, 7 pages.
PCT International Preliminary Report on Patentability in PCT/US2016/060188, dated Feb. 12, 2018,8 pages.
PCT International Search Report in PCT/US2017/040251, dated Dec. 18, 2017, 14 pages.
U.S. Appl. No. 15/340,187, Office Action dated May 18, 2018, 32 pages.
PCT International Preliminary Report on Patentability in PCT/US2016/060025, dated May 8, 2018, 16 pages.
PCT International Preliminary Report on Patentability in PCT/US2016/060180, dated May 8, 2018, 15 pages.
PCT International Preliminary Report on Patentability in PCT/US2016/060190 dated May 8, 2018, 9 pages.
"PCT International Preliminary Report on Patetability in PCT/US2017/040251", dated Jan. 1, 2019. 8 pages.
"Final Office Action Issued in U.S. Appl. No. 15/340,187", dated Jan. 2, 2019, 52 pages.
"Final Office Action Issued in U.S. Appl. No. 15/340,251", dated Mar. 6, 2019, 17 Pages.
"Final Office Action Issued in U.S. Appl. No. 15/340,374", dated Apr. 5, 2019, 11 Pages.
"Advisory Action Issued in U.S. Appl. No. 15/340,187", dated Mar. 26, 2019, 5 Pages.
"Non-Final Office Action Issued in U.S. Appl. No. 15/340,187", dated May 1, 2019, 60 Pages.
"Final Office Action Issued in U.S. Appl. No. 15/340,201", dated Jul. 11, 2019, 15 Pages.
"Final Office Action Issued in U.S. Appl. No. 15/340,321", dated Jul. 5, 2019, 13 Pages.
"Non Final Office Action Issued in U.S. Appl. No. 15/340,251", dated Oct. 3, 2019, 19 Pages.
Zarowin, Stanley, "Hiding Cells in Excel-just One or Two or Even 100 at a Time", In Journal of Accountancy, Oct. 1, 2008, pp. 1-2.
"Notice of Allowance Issued in U.S. Appl. No. 15/340,187", dated Sep. 18, 2019, 9 Pages.
"Advisory Action Issued in U.S. Appl. No. 15/340,321", dated Sep. 24, 2019, 6 Pages.
Non-Final Office Action Issued in U.S. Appl. No. 15/340,201, dated Jan. 2, 2019, 14 Pages.
"Non Final Office Action Issued in U.S. Appl. No. 15/340,321", dated Nov. 4, 2019, 12 Pages.

* cited by examiner 300 302 304 306 308

| Reference Unit | Unit | Base Multiplier | Type |
|---|---|---|---|
| 1 | nm | $1\times10^{-9}$ | Distance |
| 2 | mm | 0.001 | Distance |
| 3 | cm | 0.01 | Distance |
| 4 | m | 1 | Distance |
| 5 | km | 1000 | Distance |
| 6 | in | 0.02539 | Distance |
| 7 | ft | 0.30479 | Distance |
| 8 | yd | 0.9144 | Distance |
| 9 | mi | 1609.3471 | Distance |
| ⋮ | | | |
| 40 | ms | 0.001 | Duration |
| 41 | s | 1 | Duration |
| ⋮ | | | |
| 84 | oz | 0.035274 | Weight |
| 85 | g | 1 | Weight |
| 86 | kg | 1000 | Weight |
| ⋮ | | | |
| 817 | m/s | 1 | Distance / Duration |
| 818 | ft/s | 0.30479 | Distance / Duration |
| ⋮ | | | |

| | A | B | C | D | E | F | G | H | I |
|---|---|---|---|---|---|---|---|---|---|
| 1 | | | | | | | | | |
| 2 | | | Distance | | | | | | |
| 3 | | | 4000 m | ←910 | | | | | |
| 4 | | | 2500 m | ←912 | | | | | |
| 5 | | | 500 | ←914 | | | | | |
| 6 | | | | ←916 | 904 | | | | |
| 7 | | | *Distance* | | | | | | |
| 8 | | | m – Meters | | | | | | |
| 9 | | | f – Feet | | | | | | |
| 10 | | | in – Inches | | | | | | |
| 11 | | | mi – Miles | | | | | | |
| | | | mm – Millimeters | | | | | | |
| | | | *Duration* | | | | | | |
| | | | min – Minutes | | | | | | |
| | | | mo – Months | | | | | | |

NOTIFICATIONS FOR RICH DATA TYPES

CROSS-REFERENCE TO RELATED APPLICATIONS

This application claims priority to U.S. Provisional Application Ser. No. 62/249,869, filed Nov. 2, 2015 and entitled "Rich Data Types;" U.S. Provisional Application Ser. No. 62/357,284, filed Jun. 30, 2016 and entitled "Rich Data Types;" U.S. Provisional Application Ser. No. 62/249,884, filed Nov. 2, 2015 and entitled "Compound Data Objects;" and U.S. Provisional Application Ser. No. 62/357,292, filed Jun. 30, 2016 and entitled "Compound Data Objects," the disclosures of which are incorporated herein by reference in their entirety.

BACKGROUND

Spreadsheet application programs typically store data in cells as character strings, numbers, or errors. Although data in spreadsheets may be displayed as, for example, currency, a date, a time, a percentage, a location, etc., existing spreadsheet applications treat such data as a display formatted version of strings or numbers, without understanding the type of data nor do spreadsheet applications have the ability to perform intelligent calculations on such data. In other words, present spreadsheet applications perceive and understand such data simply as numerical or string values without understanding what type of data it is. In an example, present spreadsheet applications may allow addition of the value "2 kg" and the value "2 years" because the spreadsheet application merely recognizes the numerical value "2" without regard to the reference unit. Accordingly, spreadsheet applications may allow the addition of 2 kg to 2 years, resulting in, for example 4 (kg or years) without error. In another example, present spreadsheet applications may treat values such as "5 kg" and "6 kg" as string values, thereby preventing the sum of such values. In another example, the value and associated unit are separated into individual cells. For example, the number "2" may be stored in a cell and the associated unit may be stored in an adjacent cell. Accordingly, the numerical values are allowed to be added, despite the erroneous result. This configuration further requires the user to rely on their own organization within the spreadsheet to remember the association between the cells. Accordingly, calculation errors may occur and may be exacerbated when propagated through a spreadsheet or series of workbooks containing vast amounts of data due to the lack of understanding and recognition of the type of data entered by the spreadsheet application.

It is with respect to these and other general considerations that aspects of the present disclosure have been made. Additionally, although relatively specific problems are discussed, it should be understood that the aspects should not be limited to solving only the specific problems identified in the background.

SUMMARY

The present disclosure is directed to systems and methods for implementing notifications for rich data types in a spreadsheet application. Generally, a value being of a rich data type is as a type of value that has context and established relationships with other types of data. In particular, a rich data type is a data value having associated context, which may be units (e.g., inches, miles, meters, kilograms, seconds, joules, hertz, Fahrenheit, etc.) or other information about the data's type (e.g., city, stock, NCAA football team, car, restaurant, school, etc.). Additionally, a value being of a rich data type further includes established relationships with other types of data.

In a first aspect, this disclosure describes a computer-implemented method for identifying inconsistencies within a formula of a spreadsheet. The method comprises: receiving a formula, wherein the formula causes an operation to be performed on a first data value and a second data value; identifying a first data unit associated with the first data value and a second data unit associated with the second data value; determining that the first data unit is different than the second data unit; based at least in part on determining that the first data unit and the second data unit are different, determining that the operation cannot be performed; identifying a relationship between the first data unit and the second data unit; based at least in part on the relationship, converting one of the first data value and the second data value into a third data value, wherein the third data value is associated with one of the first data unit and the second data unit; and performing the operation.

In a second aspect, a system is disclosed. The system comprises at least one processing unit; an at least one memory storing computer executable instructions that, when executed by the at least one processing unit, cause the system to perform a method, the method comprising: receiving an indication that data is being entered into a cell of a spreadsheet; identifying a pattern associated with the data; based at least in part on the pattern, identifying at least one data type associated with the data; based at least in part on the data type, identifying a plurality of data units associated with the data type; and providing the plurality of data units as suggestions for completing entry of the data into the cell of the spreadsheet.

In third aspect, another system is disclosed. The system comprises at least one processing unit; an at least one memory storing computer executable instructions that, when executed by the at least one processing unit, cause the system to perform a method, the method comprising: receiving a first data value into a cell of a spreadsheet, wherein the first data value is associated with a first data unit; identifying at least a second data value in a related cell of the spreadsheet, the second data value associated with a second data unit; determining that the first data value is inconsistent with the second data value; and providing a notification that the first data value is inconsistent with the second data value.

In fourth aspect, another system is disclosed. The system comprises at least one processing unit; an at least one memory storing computer executable instructions that, when executed by the at least one processing unit, cause the system to perform a method, the method comprising: identifying a first data value in a cell of a spreadsheet identifying at least a second data value in a related cell of the spreadsheet; identifying at least one data type associated with the first data value and at least the second data value; based at least in part on the data type, determining that the first data value is inconsistent with the second data value; and providing a notification that the first data value and the second data value are inconsistent.

In fifth aspect, another system is disclosed. The system comprises at least one processing unit; an at least one memory storing computer executable instructions that, when executed by the at least one processing unit, cause the system to perform a method, the method comprising: receiving a first data value into a cell of a spreadsheet, wherein the first data value is associated with a first data unit; identifying at least a second data value in a related cell of the spreadsheet, the second data value associated with a second data unit; determining that the first data value is inconsistent with the second data value; identifying at least one data type associated with the first data value and the second data value; based at least in part on the data type, identifying a relationship between the first data unit and the second data unit; and providing a notification that the first data value and the second data value are inconsistent.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 3 illustrates an example reference table for implementing rich data types of the disclosed spreadsheet application.

FIG. 7A and FIG. 7B illustrate leveraging rich data types in a spreadsheet application to perform unit conversions.

FIGS. 9A-9C illustrate leveraging rich data types in a spreadsheet application to intelligently provide unit suggestions.

FIG. 13A and FIG. 13B illustrate leveraging rich data types in formula string creation.

FIG. 15A illustrates leveraging rich data types to provide an enriched data experience in a spreadsheet application.

DETAILED DESCRIPTION

Figure 1:
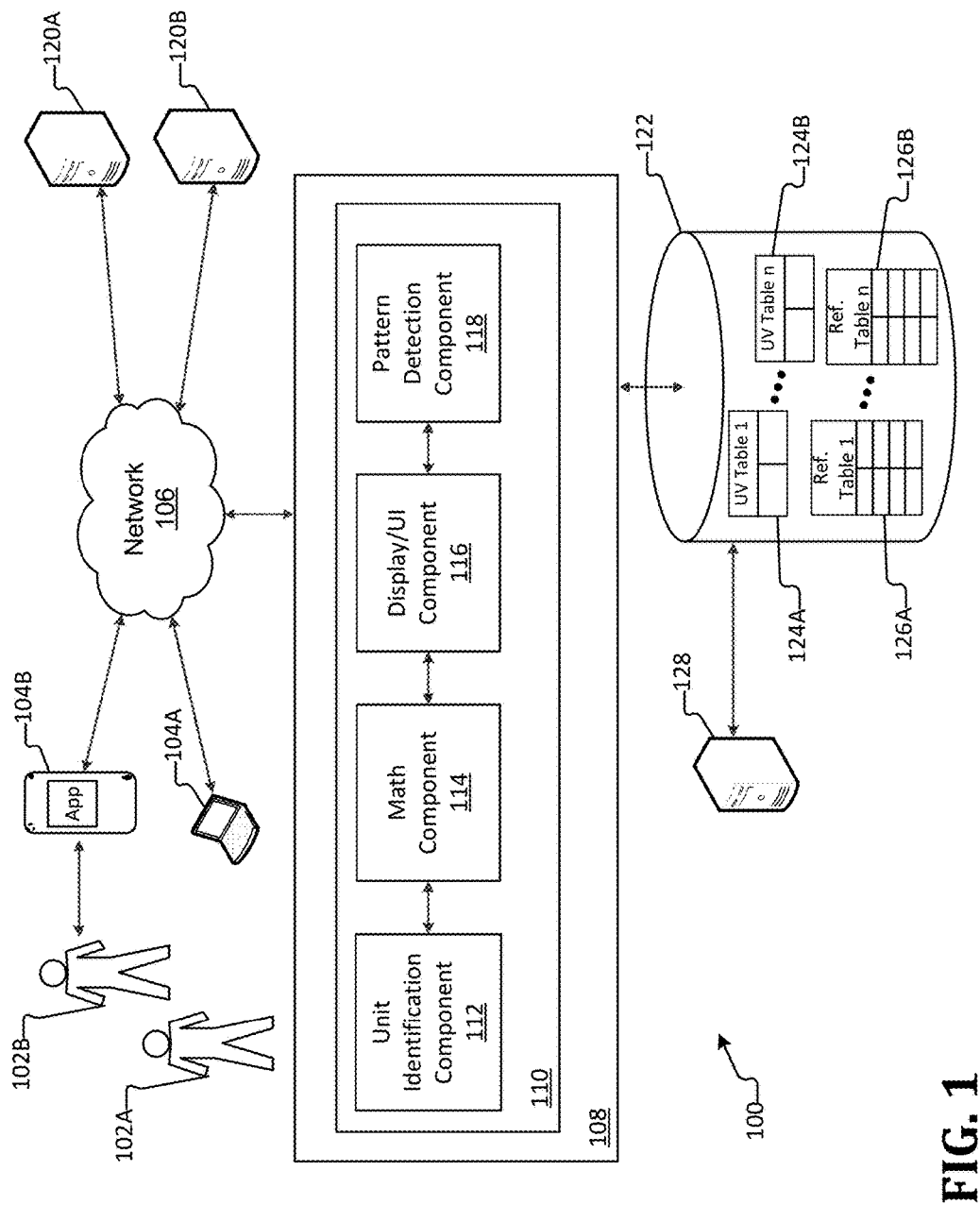
FIG. 1 illustrates a system for implementing rich data types in a spreadsheet application.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure is directed to systems and methods for implementing rich data types in a spreadsheet application. Generally, a value being of a rich data type is a type of data that has context and established relationships with other types of data. Accordingly, a rich data type is a data value having associated context, which may be units (e.g., inches, miles, meters, kilograms, seconds, joules, hertz, Fahrenheit, etc.) or other information about the data's type (e.g., city, stock, NCAA football team, car, restaurant, school, etc.). Additionally, a value being of a rich data type further includes established relationships with other types of data. In an example, established relationships may provide the spreadsheet application with further information regarding how that value fits in context with other values, so as to correctly convert a value to another value and identify whether it is even possible to convert a value to another value. Still further, such relationship information may provide the spreadsheet application with knowledge about surrounding values, enabling the spreadsheet application to suggest units as the user types a value into the spreadsheet. Additionally, such information about established relationships provides the spreadsheet application with the ability to provide features such as, for example, look up of related data (e.g., if a value is a city, the spreadsheet application can provide the population of that city; if the value is a football team, the spreadsheet application can provide the name and position of each player; if the value is an ingredient, the spreadsheet application can provide the name of recipes including that ingredient, etc.). Accordingly, the disclosed spreadsheet application recognizes data values and semantic information about the data's type. The spreadsheet application uses such contextual and relationship information to prevent errors, contextually present user interface experiences to make operations easier, surface related data, common operations, etc.

Accordingly, novel aspects provide a rich data type that is user-extensible and a spreadsheet that is type aware. Furthermore, the disclosed spreadsheet application will enable users to define relationships between new or custom data types and also provides the ability to overload or change existing relationships. It is understood that such aspects of the present disclosure are merely exemplary and are not intended to limit the scope of the disclosure thereto. It is with respect to these and other general considerations that embodiments have been made.

FIG. 1 illustrates a system 100 for implementing rich data types in a spreadsheet application, according to an example embodiment.

As illustrated, system 100 may include one or more client computing devices 104 (e.g., client computing devices 104A and 104B) that may execute a client version of a spreadsheet application capable of implementing rich data types in a spreadsheet. In some examples, the client spreadsheet application may execute locally on a client computing device 104. In other examples, a client spreadsheet application (e.g., a mobile app on a thin client computing device 104) may operate in communication (e.g., via network 106) with a corresponding server version of spreadsheet application 110 executing on one or more server computing devices, e.g., server computing device 108. In still other aspects, rather than executing a client version of a spreadsheet application, the one or more client computing devices 104 may remotely access, e.g., via a browser over network 106, the spreadsheet application 110 implemented on the server computing device 108 or multiple server computing devices (e.g., in a distributed computing environment such as a cloud computing environment).

As illustrated by FIG. 1, a server version of spreadsheet application 110 is implemented by server computing device 108. As should be appreciated, the server version of spreadsheet application 110 may also be implemented in a distributed environment (e.g., cloud computing environment) across a plurality of server computing devices (not shown). Moreover, as should be appreciated, either a client or a server version of the spreadsheet application 110 may be capable of implementing rich data types in a spreadsheet. While a server version of the spreadsheet application 110 and associated components 112-118 are shown and described, this should not be understood as limiting. Rather, a client version of spreadsheet application 110 may similarly implement components 112-118 on a client computing device 104.

In a basic configuration, the one or more client computing devices 104 are personal or handheld computers having both input elements and output elements operated by one or more users 102 (e.g., user 102A and user 102B). For example, the one or more client computing devices 104 may include one or more of: a mobile telephone; a smart phone; a tablet; a phablet; a smart watch; a wearable computer; a personal computer; a desktop computer; a laptop computer; a gaming device/computer (e.g., Xbox®); a television; and the like. This list is exemplary only and should not be considered as limiting. Any suitable client computing device for executing a client spreadsheet application and/or remotely accessing spreadsheet application 110 may be utilized.

In some aspects, network 106 is a computer network such as an enterprise intranet and/or the Internet. In this regard, the network 106 may include a Local Area Network (LAN), a Wide Area Network (WAN), the Internet, wireless and wired transmission mediums. In further aspects, server computing device 108 may communicate with some components of the system via a local network (e.g., an enterprise intranet), whereas server computing device 108 may communicate with other components of the system via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

As described above, the spreadsheet application 110 may be implemented on a server computing device 108. In a basic configuration, server computing device 108 may include at least a processing unit and a system memory for executing computer-readable instructions. In some aspects, server computing device 108 may comprise one or more server computing devices 108 in a distributed environment (e.g., cloud computing environment). Server computing device 108 may provide data to and from the one or more client computing devices 104 and/or one or more other server computing devices (e.g., server computing devices 120A and/or 120B) via network 106.

As used herein, rich data values may be stored in cells of the spreadsheet application 110. As will be described in further detail herein, in an example embodiment, cells that store rich data values may each be associated with a unit/value table. Accordingly, one or more unit/value tables (e.g., unit value tables 124A and 124B) may be stored in storage (e.g., storage 122) accessible to spreadsheet application 110. The unit/value tables may be retrieved based on a reference pointer or a file locator, which may be a uniform resource locator (URL) identifying a file path from a local storage location or a remote storage location. Still further, one or more unit reference tables (e.g., unit reference tables 126A and 126B) may also be stored in a storage location, such as storage 122. The unit reference tables may be retrieved based on a reference pointer or a file locator, which may be a uniform resource locator (URL) identifying a file path from a local storage location or a remote storage location. In other embodiments, cells that store rich data values may each be connected to an online database, wherein the online database stores contextual and relationship information regarding that particular rich data type. The disclosed spreadsheet application may implement rich data values by implementing unit/value tables and reference tables, by implementing an online database, or any combination thereof.

In some examples, the one or more unit/value tables and unit reference tables may be stored in different storage locations within a distributed environment (e.g., cloud computing environment) accessible to spreadsheet application 110 over a network, e.g., network 106. As described herein, the location of a unit/value table and reference table in storage may be represented by a reference pointer, a file locator, which may be a URL to local storage or to remote storage accessible over a network. In particular, a URL may provide a file path to a storage location hosted by a third party (e.g., Dropbox®, etc.), in a public or private cloud storage location (e.g., OneDrive®, iCloud®, Amazon® Cloud Drive, etc.), in an enterprise storage location (e.g., SharePoint®, etc.), in a public storage location accessed over the Internet, and the like.

As illustrated in FIG. 1, the spreadsheet application 110 may include various components for creating, editing, and storing rich data values, including, for example, an identification component 112, a math component 114, a display/UI component 116, and a pattern detection component 118. In aspects, each component may communicate and pass data between the other components. The various components may be implemented using hardware, software, or a combination of hardware and software. Moreover, the various components may be executed on a single server computing device (e.g., server computing device 108), on multiple server computing devices (e.g., server computing devices 120A, 120B and/or 128), or locally on a client computing device (e.g., client computing device 104A or 104B). Although four specific components are described and illustrated, it is understood that the present disclosure is not meant to be limited to such a configuration and more or fewer components may be used to implement aspects of the present disclosure.

As described above, the spreadsheet application 110 may be configured to implement rich data types and storage of rich data values. As should be appreciated, while examples and descriptions provided below may generally reference implementing a rich data type and storage of a rich data value, the methods and systems described may similarly include implementing multiple rich data types and the storage of multiple rich data values. In cases where application of the methods or systems may differ, additional disclosure will be provided.

In aspects, the identification component 112 may scan a spreadsheet or multiple spreadsheets to analyze rich data values stored therein. In particular, the identification component 112 may scan a spreadsheet to identify rich data values and corresponding units. The identification component 112 may also identify cells organized in columns or rows that contain values having units or types. The identification component 112 may also identify a header cell or cells having a label referencing a particular unit or type that would be applied to a multiple cells of a column or row. The identification component 112 may further identify inconsistent values, for example, cells that store values of units or types that are inconsistent with other values stored in that column or row. The identification component 112 may also identify units or types in formulas. For example, the identification component 112 may identify cell references in a formula to identify the type of data required by a particular formula. The identification component 112 may further parse a formula to identify units or types defined therein. The identification component 112 may also parse values stored in, for example, a compound value (e.g., "5 days 4 hours 23 minutes" may be stored as three values in a single cell as a compound object). The identification component 112 may also suggest appropriate units.

In aspects the math component 114 may determine whether unit conversion is required. In particular, the math component 114 may analyze a formula to determine whether that formula requires each value to have consistent units (e.g., a sum function requires each unit to be consistent, however multiplication of two values having inconsistent units is generally allowed). For calculations requiring consistent units, the math component 114 may also identify a common unit to which each value is converted and to convert each unit to a value of that identified unit using, for example, a reference table as will be described in further detail herein. The math component 114 may also perform calculations. The math component 114 may also determine whether an operation is impermissible and reject such impermissible operations (e.g., adding values having inconsistent units, subtracting a location from a date, etc.).

In some aspects, the display/UI component 116 displays various user interfaces. For example, the display/UI component 116 may display warning messages indicating that a value is of an inconsistent data type or that a calculation error has occurred as well as accompanying description of the warning. The display/UI component 116 may provide a user interface prompting the user to select a desired conversion unit, for example, if a formula requires each unit to be of consistent units. Furthermore the display/UI component 116 may provide a unit suggestion user interface to identify available units, frequently used units, particular formatting, etc.

In some aspects, the pattern detection component 118 may determine whether an entry of a value matches a predetermined pattern. For example, as a user enters, into a cell or a formula bar, a value, the pattern detection component 118 may identify a predetermined pattern such that the display/UI component 116, for example, can display suggested units based on the detected pattern.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2:
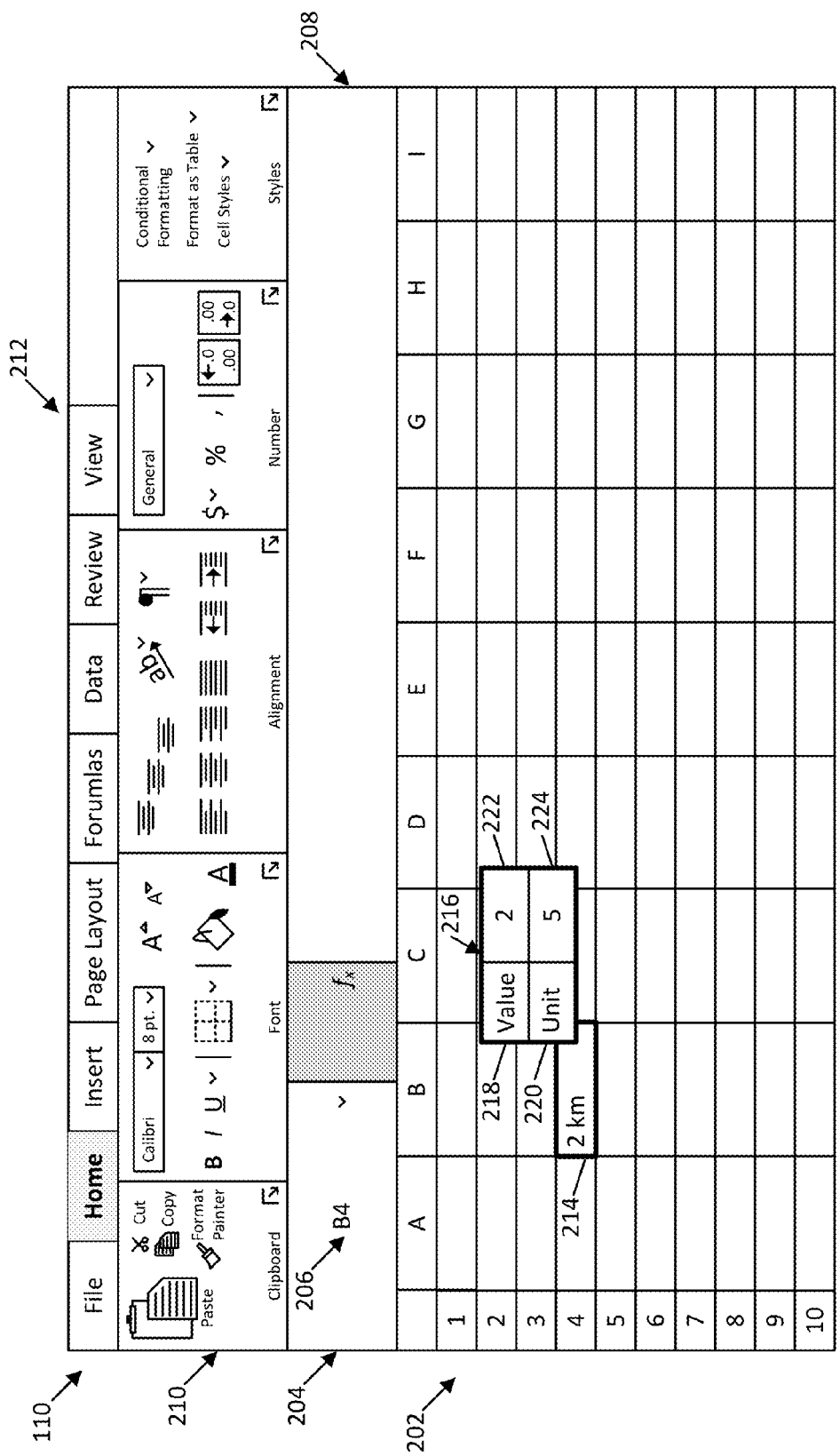
FIG. 2 illustrates rich data values implemented in a spreadsheet application.

FIG. 2 illustrates rich data values implemented in a spreadsheet application.

As described herein, a rich data value is a data value having context, which may be unit information or information about the data's type (e.g., distance, duration, geo-location, stock, NCAA football team, restaurant, etc.) and established relationships with other types of data (e.g., how that value might relate to other values). In an example, a cell may contain the value "2 meters" wherein the "meters" unit has context (e.g., it is a unit of distance) and relationships to other units (e.g., it is associated with other units of distance such as feet, kilometers, and miles, etc.; it can be converted to other units of distance; it has rules, such as, for example, it cannot be summed with a value with the type "kg," etc.). Although some examples provided herein may describe numbers and associated units, this disclosure is not intended to be so limiting. Rather, any value with associated type information is also disclosed. For example, the value "Chicago" may be of type "city" or "geo-location." Additionally, the value "fall" has an associated "season" type. Furthermore, the value "blue" has an associated "color" type, etc.

Referring back to FIG. 2, illustrated is an example spreadsheet application 110 having a plurality of cells 202, a navigation ribbon 204 (including a cell identifier 206 and a formula bar 208), and a toolbar 210. In some embodiments, the toolbar 210 is part of the navigation ribbon 204. The spreadsheet application 110 further includes a plurality of tabs 212 for accessing various aspects and operations of the spreadsheet application. Each cell can store a value such as, for example, a number or a string value. In an example embodiment, a rich data value has at least two parts: a value part and a unit part. In some embodiments, the rich data value has a type part instead of or in addition to the unit part. In an example, the value part specifies the numerical or string representation of the value while the unit part specifies the particular unit (e.g., kg, m, in, lb, hz, deg., etc.) associated with that value. In some embodiments, a value does not have a standard unit (e.g., values such as a city, a phone number, a credit card number, a team name, etc.). In such an example, the rich data value may have a type part that specifies the category of the value (e.g., phone number, credit card number, team name, city, etc.). Such a category, as used herein, is referred to as data type or type.

In the example embodiment, for each cell, the spreadsheet application 110 may store a unit/value table (e.g., unit/value table 124A and 124B). The unit/value table 216 is may be, for example, a table that stores a value field and a unit field, wherein each value field includes the value stored in the cell, and the unit field includes the unit associated with that value. Additionally or alternatively, the unit/value table may include one or more type fields that include the type associated with the value stored in that cell. In embodiments, these unit/value tables are stored in the cell table of the spreadsheet. As illustrated in FIG. 2, cell B4 214 stores a rich data value (e.g., "2 km") and is associated with a unit/value table 216. As illustrated in this example, the unit/value table includes a "Value" string 218 and a "Unit" string 220 (and in some embodiments, it may alternatively or additionally include a "Type" string). The second column includes the value 222 and the unit 224 associated with the value (and in some embodiments may include a type associated with the value). In this example, the value 222 is a numerical value (e.g., "2"), and the associated unit 224 is a pointer (e.g., "5"), which points to a reference table (e.g., reference table 126A or 126B) in which the unit is actually stored. Accordingly, in this example, "5" is a pointer to the unit "kilometers," which is stored in a unit reference table. The reference table is described in further detailed herein with reference to FIG. 3. In other embodiments, the unit 224 in the unit/value table 16 may specifically indicate the unit. Thus, in such an embodiment, the unit 224 may correspond to "km" or "kilometers" rather than a reference to a pointer in which such unit is stored. Similarly, if the unit/value table includes a type field, the type field may include a reference pointer to a table storing the type or the actual type.

FIG. 3 illustrates an example reference table 300 for implementing rich data types of the disclosed spreadsheet application.

The example reference table 300 is a universal table that stores unit information, including, for example, one or more units, unit relationships to other units, conversion logic to convert among units, pointer identification information of each unit, the type of each unit, etc. In an example, the reference table 300 may be a single table or it may be distributed across multiple tables, wherein each table may be stored in memory (e.g. in storage 122) or externally and accessed by the spreadsheet application 110. In this example, the reference table 300 includes four columns: a reference unit column 302, a unit column 304, a base multiplier column 306, and a type column 308. Although this example reference table 300 includes four columns, it is understood by one of ordinary skill in the art that more or fewer columns may be provided in the reference table 300 as necessary. Furthermore, the particular arrangement of the reference table 300 is merely exemplary and may be modified as necessary.

In this example, the reference unit column 302 corresponds to the pointer reference number used to reference the particular unit identified in the unit column 304. Accordingly, as described and illustrated in the example of FIG. 2, the unit 224 in the unit/value table 216 stores the value "5" which is a pointer to the value "km" of the example reference table 300. Accordingly, one or more cells storing a rich data values may each associated with a unit/value table (e.g. unit/value table 216). As described herein, in some examples, the unit/value table references a unit stored in the reference table (e.g., reference table 300). Accordingly, aspects of the present disclosure include the efficient implementation of rich data types by associating, with each cell storing a rich data value, a unit/value table that references a more detailed and extensive unit reference table.

The type column 308 specifies the type of each corresponding unit specified in the unit column 304. In particular, units are arranged, in this example reference table 300 by the type. Types may be further defined as categorizing the value and may correspond to one or more units. Types may be, for example, "Distance," "Duration," "Weight," "Speed," "Date," "Distance/Duration," "geo-location," "football team," "stock," "mutual fund," "school," "movie," "store," etc. As further illustrated in this example, each type includes multiple units. For example, the "distance" type includes at least nine units (e.g., nm, mm, cm, m, km, in, ft, yd, and mi) as specified by the unit column 304. In some embodiments, however, the type may include just one unit. Although only a few units and types are illustrated in this example reference table 300, it is understood that more or fewer types and corresponding units may also be stored. As also discussed, some values may not have a unit (e.g., the value "Chicago" has no unit, but instead has a type). Accordingly, the reference table 300 may further store types of data with no associated unit.

Now referring back to FIG. 3, as described herein, the disclosed spreadsheet application 110 is capable of performing complex conversions among values having different units. The base multiplier column 306 stores a conversion factor such as, for example, a multiplier value used to convert a particular unit to a base value unit within that same type. For values having units, for each type, there is a single unit that represents a base value in this example. That base value is a reference value from which all conversions among units of the same type are performed. Accordingly, each base multiplier is represented as a multiplication factor of the particular base value unit such that a value, if multiplied by its corresponding base multiplier, is converted to that base value unit. For example, the base value unit for the type "distance" is the "meter." Accordingly, in an example, conversions among units of the type "distance" are performed with reference to the base value unit "meter." Thus, in some examples, in order to convert between a value having the unit "km" to a value having the unit "m" the base multiplier indicates that the value having the unit "km" is multiplied by 1000 to arrive at a value having the unit "m." In another example, in order to convert between a value having the unit "km" to a value having the unit "cm" two conversions may be performed: a first conversion to the base value "m," then a second conversion to the unit "cm." Accordingly, the value in "km" is multiplied by 1000 to arrive at a value in "m." Then, the value in "m" is multiplied by 0.01 (the base multiplier for "cm") to arrive at the value in "cm." Although this example illustrates conversion among units using a base value unit, it is understood that this is merely exemplary and is not intended to be limiting. In other embodiments, conversions may be performed directly. In particular, the reference table 300 may include conversion logic to convert directly to units within the same type without the calculation to a base value unit.

It is further understood that conversions of a value to another value may be performed among units sharing the same type and typically cannot be performed outside of a particular type. For example, conversions can be performed among units that are within the "distance" type. For example, conversions can be performed among units "nm, in, ft, m, yd, mi" because they are of the same "distance" type. However, conversions cannot be performed among units of different types. For example, conversions cannot be performed between the unit "cm" and unit "oz" because they are of different types. In particular, the unit "cm" is of the "distance" type while the unit "oz" is of the "weight" type.

Although conversions cannot be performed among units of different types, other calculations among units of different types may be performed. For example, multiplication and division operations can be performed among units of different types. For example, the unit "m" (type distance) can be divided by the unit "s" (type duration) to arrive at "m/s" which is yet another unit having a type of "distance/duration." Such calculation rules and conversion logic may be stored in the reference table 300. In other embodiments, such calculation rules may be stored in the actual formula itself. For example, a conversion formula may store the logic to perform such conversions and the rules associated with convertible values. Other mathematical formulas such as multiplication and division formulas may store separate logic and rules associated with the respective formula.

Furthermore, a mathematical formula may require conversion logic to arrive at a solution. For example, a formula multiplying "m/s" with "l/km" would first need to convert the values having different units to a common unit (e.g., convert the value "m/s" to "km/s" or convert the value "l/km" to "l/m") in order to perform the necessary multiplication. These examples are described in further detail herein.

The reference table 300 may be extensible. In particular, in some embodiments, user-defined or user imported types and corresponding units may be added to the reference table 300, as will be described in further detail herein. Further aspects of the present disclosure provide that such newly added units and types may also fully participate in calculations and spreadsheet functions. In particular, users may add units and types to the reference table 300, and provide conversion information and rules for units and types that may not be in the reference table 300. For example, units such as "lightyears" of type "distance" might not be included in the reference table 300. Accordingly, the spreadsheet application 110 provides for the extensibility of the reference table 300 to add such units and corresponding relationships to other units. In an example, a user may also provide a unit and provide the associated type and the base multiplier, which defines the conversion factor for the new unit to the base unit within that type. Additionally or alternatively, the user may obtain, from an online database, such information to apply to the added unit. Alternatively or additionally, in some embodiments, the user may add unknown units and types to the unit reference table 300 and provide the base multiplier.

Aspects further include the ability of the user to add types that may exist, but are not included in the reference table 300. For example, the user may add the type "Temperature" and add one or more units within that type, such as, for example, "Fahrenheit," "Celsius," and "Kelvin" and identify an added unit as the base unit. The user may also provide, for each added unit, the associated base multiplier. As described herein, the user may obtain, from an online database, such type and unit information.

Furthermore, users may have the ability to define more complex conversions. In an example, users can define more complex conversions, via an entry or new column in the reference table 300, which instructs the spreadsheet application to call an API to call an online service, for example, to perform the conversion. Accordingly, in examples in which conversion between values is more complex, the reference table 300 may call one or more APIs in order to perform the conversion. In some embodiments in which multiple APIs are provided, a display may be provided that shows the conversion from each API so that the user may decide which API to call. Thus, extensibility allows for conversions between values to be expressed as more complex algorithms. In an example in which a value is a city having the type geo-location, calculating the distance between two locations may require complex conversions. For example, city values may be converted to, for example, latitude and longitudinal coordinates, which may be converted via the calling of an API. Accordingly, calculating the distance between two locations may be performed through a service. Additionally, such a calculation may be provided by a service that offers options such as calculate the distance between two locations based on "driving," "as the crow flies," "train," "airplane" etc. In such an embodiment, the value returned may be provided with additional information, such as the mode of travel.

Although the use of APIs is described in the context of a user-defined unit or conversion, it is understood that all conversions may be performed by a service via the calling of an API. Furthermore, an API may be called to verify the validity of units and to verify conversions.

Aspects further include the ability to add and define new types and associated units that do not exist, but are fully defined by the user. In an example, a user may provide a new type and define one or more units within that type. The user may also identify a base value unit and base multipliers for each defined unit. Accordingly, a user may define a new type and associated units as well as conversions among those newly defined units.

Another example of an added type may be a media type having units such as, sounds, images, and videos. The user may define the base unit and conversions among units, if possible. The user may further define calculation rules for each unit. For example, the user may define the calculation result when two sound files are added together, for example, to create a single sound file by sequentially adding the two sound files. Alternatively or additionally, the user may define the calculation result when a video file is subtracted from another video file, resulting in a single, cropped video file. Alternatively or additionally, a user may add a non-linear type such as a decibel (dB) and the corresponding logarithmic calculations thereon.

Adding types and units may be done through a separate user experience that enables the user to provide parameters for each added unit and type. Parameters may include, for example, the name of the added unit(s), the name or selection of a type associated with the added unit(s), selection of a base unit, conversion rules, and calculation rules. The spreadsheet application 110 may, in response to the creation of the added unit or type, provide a reference number used to reference each new unit (as identified in the reference unit column 302). Additionally, in some embodiments, functions may be used to create units (e.g., dividing a value having the unit "meters" by a value having the unit "seconds" may result in the creation of the unit "m/s"). Such created units may persist in the spreadsheet application throughout the file and may also be applied to other files and shared among users. Furthermore, extensibility further includes a user interface for specifying how such newly added units may be displayed in the spreadsheet application (e.g., include dashes between values, spaces, unit labels, etc.).

Additionally, new units and types can be temporarily or permanently added to the reference table 300. In particular, the user experience may provide the option to temporarily add the unit or type to the reference table 300 such that the new unit or type is only applied to the present spreadsheet. Alternatively, the user experience may provide the option to permanently add the unit or type to the reference table 300 such that the new unit or type is applied to other spreadsheets and may be shared among users.

Accordingly, aspects disclose the ability to extend the reference table 300 by providing the ability to add, to the reference table 300, new types and associated units or the ability to extend types by adding new units thereto. Aspects further enable providing conversion logic and calculation rules for each unit or type. The spreadsheet application 110 may further use the newly added units and types in pattern matching and autosuggestion features that are described herein.

The disclosed spreadsheet application 110 further supports the dynamic updating of volatile rich data values. Volatile rich data values are values that are subject to change over time. Examples of volatile rich data include, but are not limited to, stock quotes, weather forecasts, currency rates, sports scores, etc. The disclosed spreadsheet application 110 further includes the ability to dynamically update such volatile rich data values stored in a spreadsheet using, for example, an API call to an online database. In an example, a spreadsheet may contain one or more currency values having units, such as, for example, Yen, Dollar, and Pound. Each cell storing such a currency value may reference, in its corresponding unit/value table (e.g., unit/value table 206), the current value and a reference pointer to the corresponding unit (Yen, Dollar, or Pound) stored in the reference table 300. The value part (e.g., value 222) of the unit/value table may change over time. This change may be the result of, for example, daily currency value fluctuations. As described herein, some units stored in the reference table are associated with a base multiplier, which is the multiplication factor used to convert a value of that particular unit to a value of another unit. Accordingly, for volatile rich data values, such as currency, such base multipliers may change over time. In an example, the value of the Dollar is dynamic and is thus subject to change on a periodic basis, and therefore the conversion rate (as reflected by the base multiplier value) of the Dollar to other currencies is also subject to change. The reference table 300 may therefore reference, for each currency unit, an API that calls a dynamically updated conversion table. Accordingly, currency data stored in the spreadsheet can correspondingly update and display the most current currency values. The spreadsheet application 110 may provide the user with the ability to control the refresh rate of the data, or it may refresh at every occurrence of a change in a currency value. Moreover, the user may override the currency conversion table and instead enter a fixed conversion value, if desired. Still further, the spreadsheet application 110 provides the ability to define multiple currency conversion tables, wherein the user may specify which currency conversion table to use for specific spreadsheets or calculations. In such an example, a currency conversion function may reference a particular table. In yet another example, a currency conversion function may reference a particular table to be applied on a particular date, and may reference another table to be applied on another date. Such conversion tables may also be stored in the reference table 300.

Figure 4:
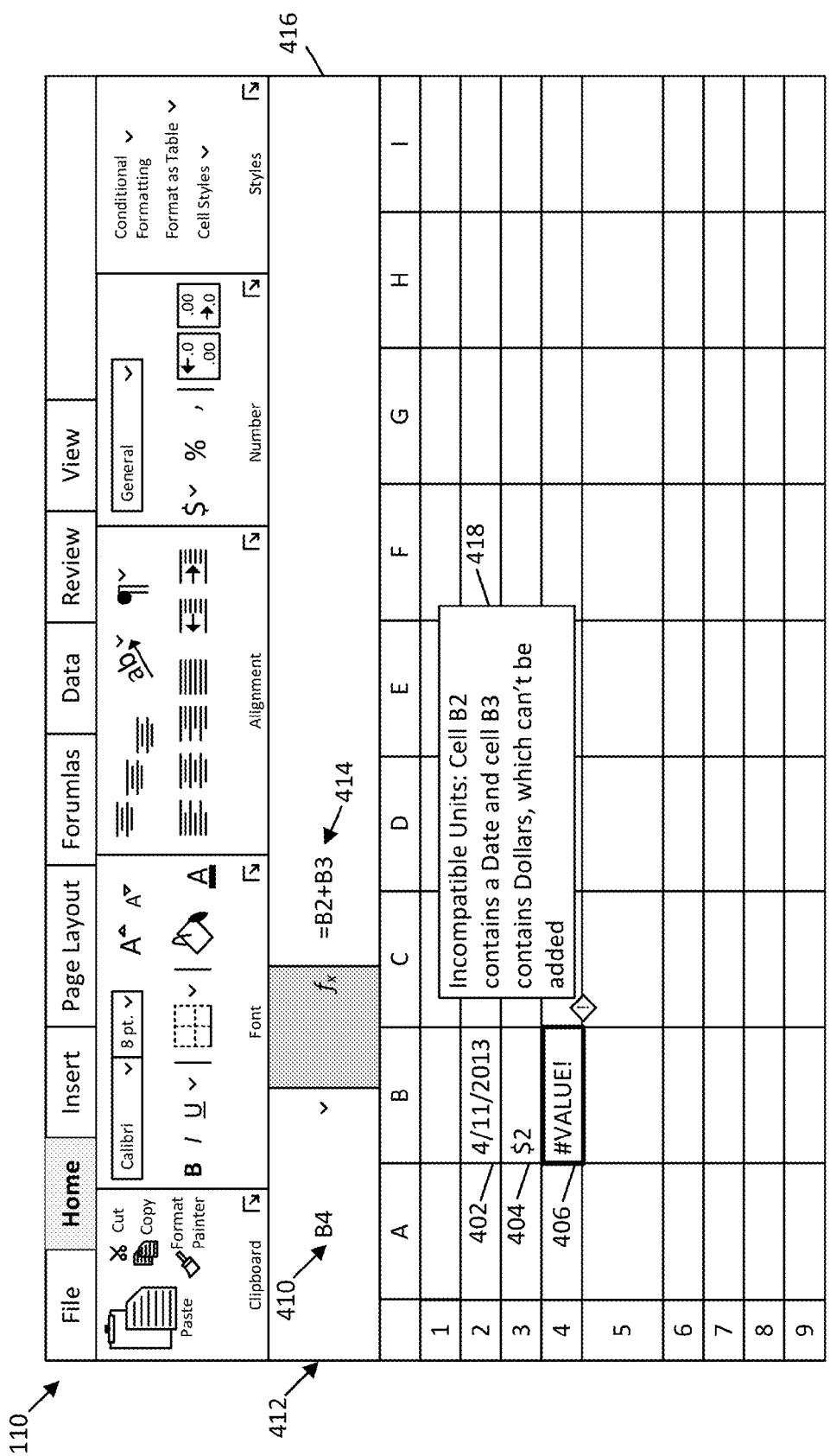
FIG. 4 illustrates leveraging rich data types in a spreadsheet to avoid calculation errors.

FIG. 4 illustrates leveraging rich data types in a spreadsheet to avoid calculation errors.

As described herein, present spreadsheet applications do not have the capability to intelligently detect erroneous calculations. Rather, present spreadsheet applications are capable of detecting obvious, erroneous calculations, such as, for example, when adding a cell having a string value, and adding a cell having a numerical value. However, current spreadsheet applications are incapable of detecting less obvious errors, such as, for example, adding numerical values having units of different types. In an example, current spreadsheet applications may view a date value and a dollar value simply as numerical values and therefore allow the sum of such values by returning a seemingly valid, yet erroneous value. Furthermore, even if a spreadsheet application can detect an obvious error, it does not provide a description, let alone a detailed description of that error. According to novel aspects of the present disclosure, the spreadsheet application implements values that are rich data types and therefore have context about the rich data values stored therein and established relationships with other types of data. In particular, the disclosed spreadsheet application has the ability to differentiate among different types of values. This ability to differentiate among different values provides enhanced error detection, thereby minimizing calculation errors. Still further, the disclosed spreadsheet application can also provide detailed explanations of the resultant error.

Now referring to FIG. 4, illustrated is a spreadsheet application 110 storing rich data values. Cell B2 402 stores the value "4/11/2013" which has a date type. Cell B3 404 stores the value "$2" which has a currency type. Furthermore, based on the cell identifier 410 (e.g., "B4") referenced in the navigation ribbon 412, the result of the formula 414 (e.g., "=B2+B3") provided in the formula bar 416 is to be stored in cell B4 406. As illustrated, the formula 414 (e.g., "=B2+B3") is a sum function adding the value stored in cell B2 402 to the value stored in cell B3 404. According to aspects of the present disclosure, the values stored in cells B2 402 and B3 404 are of rich data values, and thus, the spreadsheet application 110 recognizes that cell B2 402 stores a date value and cell B3 404 stores a currency value. The spreadsheet application 110 further recognizes that such units and corresponding types are different. Accordingly, because the cells store values that are of different types, the values cannot be added together. In particular, the spreadsheet application 110 may look up, in the reference table (e.g., reference table 300) the type associated with the unit of each value stored in cell B2 402 and cell B3 404. In other embodiments, the logic may be in the function itself and therefore the function can use information associated with the rich data values to ascertain the type of value it is in order to display such an error. Accordingly, based on the inconsistent types, the sum of the value stored in cell B2 402 containing a date type and the value stored in cell B3 containing a currency type will yield an error result in cell B4 406, such as, for example, a #VALUE error. Although a date value and a currency types are illustrated, it is understood that these types are merely exemplary and are not intended to be limiting. Other examples of inconsistent types may be, for example, passing a number into a text/string function, passing a string into a number function, adding a distance value with a unit of weight, adding a sound value to text, etc.

In addition to the indication of an error in cell B4 406, an error message 418 may also be displayed. This error message 418 may include a detailed description of the particular error. In this particular example, the error message 418 indicates that the values stored in cell B2 402 and cell B3 404 are incompatible units and therefore cannot be added together. Accordingly, aspects provide an improved error experience in which descriptive error strings are displayed in response to erroneous calculations that may be propagated through the spreadsheet and downstream calculations. Such descriptive error strings may further identify a particular cell or cells in which the inconsistencies were initially introduced by highlighting, for example, the source cells in which the erroneous data was entered. Such description allows users to better understand the reasons why the error occurred and enables the user to correct such mistakes more quickly and easily. The error strings also ensure that fewer errors result and fewer errors propagate through a spreadsheet or a series of related spreadsheets.

In some embodiments, the error result indicated in cell B4 406 and the corresponding error message 418 may be provided immediately after the formula 414 is entered. Yet in other embodiments, the result in cell B4 406 and the corresponding error message 410 may be provided dynamically and in real time as the formula is being constructed. Providing errors dynamically enables users to detect errors earlier, making formula creation more accurate and efficient. In an example, if a formula definition itself contains unit or type information, errors can be identified in real time and a corresponding error message can be displayed. In an example, a formula defined as "=3 meters+A1" indicates that 3 meters is to be added to the value stored in cell A1. The formula itself indicates that the value stored in cell A1 is expected to be of the same unit (e.g., "meter") or type (e.g., "distance") so that the two values can be summed. Any value in cell A1 that is not of the unit "meter" or a value that is not of the type "distance" would result in an error. Alternatively or additionally, in another example, a formula defined as "=file5.jpg+C8" indicates that an image file is to be summed with cell C8. In such an example, the types of values that could be stored in that cell depends on how the logic associated with the sum function is defined to interact with image files. For example, the sum function may include logic that allows an image file to be added to another image, resulting in two images positioned side-by-side. In other embodiments, the sum function may include logic that allows an image file to be added to text, resulting in the text positioned above the image. In another embodiment, the sum function may include logic that does not allow an image file to be added to a date value. Accordingly, based on the logic defined in a particular function, the spreadsheet application can identify the types of values that can and cannot be used. If a value that cannot be used is passed through that function, an error will result. Accordingly, the disclosed spreadsheet application 110 may display an error, either upon completion of the formula definition or in real-time, indicating that the value is incompatible. This may be in the form of an error string or it may be a display format that indicates the value is an error (e.g. bold red text). The error may additionally be displayed in the formula bar in which the formula is constructed. Construction of a formula in the formula bar is described with further detail with reference to FIG. 13A and FIG. 13B.

Furthermore, in the example provided herein, for the formula "=3 meters+A1), the value stored in cell A1 must have the unit "meter" or be of the type "distance." Accordingly, if the value stored in cell A1 has a type "distance," the disclosed the spreadsheet application 110 can still perform the sum operation by performing a unit conversion such that the two values may be added together. Such aspects are described in further detail herein with reference to FIG. 7A, FIG. 7B, and FIG. 8.

In yet another example, a formula definition itself may include parameters having expected types. For example, a loan calculation formula may include parameters such as an interest rate (percentage type), a principal amount (currency type), and a term (duration type). Any entry of a value, for each parameter, that is not of the expected type would result in an error. Accordingly, an error message may be displayed dynamically as the formula is constructed and values are specified. Alternatively, such an error or displayed error message may be provided after construction of the formula.

Figure 5:
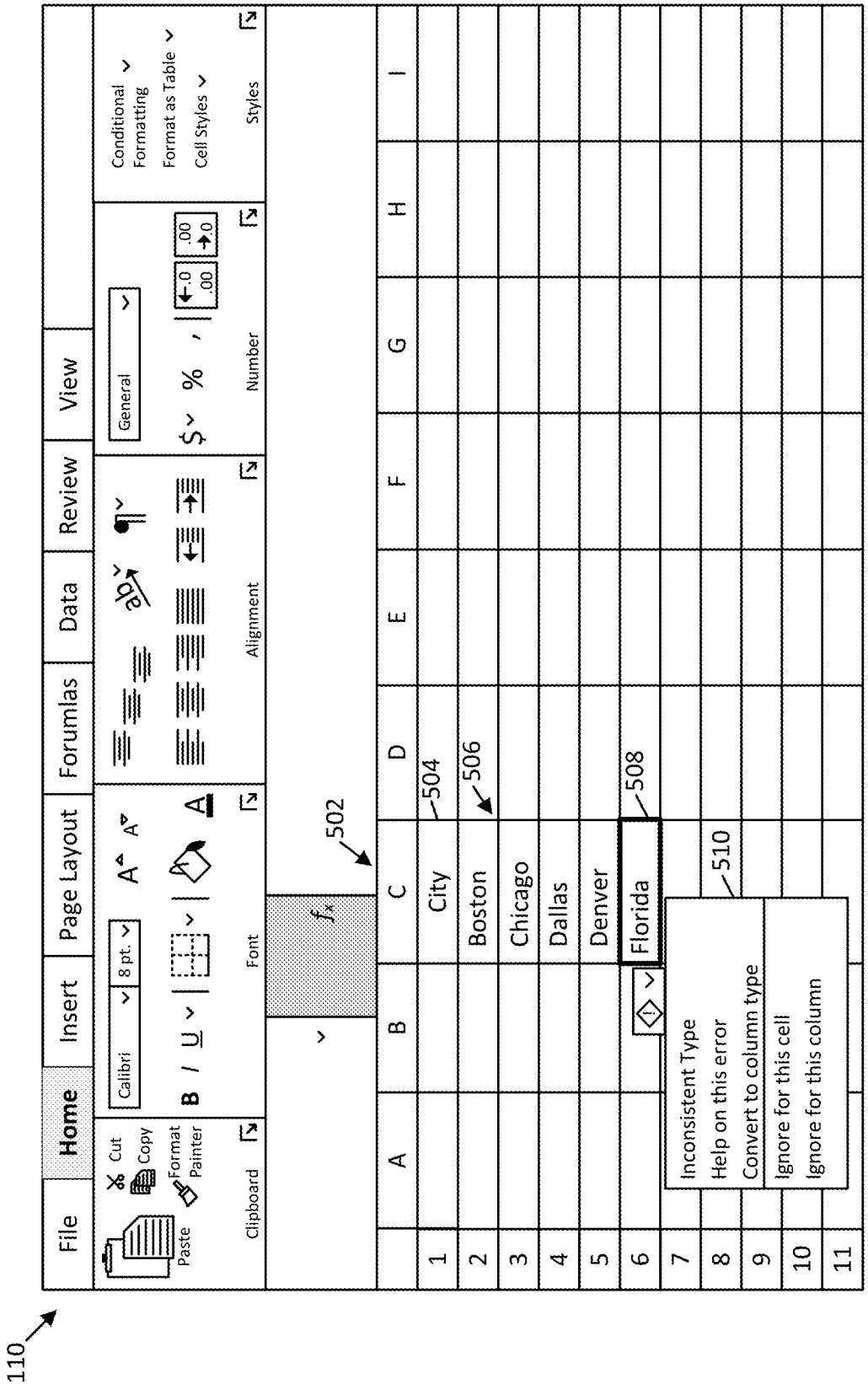
FIG. 5 illustrates the ability to identify inconsistencies in values stored in a spreadsheet.

FIG. 5 illustrates the ability to identify inconsistencies in values stored in a spreadsheet.

In addition to identifying errors within formulas, the disclosed spreadsheet application 110 can further identify inconsistent values stored in one or more columns and rows. In some embodiments, the spreadsheet application 110 may detect labels in header cells (e.g., the "city" label representing the type "city geo-location") in the header cell C1 504) or it may detect patterns in multiple cells of a row or column (e.g., if each cell C2-C5 506 individually includes unit or type information) to identify inconsistencies in entered values. As illustrated in FIG. 5, the spreadsheet includes column C 502 of cells, each storing a rich data value. Cell C1 504 is a header cell for that column and stores a column label (e.g., "City"). Accordingly, based on the label provided in the column header, it is understood that all values stored in the cells of column C 502 are cities (which is, for example, of type "city geo-location"). Alternatively, if no such header is provided, the spreadsheet may individually identify, for example, the type associated with each value to identify patterns. As illustrated in this example, cell C6 508 stores the value "Florida," which is associated with, for example, a "state geo-location" type and is therefore inconsistent with the "city geo-location" type associated with the values stored in cells C2-C5 506. Accordingly, the spreadsheet application 110 is capable of identifying such inconsistent values. Furthermore, In this example, the spreadsheet application 110 displays a warning screen 510 that includes a general explanation of the error (e.g., "Inconsistent Type") and may also include an option to provide a more detailed explanation of the error. The warning screen 510 may additionally include an option to correct the inconsistency by converting the inconsistent value to a consistent value, if possible. In an example, a column may store a series of values in meters and an inconsistent value in feet may be provided. Accordingly, the warning screen 510 may provide the option to convert the value in feet to a value in meters, or to optionally change the unit itself to meters. The warning screen 510 may further include an option to ignore the error for the particular value, ignore the inconsistent error for the column/row, or ignore the inconsistent error for the spreadsheet.

In some embodiments, the spreadsheet application 110 may include an example audit mode that enables a quick review of units or types applied to cells throughout the spreadsheet. Such an audit mode, if selected, may cause the spreadsheet application 110 to review the data and corresponding units and types stored in the entire spreadsheet and display any inconsistences. In an example, inconsistencies discovered may be viewed from the spreadsheet as, for example, a highlighted cell or bold, red font that alerts the user of the inconsistency. As described herein, such inconsistencies may be discovered through the analysis of headers, data patterns, or other relevant techniques. In audit mode, all cells having values that may be of an inconsistent unit or type may be highlighted or otherwise brought to the user's attention. For example, a cell including a time value may be highlighted if entered in a column representing weight values. This may be useful if one or more cells may be hidden and identification of the type of data may be difficult to ascertain. Although highlighting is described, any other appropriate method may be used to distinguish where the errors or inconsistencies might be located in the spreadsheet or spreadsheets. Such aspects may act on both visible and hidden data.

The spreadsheet application 110 may also warn the user about unit display inconsistencies. For example, if a value without a unit is entered in a column of values having units, a warning screen may be displayed indicating the inconsistency. Alternatively or additionally, if a value with a unit is entered in a column of values without units, a warning screen may be displayed indicating the inconsistency. Alternatively or additionally, if a value without a unit is used in a formula with a value having a unit, a warning screen may be displayed indicating the inconsistency. The spreadsheet application 110 may further suggest units for values without units entered in a column or row of one or more values having units.

Accordingly, the disclosed spreadsheet application 110 recognizes unit and type information and how such information propagates throughout the spreadsheet. Accordingly, an incorrect or inconsistent entry can be more readily identified. Such identification of inconsistent values may further minimize errors and the propagation of such errors throughout a spreadsheet. By leveraging unit and type information, the spreadsheet application 110 can prevent spreadsheet errors and calculation errors by identifying such inconsistencies.

Figure 6:
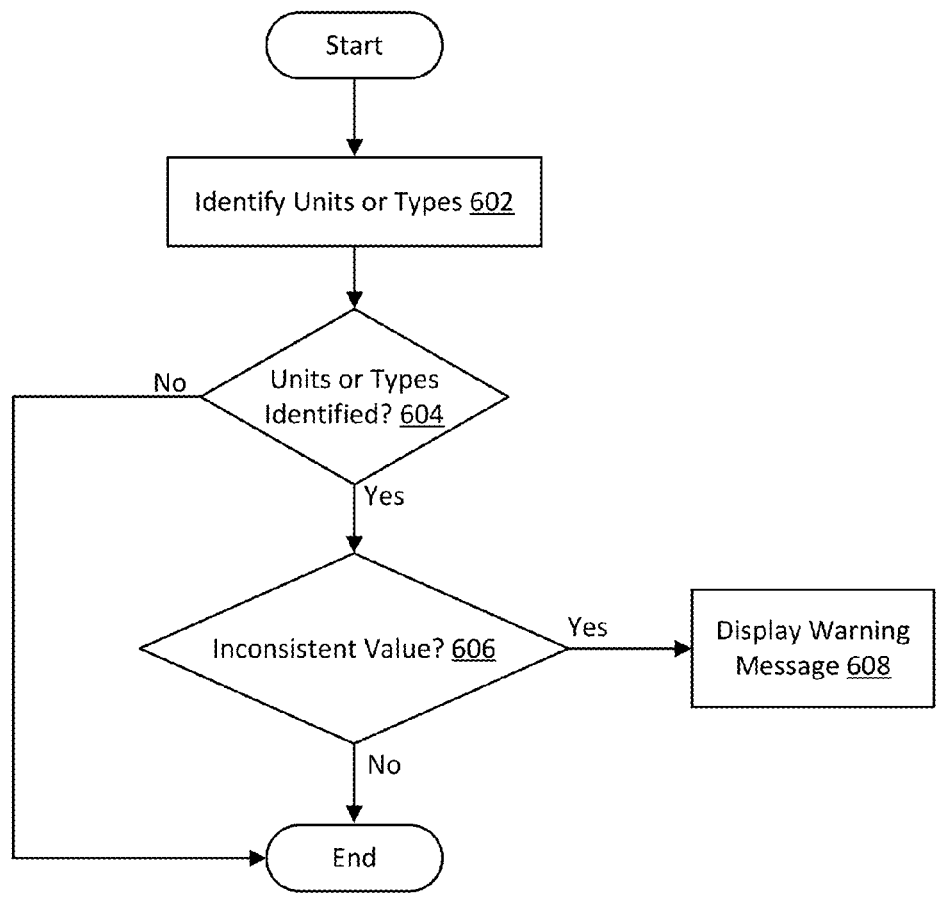
FIG. 6 illustrates a method of detecting inconsistencies in values stored in a spreadsheet, as described and illustrated with reference to FIG. 5.

FIG. 6 illustrates a method of detecting inconsistencies in values stored in a spreadsheet, as described and illustrated with reference to FIG. 5.

The method 600 begins at the start operation. The method 600 proceeds to the identify units and types operation 602. In the identify units and type operation 602, an identification component (e.g., identification component 112) scans the values stored in the spreadsheet to identify rich data values. In particular, the identification component may determine the unit (e.g., "meters") or the corresponding type (e.g., "geo-location") associated with each cell. The identification component may also identify a header cell or cells having a label referencing a particular unit or type that would be applied to a multiple cells of a column or row. The identification component may also identify whether a particular unit or type is applied or set to an entire row or column, regardless of whether a value is actually entered in cells of that row or column. In an example, for a column header containing the unit "seconds" the identification component identifies the unit (seconds) and even the corresponding type (duration) and applies that information to each cell within that column.

The identify units and types operation 602 may also identify patterns in values stored in the spreadsheet. In particular, determining inconsistencies in values may be performed by initially identifying at least two or more cells storing values, each having a unit or type associated therewith. Accordingly, in the identifying units and types operation 602, the identification component may identify two or more contiguous cells organized in columns or rows that contain values having units or an associated type.

In the units or types identified operation 604, the identification component determines, based on the analysis performed in the identify units and types operation 602, whether the spreadsheet includes two or more contiguous cells organized in columns or rows that contain units or types (i.e., rich data values). In another embodiment, the identification component If, in the units identified decision operation 604, the identification component determines that the spreadsheet does not include two or more cells organized in columns or rows that contain units or types, the method 600 ends. If, alternatively, in the units identified decision operation 604, the identification component determines that the spreadsheet does include two or more cells organized in columns or rows that contain units or types, the method 600 proceeds to the identify unit and type operation 606.

In the inconsistent value operation 606, the identification component determines whether a value, within the identified row or column of contiguous cells, has a unit or type that is different from the identified unit or type of that row or column. Continuing the example from above, for a column header containing the label "kilograms" the identification component identifies "kilograms" as the unit applied to each cell within that column. Thus, a value stored in a cell within that column having, for example, the unit "pounds" would be identified as an inconsistent unit (even though it is within the same "weight" type). In another example, if two contiguous cells of a column store values of the type "NFL team" (e.g., "Seattle Seahawks" stored in cell C1 and "Denver Broncos" stored in cell C2), the value "New York Knicks" (having type "NBA team") stored in cell C3 would be identified as an inconsistent type.

If the identification component determines that a value has a unit or type that is different from the identified unit or type of that row or column (YES at operation 606), the method 600 proceeds to the display warning message operation 608. In the display warning message operation 608, a display/UI component (e.g., display/UI component 116) displays a warning message (such as, for example, warning message 510 of FIG. 5). Such a warning message may indicate that the value identified in operation 606 is an inconsistent unit or type. The warning message may further explain the inconsistency (e.g., "Inconsistent Type Error: the values in this column are all of type 'distance' and the value in cell C8 is of type 'weight.'"). The warning message may further include options to ignore the warning, ignore the warning for the particular row or column, or to ignore the warning for the entire spreadsheet. The warning message may further include an option to convert the identified value to the consistent value. The warning message may also include an option to remove a unit label from a column header and instead apply the unit individually to the other values in the column or row while maintaining the unit associated with the inconsistent value.

If, alternatively, the identification component determines that no value has a unit or type that is different from the identified unit or type of that row or column (NO at operation 606), the method 600 ends.

As should be appreciated, operations 602-608 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 7A:
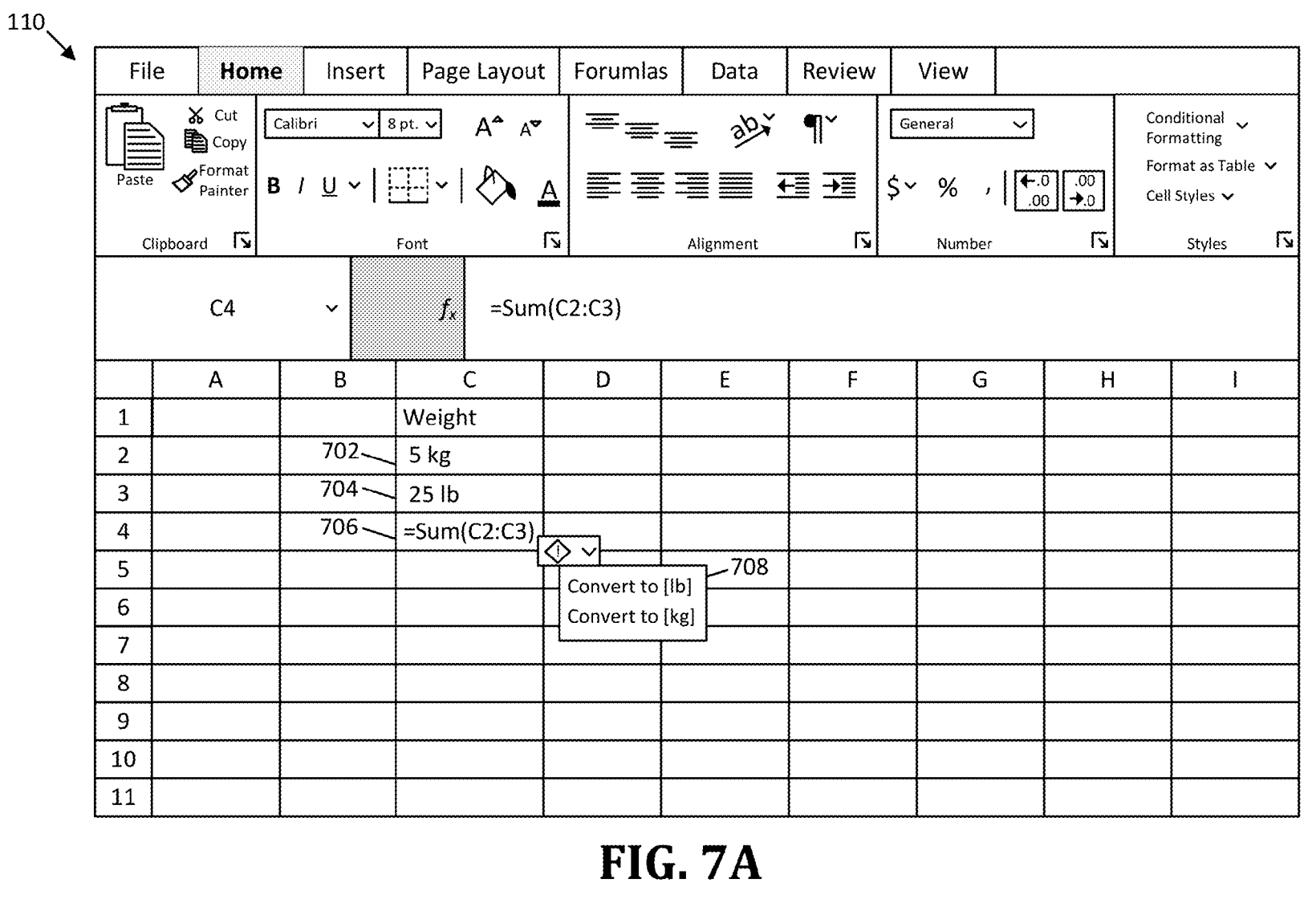
Figure 7B:
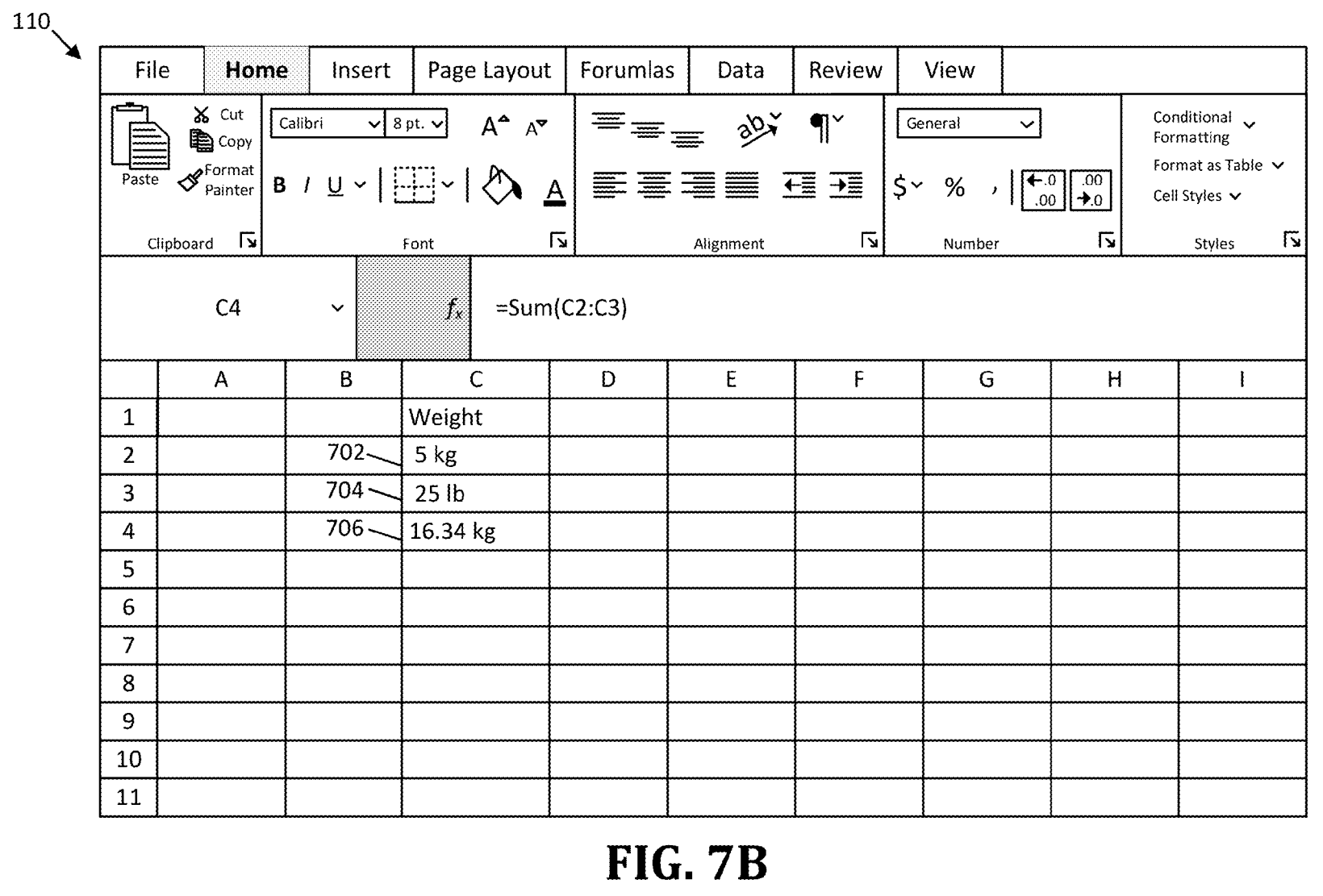

FIG. 7A and FIG. 7B illustrate leveraging rich data types in a spreadsheet application to perform unit conversions.

In particular, the disclosed spreadsheet application (e.g., spreadsheet application 110) is capable of converting values to different units, where possible. For example, the disclosed spreadsheet application can convert, automatically or in response to user input, "500 seconds" to "8.33 minutes." In another example, the spreadsheet application can convert the value "Chipotle" (of type "restaurant") to its particular location or to its annual earnings. In yet another example, the spreadsheet application can convert "28.7 miles" to "46.19 kilometers."

As described herein, conversions may be performed among units sharing the same type and cannot be performed outside of a particular type. For example, conversions can be performed among units that belong to the "distance" type. For example, conversions can be performed among units "nm, in, ft, m, yd, mi" because they belong to the same "distance" type. However, conversions cannot be performed among units of different types. For example, conversions cannot be performed between the unit "cm" and unit "oz" because they belong to different types. In particular, the unit "cm" is within the "distance" type while the unit "oz" is within the "weight" type. In another example, values belonging to the type "geo-location" can be converted. For example, the value "Chicago" is of type "geo-location" and can be converted to latitude/longitude coordinate value, which is also of type "geo-location." Furthermore, the value "Chicago" or the latitude/longitude coordinate value may be converted to a population value, which is also of type "geo-location." However none of these values can be converted to, for example, a value belonging to the weight type.

It is further understood that although conversions cannot be performed among units of different types, other calculations including units belonging to different types may still be performed. For example, multiplication and division calculations can be performed using values having units that belong to different types. For example, the unit "meter" (type "distance") can be divided by the unit "second" (type "duration") to arrive at "meters/second" which is yet another unit having a type of "distance/duration." In some examples, these rules are implemented in the formula itself (e.g., in the multiplication formula) or logic may be provided in, for example, the reference table 300. Conversion logic may describe, for example, how to perform conversions, such as, for example, using a base multiplier, using an API to call an online service. The reference table 300 may additionally or alternatively store calculation logic. For example, the reference table 300 may store the logic to perform various calculations involving each unit or type. In an example, the reference table 300 may also store calculation logic describing how to multiply the value "300 meters/second" with the value "20 seconds" to obtain a resultant value of "6000 meters." The reference table 300 may additionally or alternatively store conversion and calculation rules. For example, the reference table may calculation store rules identifying the types of conversions or calculations that can be performed for each unit or type and the types of conversions or calculations that cannot be performed for each unit or type. In yet other embodiments, such logic or rules may be stored in the actual formula itself. For example, conversion formulas may store conversion logic to perform conversions and the rules associated with convertible values. Additionally, in another example, mathematical formulas may store separate logic and rules associated with the respective formula. In other embodiments, the logic and rules may be stored in another table, it may be stored in storage (e.g., storage 122), or provided in a database executing on a remote computing device and accessible by the spreadsheet application.

It is further understood that in some embodiments, conversion and mathematical formulas may both be used to arrive at a particular solution. For example, a formula multiplying a value having a unit "m/s" with a value having a unit "1/km" would initially convert the "m/s" value to "km/s" or the "1/km" value to "1/m" in order to perform the necessary multiplication. These examples are described in further detail herein.

Referring back to FIG. 7A, illustrated is an example spreadsheet application 110 storing an addition of weight values. Cell C4 706 stores a sum formula (e.g., "=Sum(C2: C3)") adding the value stored in cell C2 702 (e.g., "5 kg") and the value stored in cell C3 704 (e.g., "25 lb"). Because the two values have different units, but are of the same type (e.g., weight), they can be summed. However, one or more conversions must first be performed before the two values can be added. In an example, the value "5 kg" stored in cell C2 702 may be converted to a corresponding value in "lb." In another example, the value "25 lb" stored in cell C3 704 may be converted to a corresponding value in "kg." Or, alternatively, both values "5 kg" and "25 lb" may be converted to another value of the same unit. As described herein, aspects of the present disclosure provide a spreadsheet application 110 that can automatically determine, using conversion rules, that two or more values of different units (e.g., kilograms and pounds) of the same type (e.g., weight) can be summed. Aspects further include that the spreadsheet application 110 can automatically determine, using conversion logic, that the values must be converted to common units in order to perform such a calculation.

As further illustrated in this example, the spreadsheet application 110 can provide an option 708 prompting the user to identify the unit in which resultant answer should appear. Although the option 708 illustrates two options (e.g., "conversion to [lb]" and conversion to [kg]), it is understood that aspects provided herein are not so limited. The message 708 may include an option to convert the resultant value to another unit of the same type. Based on the user's selection, the spreadsheet application 110 will first perform the appropriate conversion to a common unit, then will perform the addition calculation, as illustrated in FIG. 7B. FIG. 7B shows the resultant answer stored in cell C4 706 (e.g., "16.34 kg"), which is the result of the addition of the value "5 kg" and the value "25 lb." The option 708 in FIG. 7A may further display the result associated with each selectable option, thereby providing the user with further context with which to make an appropriate selection.

It is understood that if no option is selected, or if no option to select a unit is provided, the spreadsheet application 110 may automatically perform the necessary conversion. In particular, the spreadsheet application 110 may automatically convert the first listed value to a value having the same unit as the second listed value, or vice versa. The spreadsheet application 110 may also display the result in either unit. In yet another example, the spreadsheet application 110 may convert and display the result to a value having the same unit as the unit appearing in the greatest number of arguments. In another example, the spreadsheet application 110 may convert and display the result to a unit resulting in a reasonable order of magnitude (e.g., showing the value in kilometers rather than nanometers). Alternatively, in another example, the spreadsheet application 110 may convert and display the result to a predetermined unit.

Accordingly, the disclosed spreadsheet application 110 can perform complex conversions of data having different units. The spreadsheet application 110 can further analyze mathematical equations to identify whether values must be converted and automatically perform those conversions in order to perform the necessary calculations.

Figure 8:
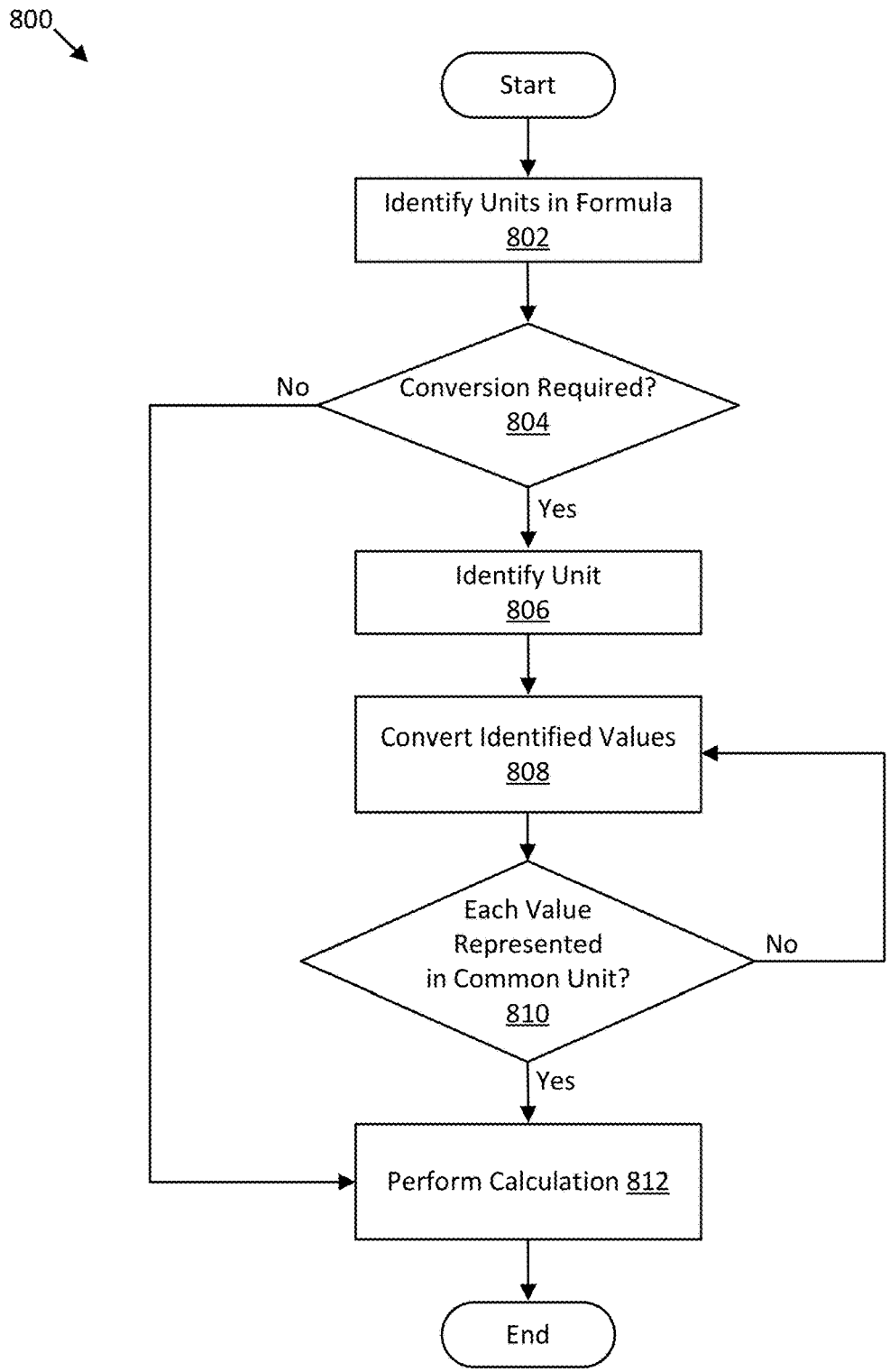
FIG. 8 illustrates a method of performing a calculation of a formula referencing values of different units, as illustrated with reference to FIG. 7A and FIG. 7B.

FIG. 8 illustrates a method of performing a calculation of a formula referencing values of different units, as illustrated with reference to FIG. 7A and FIG. 7B.

The method 800 begins at the start operation and proceeds to the unit identification operation 802. In the unit identification operation 802, an identification component (e.g., identification component 112) identifies each of the units referenced in the formula. For example, a formula may include one or more cell references, wherein those cells store rich data values having units or types. Accordingly, the identification component identifies each cell referenced in the formula and identifies each unit associated with each referenced cell. In some embodiments, this identification requires assessing the unit/value table associated with a referenced cell, such as unit/value table 206 illustrated in FIG. 2. For formulas that include parameters that are not stored in a cell, such as, for example, a value that is typed directly into the formula (e.g., the value 3 meters in "=C5+3 meters"), the identification component identifies such parameters and identifies the associated unit. In some embodiments, the identification component performs natural language parsing on each parameter of the formula to determine the associated unit. The identification component may also match the identified unit with a unit in the reference table, such as reference table 300 illustrated in FIG. 3.

In the conversion required decision operation 804, a math component (e.g., math component 114) determines whether unit conversion is required. In particular, the math component may analyze the formula to determine whether that formula requires each value to have consistent or specific units. In an example, the math component may determine that a "SUM" formula requires each value of the formula to have consistent units. In another example, the math component may determine that a "PRODUCT" formula does not require each value of the formula to have consistent units. Other formulas may not necessarily require common units, but may require specific units. For example, a net present value formula may include a currency value, an interest value, and a time value. Accordingly, based on a determination that the formula does not require each value to have consistent or specific units (NO decision at operation 804), the method 800 proceeds to the perform calculation operation 812. If, alternatively, the math component determines that the formula does require each value to have consistent or specific units (YES decision at operation 804) the method 800 proceeds to the identify common unit operation 806.

In the identify common unit operation 806, the math component identifies the unit to which each identified value must be converted. As described herein, a formula may require that values have consistent units and other formulas may require that value have a specific unit. In the example in which consistent units are required, the user may select such a common unit. For example, a display/UI component (e.g., display/UI component 116) may provide a user interface having an option to select a desired unit to which the identified values are to be converted. For example, in the formula "2 meters+3 feet," the user may have an option to convert the value "2 meters" to a value in feet, the value "3 feet" to a value in meters, or both values to a value in another common unit. In other embodiments, the math component 114 may select the most recurring unit in the formula as the common unit. Yet in other embodiments, the math component may identify a predetermined unit as the common unit. Conversion to a common unit is further described with reference to FIG. 7.

Similarly, the math component identifies values referenced in the formula that are required to be specific values. In the net present value formula example, the currency value may be expected in dollars. Accordingly, for a cell storing a currency value in Yen, the math component identifies that referenced cell requiring conversion to the specified Dollar unit. Alternatively or additionally, the user may select the specified value. In the net present value example, the user may select an option to obtain the net present value in British Pounds. Accordingly, a cell referenced in the formula that stores a value in Dollars must be converted to British Pounds.

In the convert identified values operation 808, the math component converts each value identified in operation 806 to the necessary value. In particular, this might involve using the conversion logic and rules, stored in the reference table (e.g., reference table 300) to perform the conversions. As described herein, conversions may involve more than one conversion step. In an example, converting a value having the unit "km" to a value having the unit "cm" may require first converting the value in "km" to a value having the base unit "m" and thereafter converting the value in "m" to a value in "cm." Furthermore, conversions may require calling a service, such as, for example, identifying the most recent currency rate of the Dollar to the Yen. This may be performed, for example, by calling an API to an online database that is dynamically updated.

In the each value represented in the desired unit operation 810, the math component determines whether each value in the formula has been converted to the common or specified unit, as identified in operation 806. If each value has not been converted to the common or specified unit (NO decision at operation 810), the method 800 proceeds to the convert identified values operation 808 until each value in the formula is converted to the common or specified unit. If, alternatively, each value has been converted to the common or specified unit (YES decision at operation 810), the method 800 proceeds to perform calculation operation 812 in which the math component performs the calculation. After performing the calculation, the method 800 ends.

As should be appreciated, operations 802-812 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 9A:
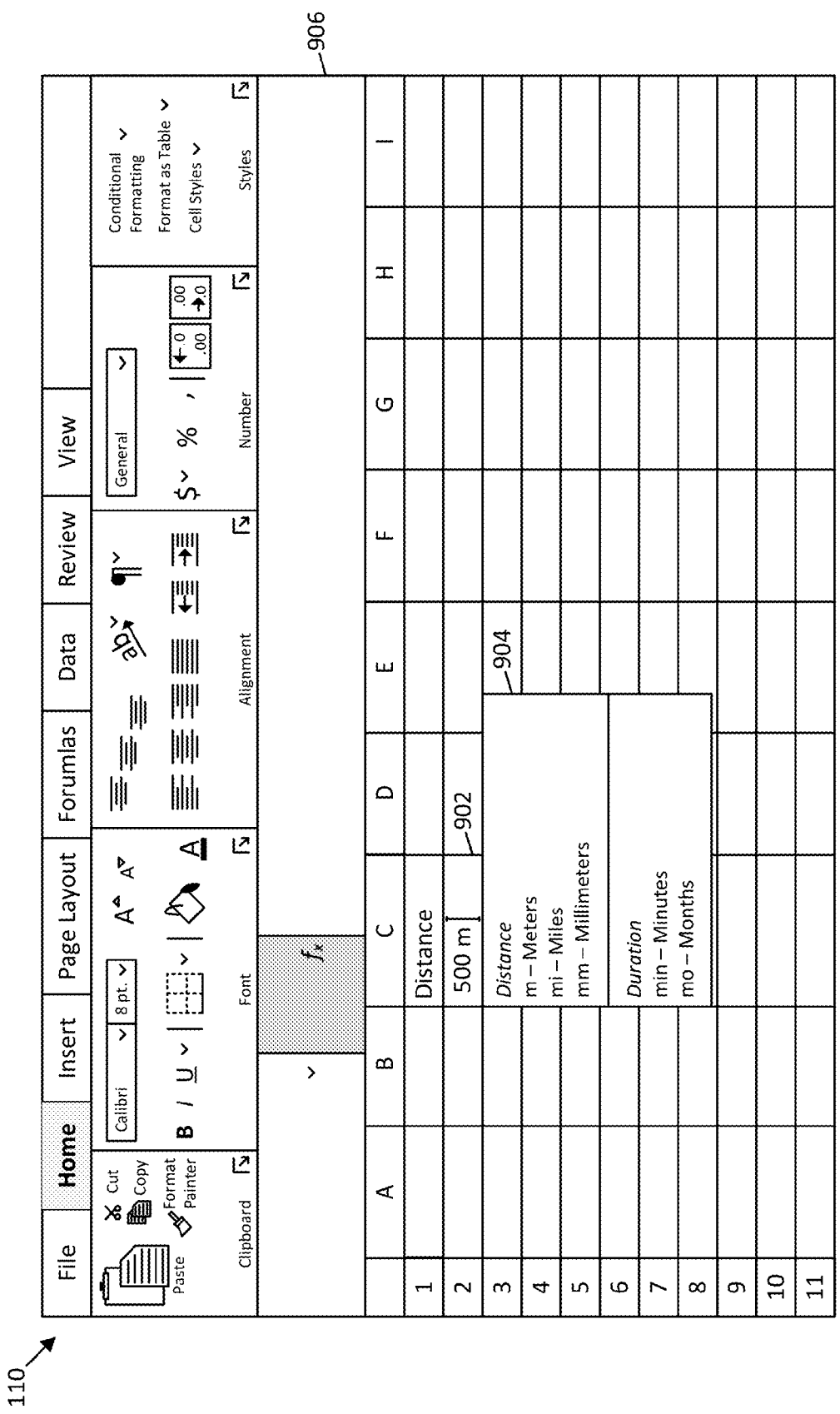
Figure 9B:
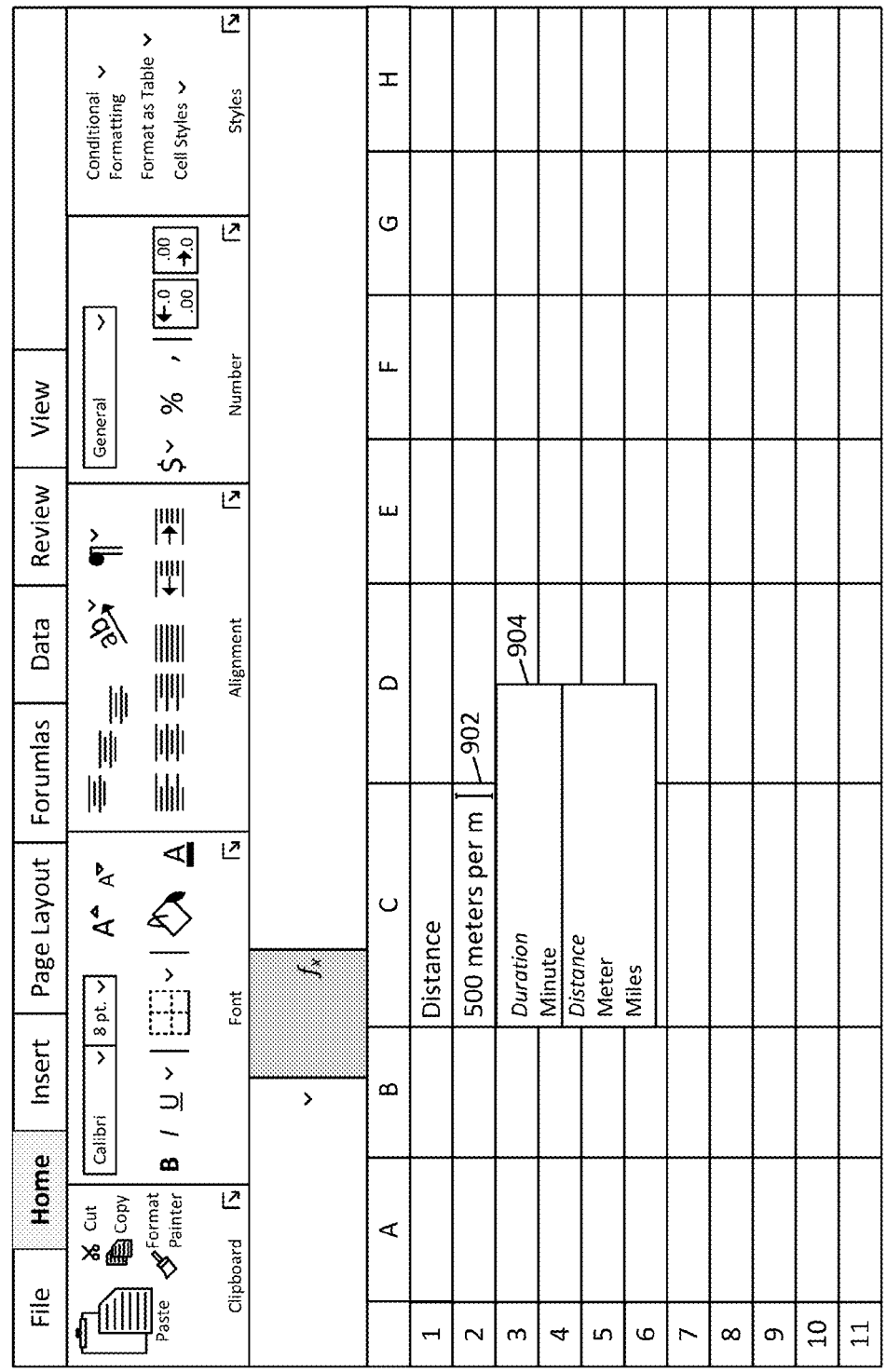

FIGS. 9A-9C illustrate leveraging rich data types in a spreadsheet application to intelligently provide unit suggestions.

In particular, aspects of the present disclosure provide a spreadsheet application that enables the easy and intelligent application of units to values. Specifically, based on an entry of a value to a cell, using a formula bar or other user interface, the spreadsheet application may provide, in real time, a pre-populated list of suggested units from which the user may select to apply.

Referring now to FIG. 9A, illustrated is an example spreadsheet application 110 in which the value "500 m" has been entered into cell C2 902 and a corresponding unit suggestion menu 904 is provided. In an example, based on an entry of a predefined pattern either in a cell, the formula bar 906, or another user interface, the spreadsheet application 110 may provide a unit suggestion menu 904. In an example, the unit suggestion menu 904 is a menu that contains a list of selectable units from which a user may apply to a particular cell. Although a menu is displayed, the suggestion may be returned inline with the cell alongside the value (e.g. "5 m(eters)"). Alternatively or additionally, suggested units may be copied to the cell below when a user starts typing until, for example the suggestion is deleted or it is over-written with a different unit. For example, a user might have multiple values with meter units stored in cells A1-A3. The spreadsheet application may provide a suggestion in cell A4 before the user enters a value in that cell, wherein the hint indicates that the cell A4 is to contain meters based on an analysis and recognition of the pattern of units that the user has previously entered. Accordingly, the spreadsheet application can employ a flash fill type of feature to supply the spreadsheet with appropriate units. Accordingly, although a unit suggestion menu 904 is displayed, this disclosure is not limited to displaying such suggestions within such a menu and can be displayed using other display techniques.

As described herein, suggestions may be displayed based on an identification of an entry that corresponds to a predefined pattern. In an example, a predefined pattern may be, for example, a value followed by a space, or a value followed by a space, and followed by a letter. In the example illustrated in FIG. 9A, the value "500" followed by a space and followed by the letter "m" is provided in cell C2 902. In response to this detected pattern, the spreadsheet application 110 may automatically provide, for example, the unit suggestion menu 904. In this example, the unit suggestion menu 904 provides a list of possible units beginning with the letter "m" and thereby corresponding to the beginning of the unit provided in cell C2 902. In this example, the units provided in the unit suggestion menu 904 are organized by type. In particular, three units (e.g., meters, miles, and millimeters) of the type "distance" are initially provided, followed by two units (e.g., minutes and months) of the type "duration." In some embodiments, the units in the unit suggestion menu 904 are provided based on an understanding of the values stored in the spreadsheet. For example, if the spreadsheet stores a cross country team's statistics, the unit suggestion menu 904 may provide, for example, suggested units of the type "distance" and units of the type "duration" before providing suggested units of the type "temperature." The spreadsheet application may analyze header values and surrounding values, for example, to obtain contextual cues relating to the type of data entered in the spreadsheet in order to intelligently provide suggestions.

Referring back to FIG. 9A, based on a further entry of the unit name or data in the cell providing context such as additional letters, numbers, characters, etc., the list of possible units provided in the unit suggestion menu 904 may change. For example, the list of possible units may filter down to those units that further match the unit entry (for example, if the user continued to type "mi" the list would remove the units "meters" and "months" which do not match the entry "mi"). The list of possible units may alternatively grow with additional units that match the user's entry. Any one of the possible units provided in the unit suggestion menu 904 may be selected. The spreadsheet application 110 may, alternatively, automatically select a best match based on, for example, a confidence level.

In the embodiment in which a value without a corresponding letter is entered (e.g., only the value "500" is entered into cell C2 902), the spreadsheet application 110 may still provide a unit suggestion menu 904 including a list of selectable units. The unit suggestion menu 904 may be intelligently populated with a list of selectable units based on an understanding of the data in the spreadsheet itself. For example, if the spreadsheet contains financial budgeting information, the spreadsheet application 110 may provide a unit suggestion menu 904 containing a list of currency units and duration units, while not providing units relating to distance, weight, or temperature. In other embodiments, the unit suggestion menu 904 may be populated with a list of units based on the units applied to cells in that same column or row or adjacent cells. As described herein, the spreadsheet application 110 may analyze header values and surrounding values, for example, to obtain contextual cues relating to the type of data entered in the spreadsheet in order to intelligently provide suggestions.

The unit suggestion menu 904 may also surface most recently used units. Thus if a user has been using meters for recent entries, that unit may be classified as a most recently used type and be offered, possibly ahead of other units.

It is understood that the particular organization of the unit suggestion menu 904 is merely illustrative and other such organizations are also contemplated by the present disclosure.

FIG. 9B illustrates another example of leveraging rich data types to intelligently provide unit suggestions in a spreadsheet application.

In this particular example, illustrated is a unit suggestion menu comprising compound unit suggestions. Compound units are, for example, units comprising two or more distinct units. Units such as "miles per hour," "dollars per hour," "miles/gallon," "ft. lbs," "kg/sec^2" are examples of compound units. As described herein, based on a user's entry of a predefined pattern, the spreadsheet application 110 may provide a unit suggestion menu including compound unit suggestions.

Referring back to the example illustrated in FIG. 9B, the value "500 meters per" is entered in cell C2 902. The spreadsheet application 110 may identify such an entry as a predefined pattern of a compound unit and therefore suggest, in a unit suggestion menu 904, a list of units that may correspond to the partial value entered into cell C2 902. In particular, the unit suggestion menu 904 may contain a list of possible units that could be matched to a compound unit starting with "meters per" and begin with the letter "m." As described herein, the spreadsheet application 110 may provide a list of possible units in the unit suggestion menu 904 based on an understanding of the data entered into cell C2 902.

In some embodiments, the unit suggestions menu 904 is dynamically updated based on the further entry of data. For example, based on a user's entry of "500 m" the unit suggestions menu 904 may contain a list of possible values such as "meters, miles, minutes, etc." As the user continues to type "500 meters per" the unit suggestions menu 904 may automatically and dynamically update to contain a different list of possible values.

FIG. 9C illustrates the suggestion of units based on supporting information in a spreadsheet.

Suggestions provided in a unit suggestions menu may be based on, for example, information contained in the column or row header, surrounding cells, or an understanding of the information provided in the spreadsheet. For example, the unit associated with the value "3 m" could represent miles, meters, minutes, megawatts, etc. Alternatively or additionally, the value "3" by itself may be associated with any unit of any type. Accordingly, the disclosed spreadsheet application 110 may analyze the column or row within which the cell containing the entered value resides to identify patterns or units indicated in a header, scan surrounding cells, or scan the entire spreadsheet to identify context associated with the entered value in order to narrow and prioritize the list of units provided in the unit suggestion menu 904. The spreadsheet application 110 may further analyze the format of the cell itself or a surrounding cell to further identify context in an effort to narrow or prioritize the list of units provided in the unit suggestion menu 904. For example if the data entered in a cell is "2:10" it is likely representative of a time value rather than a distance value.

The spreadsheet application 110 may also provide and prioritize, in the unit suggestion menu 904 units already used in the spreadsheet or units used in the same row or column. The spreadsheet application 110 may further provide and prioritize units from the same type as used in the spreadsheet or the same row or column. For example, if a column includes values having the unit "feet" and a user types "3 c" the spreadsheet application 110 may provide and prioritize, in the unit suggestion menu 904, the unit "centimeter" which is of the same type ("distance") as the unit "feet" rather than, for example, the unit "Celsius" which is of a different type ("temperature").

The spreadsheet application 110 may further leverage natural language parsing to take contextual clues from column or row headers to provide and prioritize a list of possible units in the unit suggestion menu 904. For example, a cell under a column header having the word "distance" or "miles" is more likely to contain a distance value. Accordingly, the spreadsheet application 110 may provide and prioritize, in the unit suggestions menu 904, units of a distance type.

Additionally, the spreadsheet application 110 may suggest more complex units that have already been applied to cells of the spreadsheet (or applied by the user in another spreadsheet) despite the infrequent usage of such units. For example, the spreadsheet application 110 may suggest the unit "feet/hour" if such a unit was previously applied, despite such a unit being an infrequently used unit. As will be described in further detail herein, the disclosed spreadsheet application 110 may also provide, as a suggestion, user defined units. In particular, a user may construct a unit that is not provided by the spreadsheet application 110. The disclosed spreadsheet application 110 may also suggest such user defined units in the unit suggestion menu 904.

Referring back to FIG. 9C, illustrated is the suggestion of units based on supporting information in the spreadsheet. In this example, cell C1 910 is a column header storing the value "distance." Additionally, cells C2 912 and C3 914 contain numerical values having the unit "meter" which are of type "distance." Accordingly, in this example, as the user types the value "500" into cell C4 916, the spreadsheet application 110 initially suggests, in the unit suggestion menu 904, values that are of the type "distance." In this particular example, because the values stored in cells C2 912 and C3 914 have the unit "meter," the unit suggestion menu 904 prioritizes the suggestions to initially suggest "meter." Still further, the unit suggestion menu 904 provides suggested units that belong to the "distance" type, such as, for example, feet, inches, miles, and millimeters. Accordingly, it is understood that the spreadsheet application 110 suggested such units based on the supporting information in the spreadsheet.

In another example, based on a high confidence that the unit to be applied should be "meter," because all units in that column are "meter," the unit suggestion menu 904 may not display alternative suggestions. Even more, based on entry of the value "500," the unit "meter" may automatically be applied. Accordingly, faster data entry may be achieved.

The spreadsheet application 110 may further analyze supporting information in order to assist the user in correcting potential errors. For example, if the value "4 kg" is entered in a cell of a column containing, for example, values having different units or values having units of a different type, the spreadsheet application 110 may suggest alternative units to maintain consistency.

Accordingly, the disclosed spreadsheet application 110 is capable of automatically and dynamically providing a user with a narrow and prioritized list of suggested values to assist the user in data entry. Providing such a list of units that may be quickly and easily applied to the particular cell or cells enables the user to more efficiently enter data into a spreadsheet. Furthermore, providing such a list of possible values based on an intelligent understanding of the data entered and the surrounding data reduces the risk of erroneously applying the wrong unit to a cell.

Figure 10:
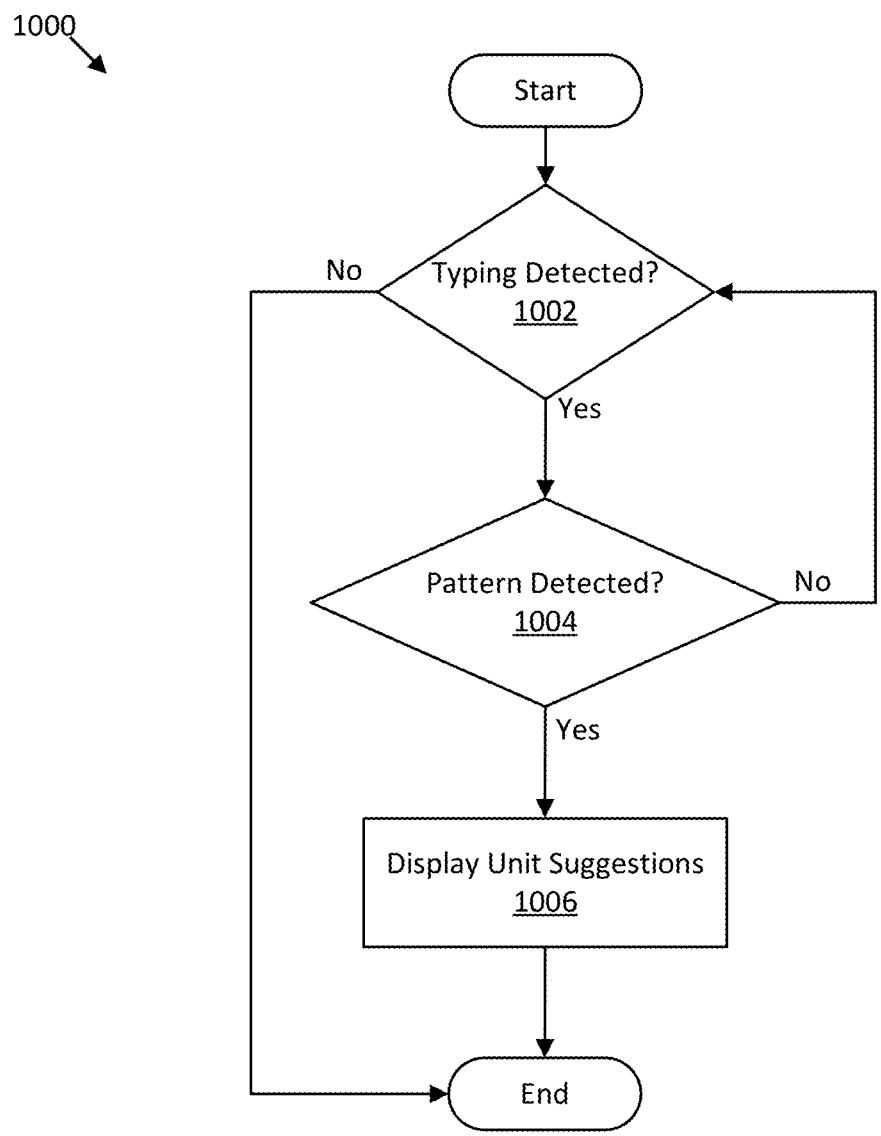
FIG. 10 illustrates a method of suggesting units using rich data types, as illustrated with reference to FIGS. 9A-9C.

FIG. 10 illustrates a method of suggesting units using rich data types, as illustrated with reference to FIGS. 9A-9C.

The method 1000 begins at a start operation and proceeds to the typing detected decision operation 1002. In the typing detected decision operation 1002, the spreadsheet application (e.g., spreadsheet application 110) identifies whether a value is being entered into a cell, formula bar, or other value entry user interface. If the spreadsheet application 110 determines that no typing is detected (NO at operation 1002), the method 1000 ends.

If the spreadsheet application determines that typing is detected (YES at operation 1002), the method 1000 proceeds to the pattern detected decision operation 1004. In the pattern detected decision operation 1004 an identification component (e.g., pattern detection component 116) determines whether the entry matches a predetermined pattern. For example, a predetermined pattern may be the entry of a value followed by a space, or the entry of a value followed by a space, and followed by a letter. A predefined pattern may further be the entry of a value followed by a space, followed by a unit, followed by "per" or "/". A pattern may also be described as a pattern of values entered in the spreadsheet, such as, for example, units entered in surrounding cells, units or type information provided in header cells, etc. If the pattern detection component determines that no pattern is detected, the method 1000 proceeds to the typing detected decision operation 1002.

If the pattern detection component determines that a pattern is detected (YES at operation 1004), the method 1000 proceeds to the display unit suggestions operation 1006. In the display unit suggestions 1006 a display/UI component (e.g., display/UI component 116) may display units in a unit suggestion menu, such as unit suggestion menu 904 illustrated in FIGS. 9A-9C. In other embodiments, a separate unit suggestion menu may not necessarily be displayed, but rather, units may be suggested within the particular cell. As described herein, the unit suggestion menu may identify relevant units based on, for example, the user's entry of letters, formatting, analysis of data stored in the spreadsheet, most frequently used units, etc. Based on a display of suggested units, the method 1000 ends.

If the pattern detection component determines that a pattern is not detected (NO at operation 1004), the method 1000 proceeds to the typing detected decision operation 1002. Accordingly, if no pattern is detected, further entry of a value or unit information may need to be provided to detect a pattern in the pattern detected operation 1004.

As should be appreciated, operations 1002-1006 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 11A:
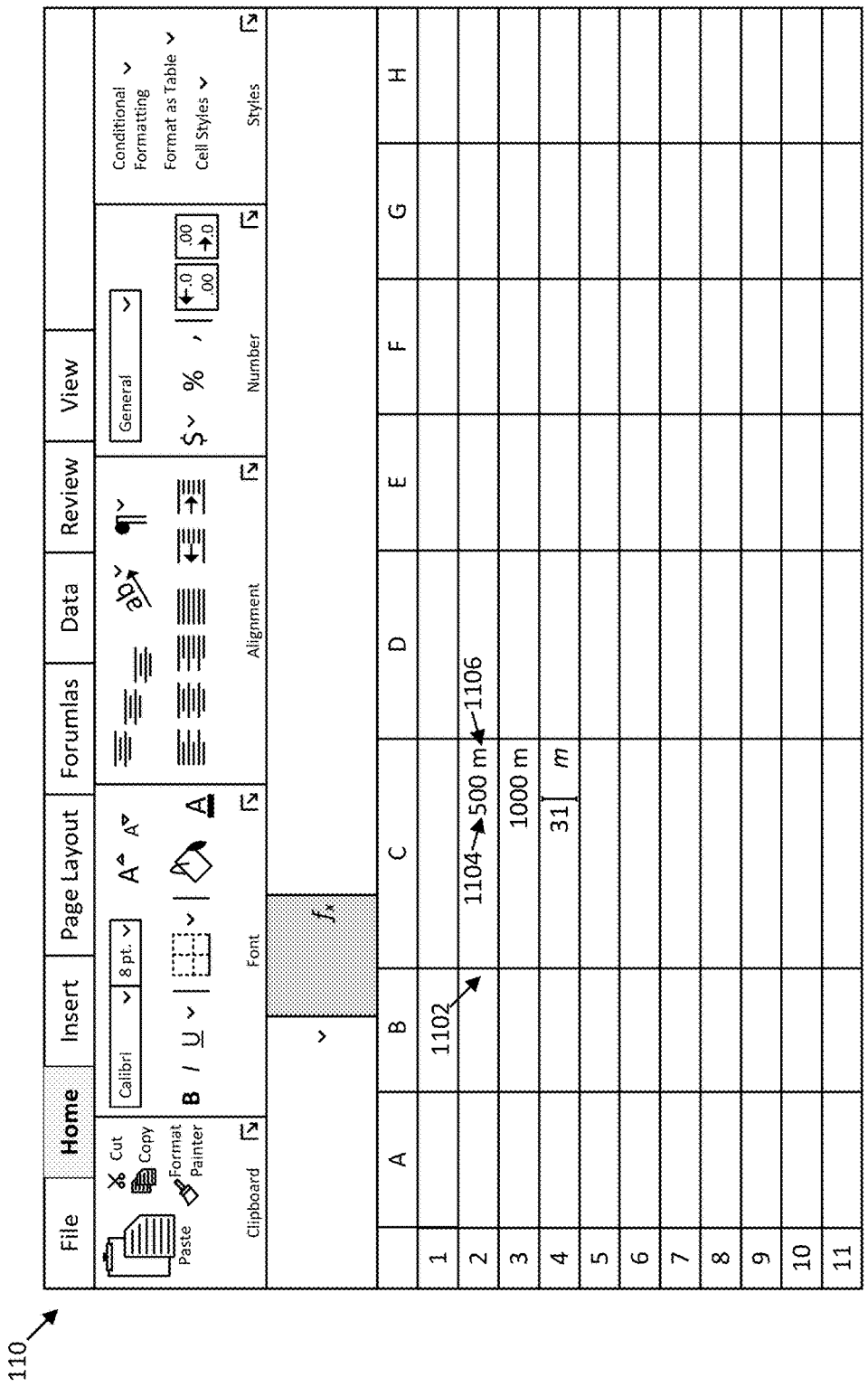
FIG. 11A illustrates an edit mode that allows value editing while maintaining unit information in a spreadsheet application.

FIG. 11A illustrates an edit mode that allows value editing while maintaining unit information in a spreadsheet application.

In an example embodiment, the disclosed spreadsheet application includes an edit mode that allows entry of values into cells while maintaining the unit associated with those cells. Such an edit mode allows users to more efficiently and quickly enter data without requiring the user to re-type the unit for each entry in a different cell. For example, a user may edit or add a value to a cell without deleting the associated unit.

Referring back to FIG. 11A, illustrated is an example embodiment of the spreadsheet application (e.g., spreadsheet application 110) in edit mode. In the example edit mode, each cell 1102 displays a value part 1104 and a unit part 1106. In this embodiment, the unit part 1106 is displayed as a text string within the cell. In edit mode, the unit part 1106 (e.g., "m") is maintained and does not change while the value part 1104 (e.g., the numerical value) is editable. In some embodiments, upon exiting the edit mode, the user may edit the unit part 1106. Accordingly, because the user does not have to re-enter the associated unit while in edit mode, the user can quickly and efficiently enter data into the spreadsheet. In some embodiments, a user interface may be provided to enter the edit mode, wherein the user indicates the desired unit for a particular row or column. In other embodiments, the edit mode may be entered into without indicating the particular unit to be applied. For example, if two or more values having the same unit or type are entered in a column, the spreadsheet application may automatically identify the pattern and apply that same unit or type to the entire row or column.

Furthermore, in an example embodiment, if a user edits the unit part, then the value may be converted. In this example, if the user enters "5 feet" in a new cell within the column of values corresponding to meters, the new value might be converted to a corresponding value in meters so as to maintain consistency with the other values in the same column. In another example, if the unit part of a previously entered value is edited, then the corresponding value may be converted to the new unit. In such examples, the conversion may be done automatically or it may be converted in response to user input.

Figure 11B:
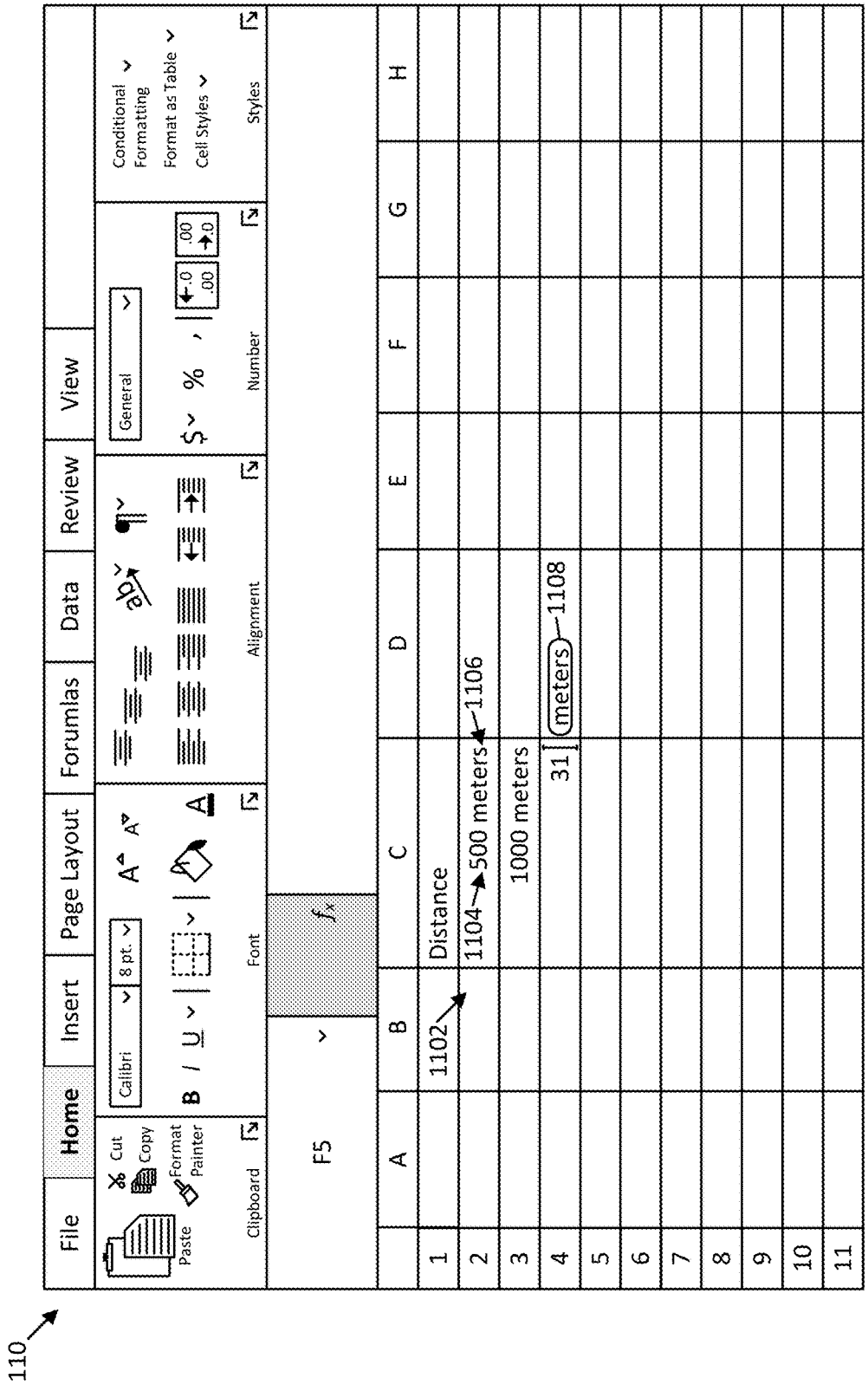
FIG. 11B illustrates an alternative example of an edit mode that allows value editing while maintaining unit information in a spreadsheet application.

FIG. 11B illustrates an alternative example of an edit mode that allows value editing while maintaining unit information in a spreadsheet application.

In this alternative embodiment, the unit part is displayed as a token 1108. In embodiments, the token 1108 may be a selectable user experience that is positioned outside of the cell in which the value part 1104 resides, however the token 1108 may also be positioned within the cell. The token 1108 may be a user experience that, when selected, provides options to edit the displayed unit or delete the token entirely. Similar to the example illustrated in FIG. 11A, the user may edit or add data to the value part 1104 without editing or changing the unit displayed in the token 1108. Accordingly, because the token 1108 maintains the displayed unit, the user can quickly and efficiently enter data into the spreadsheet.

Figure 12A:
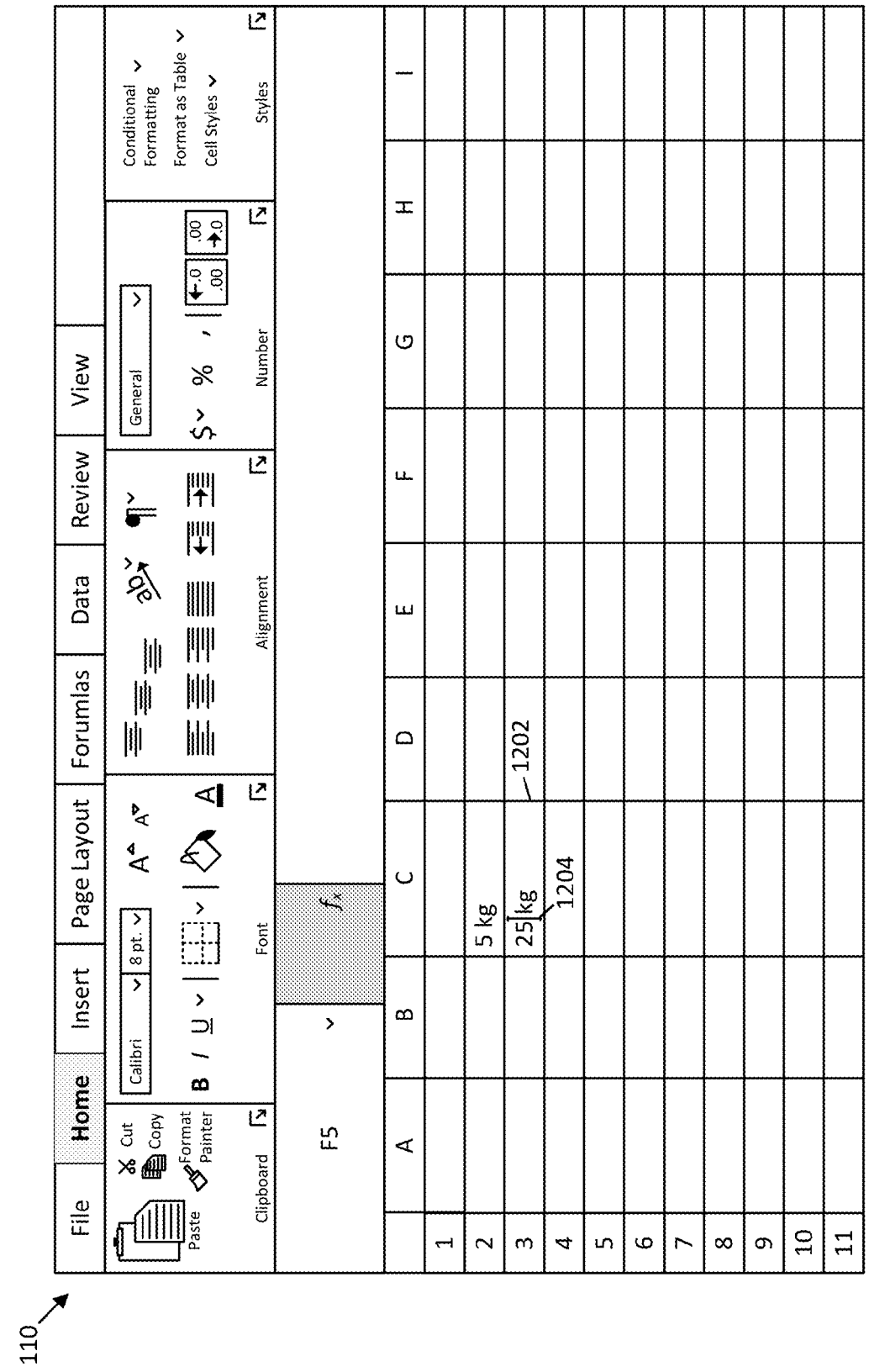
FIG. 12A and FIG. 12B illustrate overtyping unit information in a spreadsheet application.
Figure 12B:
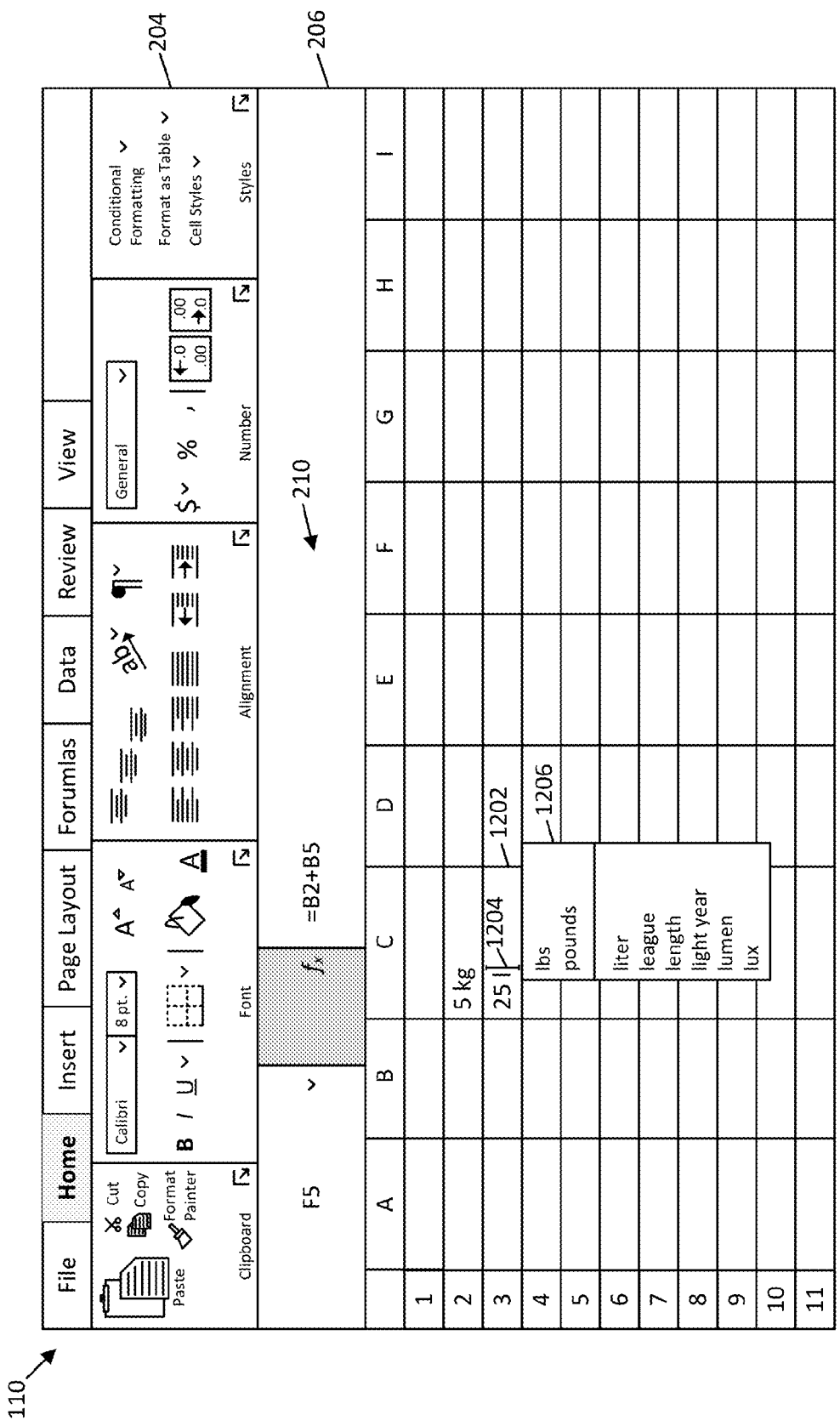

FIG. 12A and FIG. 12B illustrate overtyping unit information in a spreadsheet application.

Overtyping is the ability to delete or edit the unit part of a cell. As described with reference to FIG. 11A and FIG. 11B, it may be valuable to maintain unit information in a cell and not require users to constantly re-enter units in order to facilitate quick data entry. However, aspects of the present disclosure also allow a user to quickly edit or delete units.

In the example illustrated in FIG. 12A, a value is stored in cell C3 1202. In particular, the value "25" is entered into cell C3 1202, as indicated by the position of the cursor 1204 between the value "25" and corresponding unit "kg." In this example, the unit "kg" may be maintained, deleted, or edited. The unit "kg" may be maintained, for example, by simply pressing the 'enter' key, selecting another cell, tabbing to another cell, etc. The unit "kg" may be deleted, for example, by selecting the delete key, highlighting the unit and selecting a delete function, right clicking and selecting a delete option, etc. The unit "kg" may also be edited, for example, by continuing to type the name of another unit, as illustrated further in FIG. 12B.

In the example illustrated in FIG. 12B, the unit "kg" that was previously illustrated in FIG. 12A has been deleted and replaced by the letter "l." In this example, in response to such entry, the spreadsheet application 110 provides a unit suggestion menu 1206 that includes a list of selectable units that could be applied to that cell. As described herein, units provided may be based on the entered letter (e.g., units starting with the entered letter "l"), units within the type of the previously entered unit (e.g., units within the "weight" type), units applied to other cells in the same row or column, etc. Accordingly, the disclosed spreadsheet application 110 provides the ability to quickly and efficiently edit unit information within cells.

Figure 13A:
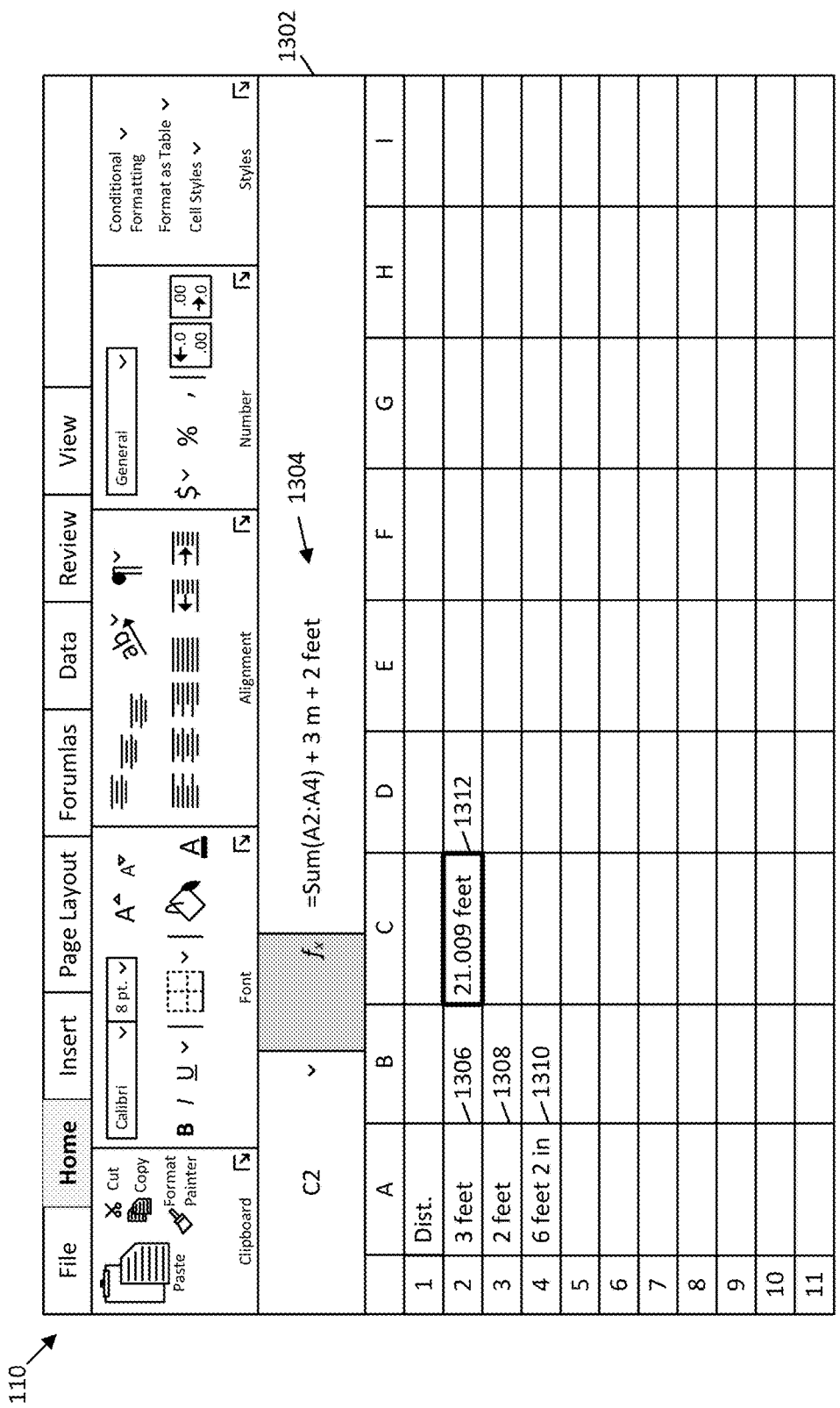
Figure 13B:
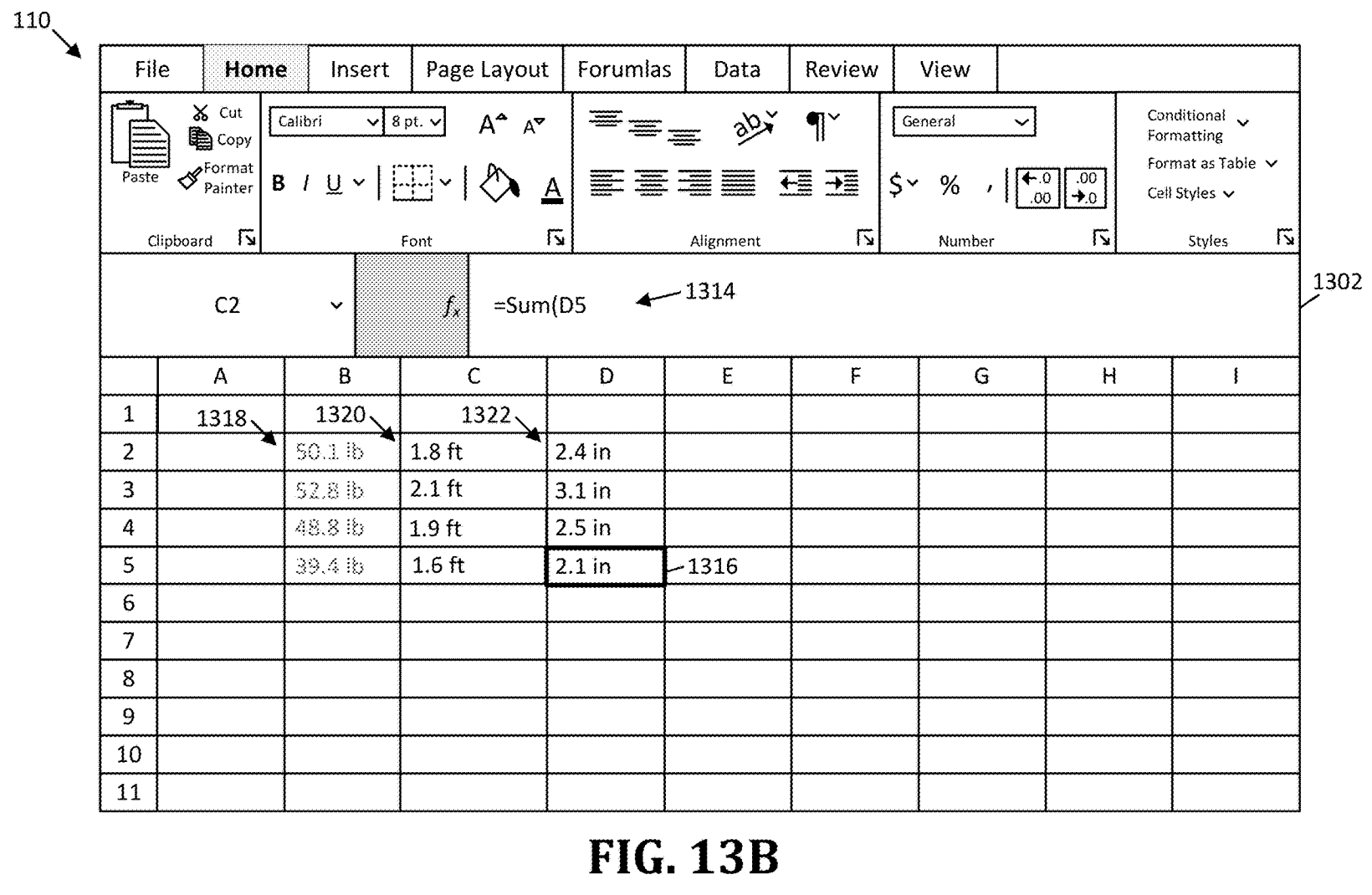

FIG. 13A and FIG. 13B illustrate leveraging rich data types in formula string creation.

As described herein, the spreadsheet application provides the ability to provide rich data values in a spreadsheet. The spreadsheet application further provides the ability to provide and parse rich data values into the formula bar of the spreadsheet application. The formula bar is a toolbar that displays values and formulas associated with a selected cell. The formula bar also provides the ability to enter and edit values and formulas in a cell or range of cells. The disclosed spreadsheet application also provides the ability to display, enter, and edit rich data values in a cell or range of cells using the formula bar.

As described herein, a problem with current spreadsheet applications is the blind performance of calculations without regard for unit information, yielding unpredictable, and oftentimes erroneous results. The present spreadsheet application 110 solves this problem by identifying the unit or type associated with each parameter listed in a formula and performing, if necessary, any conversions prior to the calculation, thereby reaching a correct result. Referring back to FIG. 13A, illustrated is a formula bar 1302 displaying a formula 1304 associated with cell C2 1312. The formula 1304 is a sum function adding five parameters: cell A2 1306 (containing value "3 feet"), A3 1308 (containing the value "2 feet"), A4 1310 (containing the value "6 feet 2 in"), and values not associated with cells (e.g., the value "3 m" and the value "2 feet"). The spreadsheet application 110 parses each parameter of the formula 1304 in order to identify each value and corresponding unit or type. Such parsing may be done in real time. For example, as a user enters data and not just on committing the value (e.g., based on selection of the enter key).

In this particular example, the formula 1304 is a sum function, which requires all parameters to have the same unit in order to perform the calculation correctly. As described herein, the formula 1304 is a sum function adding five parameters: cell A2 1306 (containing value "3 feet"), A3 1308 (containing the value "2 feet"), A4 1310 (containing the value "6 feet 2 in"), the value "3 m", and the value "2 feet." As illustrated in this example, the parameters of the formula 1304 are of the same type "distance" but do not have consistent units. In particular, the values stored in cells A2 1306, A3 1308, and the value "2 feet" are of unit "feet;" the value stored in cell A4 1310 is a compound unit including the units "feet" and "in;" and the value "3 m" is of the unit "m." Accordingly, the disclosed spreadsheet application 110 must first convert the values to a common unit before adding the values. The disclosed spreadsheet application 110 may first parse the formula 1304 to identify each parameter and the unit or type associated therewith. For each cell parameter (e.g., cells A2-A4) referenced in the formula 1304, the spreadsheet application 110 may look to the associated unit/value table (e.g., unit/value table 206) and the reference table (e.g., reference table 300) of the cell to ascertain the associated unit or type. The spreadsheet application 110 may further parse the formula 1304 to identify parameters that are not stored within a particular cell and therefore do not have an associated unit/value table. For example, the formula 1304 includes the parameters "3 m" and "2 feet" that are not associated with a cell. The spreadsheet application 110 may, for example, implement language parsing to identify both the value and the unit or type of such parameters. Accordingly, the spreadsheet application 110 may convert values to a common unit in order to perform calculations correctly. Converted values may be temporarily stored in cache in order to perform the calculation so as to not modify the actual values stored in the spreadsheet. In this example the result is provided in cell C2 1312. In this example, the result is provided as a value having the unit "feet," however the value may be provided in another unit, as desired.

For those parameters of the formula 1304 that are not stored in a cell (e.g., the parameter "3 m" and "2 feet"), the spreadsheet application 110 may implement language parsing to identify the unit of such parameters (e.g., "m" and "feet"). The spreadsheet application 110 may use a reference table, such as reference table 300 to match the unit of those parameters to a unit stored in the reference table 300. As is also illustrated, the unit "m" is written in shorthand and the unit "feet" is written fully. The disclosed spreadsheet application 110 can recognize such units written in different formats. In an example, the spreadsheet application 110 can use the reference table 300 in conjunction with an understanding of the context of the formula 1304 to most closely match the associated unit. For example, the spreadsheet application 110 may correlate the shorthand unit "m" to the unit "meter" rather than, for example, the unit "mile" which also begins with the letter "m," based on an understanding of the units used in the formula 1304. In particular, the spreadsheet application 110 may associate "m" to "meter" rather than "mile", for example, because of an analysis of the units used in the formula 1304 correspond to shorter distances. The spreadsheet application 110 may also notify the user of the selected unit and provide an option to change the unit.

Accordingly, aspects of the present disclosure leverage the disclosed conversion tables, such as reference table 300, to support rich data types in formula string creation.

FIG. 13B illustrates another example of leveraging rich data types in formula string creation.

The disclosed spreadsheet application can leverage rich data types to guide users in creating valid formulas. As described herein, the disclosed spreadsheet application 110 can leverage rich data types to recognize the type of values stored in the spreadsheet. In an example, the spreadsheet application 110 can leverage the unit/value table associated with each cell storing a rich data value to recognize the unit or type associated with each value. Accordingly, in the example embodiment illustrated in FIG. 13B, the function 1314 (e.g., "=Sum(D5") is a sum function and only one parameter to that function 1314 has been entered, which is a reference to cell D5 1316 (e.g., "2.1 in"). Based on an understanding that the sum function requires each parameter to be the same type and based on an understanding of the value and the units and types associated with those values, the spreadsheet application 110 can guide the user in creating a valid formula. In this example, based on an entry of the cell reference of the first parameter, knowledge of the value stored therein, and the associated type and unit, the spreadsheet application can dynamically suggest valid values to enter as the remaining parameters. In an example, the spreadsheet application 110 may provide a visual indication of cells that may be valid input parameters by, for example, dimming out cells having values that would return an erroneous result if applied to the formula and only allowing the user to select valid parameters for that particular formula. Accordingly, in this example, because the first parameter references cell D5 1316, the spreadsheet application 110 has dimmed out the weight values stored in column A 1318 because the result of a distance value to a weight value would return an erroneous result. Alternatively or additionally, the spreadsheet application 110 did not dim the distance values stored in column C 1320 and column D 1322.

In another example, the user may be in the process of providing a cash flow formula having parameters such as "total income" and "total expenses." In such an example, the cash flow function requires that the input parameters be of the same type (e.g., currency) and requires specific currency values to be used for each parameter (e.g., income values can only be used for the first parameter and expense values can only be used for the second parameter). Accordingly, in such an example, the cells having a type different from the required currency type may be dimmed out (e.g., the cells containing text). Even further, cells that store currency values that correspond to expenses may also dimmed out for the first parameter because the first parameter to be provided is an income value (or values), while income values may be dimmed out for the second expense parameter. Accordingly, the user may easily see which values are available to use during construction of the formula. The user may select a cell or a range of cells, which individually correspond to income or expenses or the user may select a cell storing a total income or a total expenses value. Although highlighting and dimming cells is illustrated in FIG. 13B and described in this example, it is understood that other indications may also be used to indicate valid and invalid input parameters. For example, the spreadsheet application 110 may highlight, mark, textually indicate, or otherwise emphasize those cells storing valid input parameters. Alternatively or additionally, the spreadsheet application 110 may fade, blank out, strike through, or otherwise deemphasize those cells storing invalid input parameters. Although this example illustrates the emphasizing and dimming features relating to the creation of a formula in the formula bar 1302, it is understood that aspects of the present disclosure are also directed to supporting such features for formulas that are entered directly into cells.

Such features to emphasize or deemphasize cells during formula construction allow users to readily and easily see valid input parameters. This further minimizes errors by minimizing the risk that an invalid input parameter might be entered.

Figure 14A:
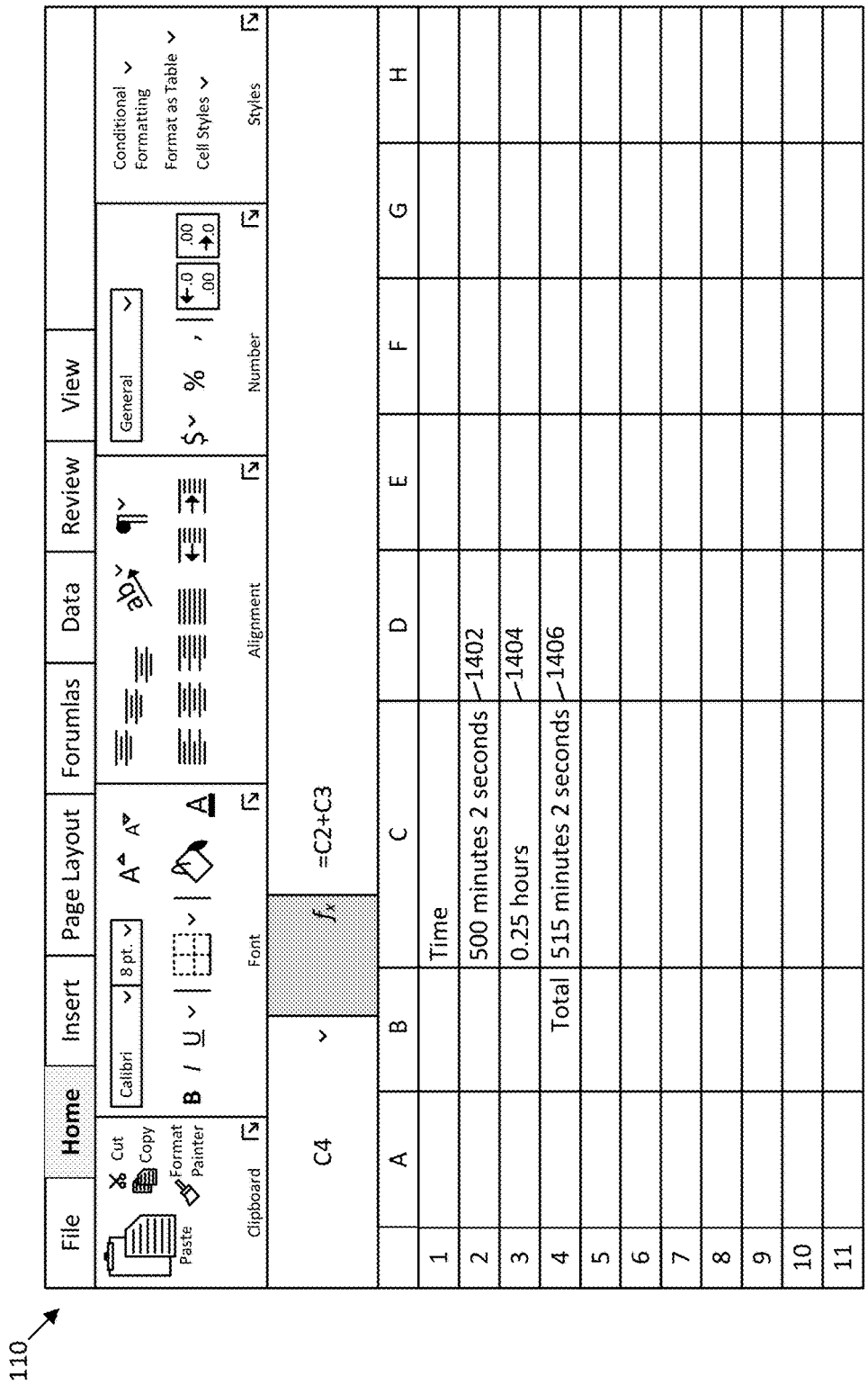
FIG. 14A and FIG. 14B illustrate treating compound values as a single value.
Figure 14B:
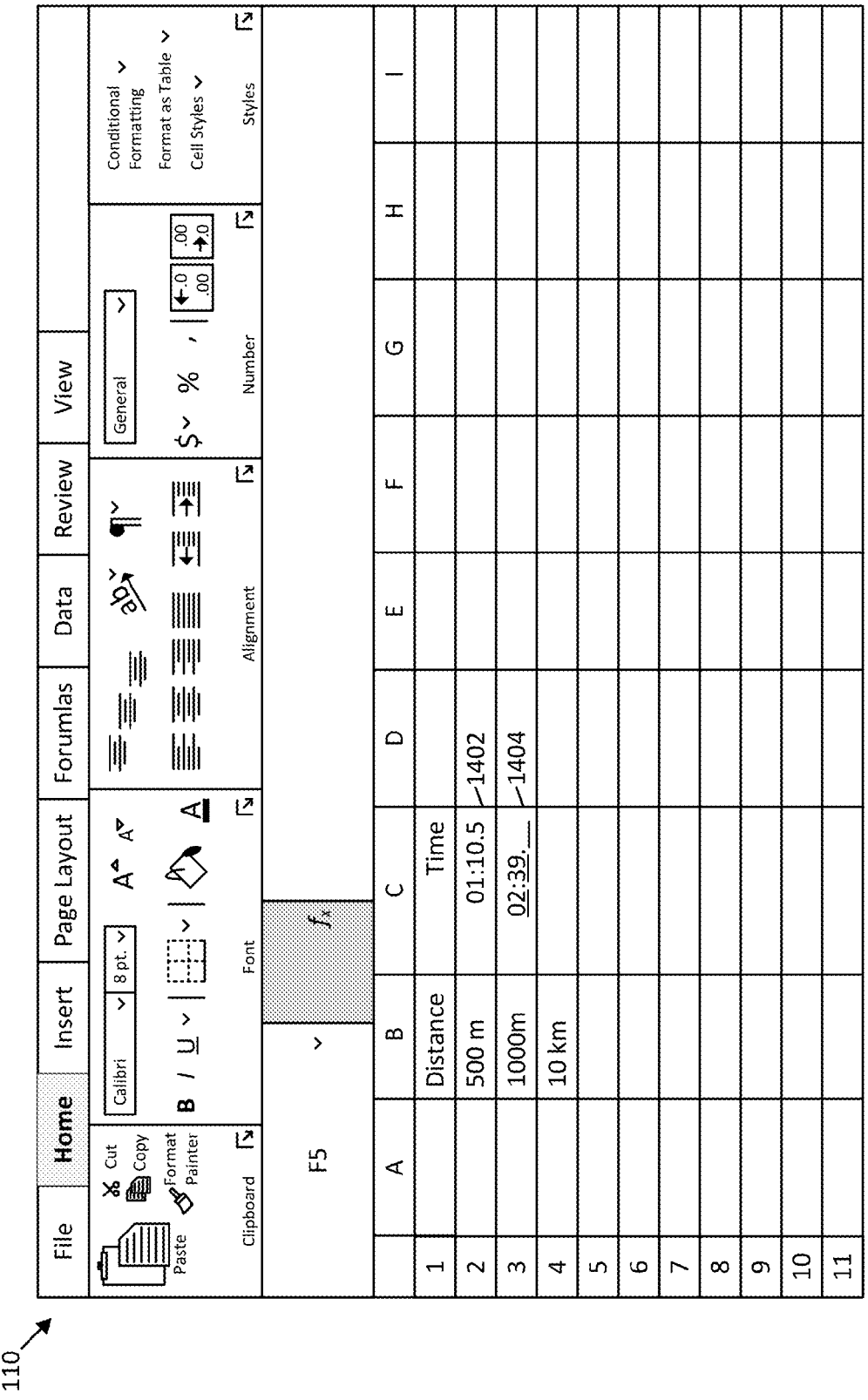

FIG. 14A and FIG. 14B illustrate treating compound values as a single value.

The disclosed spreadsheet application 110 enables users to provide compound values in the spreadsheet, wherein a compound value includes multiple values and associated units or types (e.g., "1 minute 23 seconds" or "3 years 40 days"). In embodiments, the spreadsheet application 110 treats a compound value as a compound object, which is, for example, a data value described in U.S. Provisional Patent Ser. No. 62/249,884, entitled "Compound Data Types" and in U.S. Provisional Patent Ser. No. 62/357,292, entitled "Compound Data Objects" the disclosures of which have been incorporated herein by reference in their entirety. As described therein, a compound object is a value that stores multiple values in a single cell, wherein those multiple values may be rich values and are organized according to a defined structure. Accordingly, in some embodiments, compound values are stored as compound objects comprising two or more values and associated units (e.g., "3 days 2 hours 7 minutes", "4 feet 7 inches", "3 meters per 2 feet") or types into a single cell and organized according to a defined data structure. For example, the value "1 minute 2 seconds" may be stored in a compound object as an array of unit/value pairs (e.g., unit=minute, value=1; unit=second, value=2) or a single unit/value pair (e.g., unit=second, value=62). In some embodiments, the units or types associated with each of the two or more values differ and in other embodiments, the units or types are the same.

In an example embodiment, the spreadsheet application 110 parses compound values, which may be treated like compound objects, to identify each individual value stored therein. Identification of each value and associated unit or type of a compound value allows the spreadsheet application 110 to pass the compound value to a formula, perform conversions on those compound values, provide autosuggestions for compound value completion, etc. As will be appreciated, each individual part of the compound value can be operated on or edited independently as well as the sum total of the individual components of a compound value. For example, the value "5 days 4 hours 32 minutes 17 seconds" can be converted to a single unit of time and used by some other cell or feature of the spreadsheet application, while in other embodiments, the "4 hours" part can be individually referenced.

Now referring to FIG. 14A, illustrated is an example that uses a compound value in a formula. In this example, a compound value (e.g., value "500 minutes 2 seconds" stored in cell C2 1402) is added to a non-compound value (e.g., the value "0.25 hours" stored in cell C3 1404) to arrive at a result in a compound value format. The resultant compound value (e.g., 515 minutes 2 seconds) is stored in cell C4 1406. Although in this example the result is displayed as a compound value, the result may also be provided as a single value.

As illustrated, the compound value "500 minutes 2 seconds" includes two units: minutes and seconds. In an example, the spreadsheet application 110 parses the compound value to identify each unit as well as each associated value. Based on this identification, the spreadsheet application 110 can use the disclosed reference table, such as reference table 300 as illustrated in FIG. 3 to determine context associated with the different units. For example, the spreadsheet application 110 can determine that the minutes and seconds units are of type "duration." The spreadsheet application 110 can further determine the conversions between those two units (e.g., there are 60 seconds in a minute, divide by 60 to convert a value in seconds to a value in minutes, multiply by 60 to convert a value in minutes to a value in seconds, etc.). Alternatively, the spreadsheet application may use a service via the calling of an API, as described herein. Furthermore, an API may be called to verify the validity of units and to verify conversions.

In the illustrated example, the compound value "500 minutes 2 seconds" stored in cell C2 1402 is added to the non-compound value "0.25 hours" stored in cell C3 1404. In this example, the two values are passed to the sum function, which requires the values to have common units. Accordingly, the spreadsheet application 110 can, for example, convert the compound value "500 minutes 2 seconds" to a single value in "hours." In other embodiments, both values can be converted to another common unit. In some embodiments, the converted values can be stored in a cache so that the spreadsheet application 110 can maintain the original values in the cells while performing the final calculation. In other embodiments, the spreadsheet application 110 can change the original values in the cells to the converted values. In this example, based on a conversion to a common unit, the spreadsheet application 110 can perform the sum function operation to arrive at a valid result, stored in cell C4 1406. In this embodiment, the resultant value stored in cell C4 1406 is a compound value "515 minutes 2 seconds", however in other embodiments, the resultant value may be displayed as a single value in "hours." In some embodiments, the user may specify the desired unit (or units for compound values) in which the result is to be displayed, and in other embodiments, the spreadsheet application 110 may provide the result in a predetermined unit. Accordingly, the disclosed spreadsheet application 110 enhances the user's experience by allowing the user to enter data as it is naturally written without requiring the user to perform any conversions.

In some embodiments, the spreadsheet application 110 may tokenize the units of a compound value to provide an enhanced editing experience. As described herein, a token is a selectable user experience that displays a unit and may be positioned next to the value in which that unit represents. In some embodiments, the token, when selected, provides options to change the displayed unit to another unit within the same type or delete the unit entirely. If a user changes the unit displayed on the token, the corresponding value will also change. For example, a cell may store the value "60 minutes 5 seconds" wherein the "minutes" and "seconds" units are tokenized. In such an example, the user may elect to change the "minutes" unit to "hours" which would change the "60" value to "1". In other words, the spreadsheet application 110 would convert the value "60 minutes" to "1 hour" to thereby display "1 hour 5 seconds" in the cell.

Referring now to FIG. 14B, illustrated is an example in which the disclosed spreadsheet application 110 leverages rich data types to guide the user in entering data in an appropriate display pattern. In particular, the spreadsheet application 110 can leverage rich data types to determine appropriate display patterns in which certain data may be entered and guide the user in entering data accordingly. As described herein, a value being of a rich data type is defined as a type of data that has context and established relationships with other types of data. Accordingly, a rich data type is a data value having associated context, which may be units (e.g., inches, miles, meters, kilograms, seconds, joules, hertz, Fahrenheit, etc.) or other information about the data's type (e.g., city, stock, NCAA football team, car, restaurant, school, etc.). The information about a data's type may further include, for example, display patterns. For example, a Social Security type may have a particular display pattern, such as a series of 9 digits separated by dashes (e.g., _ _ _-_ _-_ _ _ _). In another example, "credit card" type may have a particular display pattern and may even have multiple display patterns depending on the issuing company or bank. Each credit card may exhibit a particular display pattern (e.g., one credit card may have the following pattern _ _ _ _-_ _ _ _ _-_ _ _ _ while another credit card may have the following, different pattern _ _ _-_ _ _ _ _ _-_ _ _ _ _). In another example, the "duration" type may have units that each have a particular display pattern (e.g., 2:10 may identify a time of day; 4:10:50 may represent hours, minutes, seconds, etc.). In another example, a person type may also exhibit a pattern (e.g., [Last Name] [First Name], [Middle Initial]). Such display patterns may be stored in, for example, a reference table such as reference table 300 illustrated in FIG. 3.

Accordingly, by understanding the type, the spreadsheet application 110 can provide a user experience that guides the user in entering such information in the appropriate display pattern. In an example, if a type having a particular display pattern is detected based on, for example, an analysis of the data stored in the spreadsheet, column or row headers, etc. the spreadsheet application 110 can provide a user experience to assist the user in entering data in the appropriate format. In another example, a user may set a particular cell, cells, column, or row to a particular type. Based on an understanding of the type, the spreadsheet application 110 can provide, for example, blank spaces, dashes, colons, or other types of display formatting that allows the user to visualize the display pattern and guides the user in entering data. As illustrated in FIG. 14B, a time value is stored in cell C2 1402 having a particular display pattern of [Hours]: [Minutes].[Seconds]. In this example, the spreadsheet application 110 can detect the value stored in C2 1402 and identify the associated display pattern. Alternatively or additionally, the spreadsheet application can identify the "Time" header to detect the type of data, and associated display pattern, to be stored in that particular column. Accordingly, as the user enters data into cell C3 1404, the spreadsheet application 110 provides the corresponding display formatting to guide the user while entering the data into the cell. In this example, the display pattern provided by the spreadsheet application 110 is in the form of space marks for each digit, a colon that separates the hours value from the minutes value, and a period designation that separates the minutes value from the seconds value. In this example, the colon and period designation of the display pattern is maintained after the user enters the data into the cell, however in other embodiments, such designations are not maintained.

Alternatively or additionally, the particular display pattern may be applied to data previously entered. In particular, if data was previously entered and a user, for example, sets that particular cell, cells, column, or row containing that data to a particular type, the value may change display accordingly. Furthermore, the spreadsheet application 110 can provide an "overtype" experience that queries the user to change the type or notify the user that a strict type pattern is violated. In an example, the spreadsheet application 110 can warn the user when a non-numeric character is entered in a cell that is of a credit card type that has no non-numeric characters. The spreadsheet application 110 may also implement display patterns for user-defined units and types.

Further aspects of the present disclosure provide the ability for a user to enter data into the spreadsheet and receive a different display representation of that data. For example, based on the determination, by the spreadsheet application 110, of a cell or cells associated with a type having a particular display pattern, the spreadsheet application 110 can return a display representation of entered data in the identified display pattern. For example, if the spreadsheet application 110 determines that a cell is of the credit card type, the spreadsheet application 110 may return a display representation of those numbers in the appropriate pattern. In another example, the spreadsheet application 110 may determine that a column is of the type "distance" having a particular pattern (e.g., "_ feet _ inches") the spreadsheet application 110 can receive values, which may be in a particular pattern, such as, for example, "3'7"," and return a display representation of that entry as "3 feet 7 inches." In yet another example, based on a determination that a cell storing the name of a city is of the type "geo-location," the spreadsheet application 110 may return a display rendering of a map indicating the location of that city. Such a display rendering may be obtained from, for example, calling an API for an online service that can provide such a display rendering.

Figure 15A:
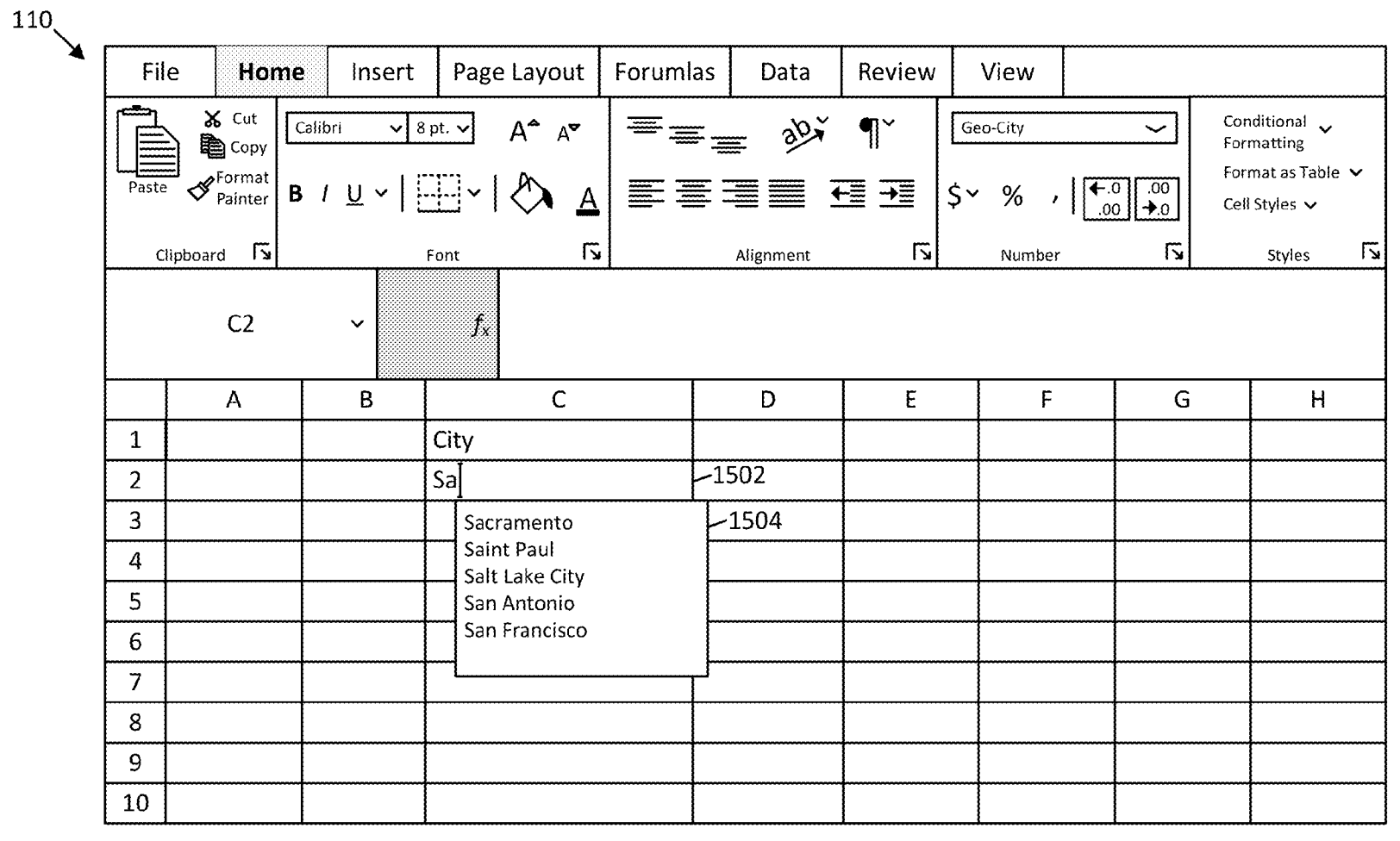

FIG. 15A illustrates leveraging rich data types to provide an enriched data experience in a spreadsheet application.

An enhanced understanding of the type of data that is present facilitates improved autosuggest results when entering data. As described herein, the disclosed spreadsheet application 110 includes types, including, for example, a geo-location type that includes, for example, cities, states, provinces, countries, continents, etc. Each geo-location type may additionally have a wealth of context associated therewith, for example, a latitudinal/longitudinal location, population, airport names, airport codes, government information, etc. Such information may be stored in a local or online database that is different from the reference table 300. In particular, the reference table 300 may include a reference to a city, but that reference table 300 may additionally point to a database, either local or online, that stores additional context and relationship information.

Referring back to FIG. 15, illustrated in this example is cell C2 1502 having the geo-city type applied thereto. Based on the applied geo-city type to cell C2 1502, the disclosed spreadsheet application 110 can dynamically provide autosuggestions as the user enters data into that cell. In the illustrated example, the letters "Sa" have been entered into cell C2 1502. In response, the spreadsheet application 110 identifies cities starting with the letters "Sa" and provides the names of those identified cities in an autosuggestion drop-down menu 1504. As described herein, the spreadsheet application 110 may determine such city names by referencing the reference table 300 or a local or online database including the names of cities. Accordingly, the autosuggestion drop-down menu 1504 includes a list of cities that start with the letters "Sa" such as, for example, "Sacramento," "Saint Paul," "Salt Lake City," "San Antonio," and "San Francisco."

Additionally, the disclosed spreadsheet application 110 can use contextual cues from the spreadsheet to prioritize suggestions. For example, if all the cities entered in a particular column are from a particular state, the spreadsheet application 110 can return, based on an analysis of the cities stored in that column, a prioritized list of cities from that state in the autosuggestion drop-down menu 1504

Figure 15B:
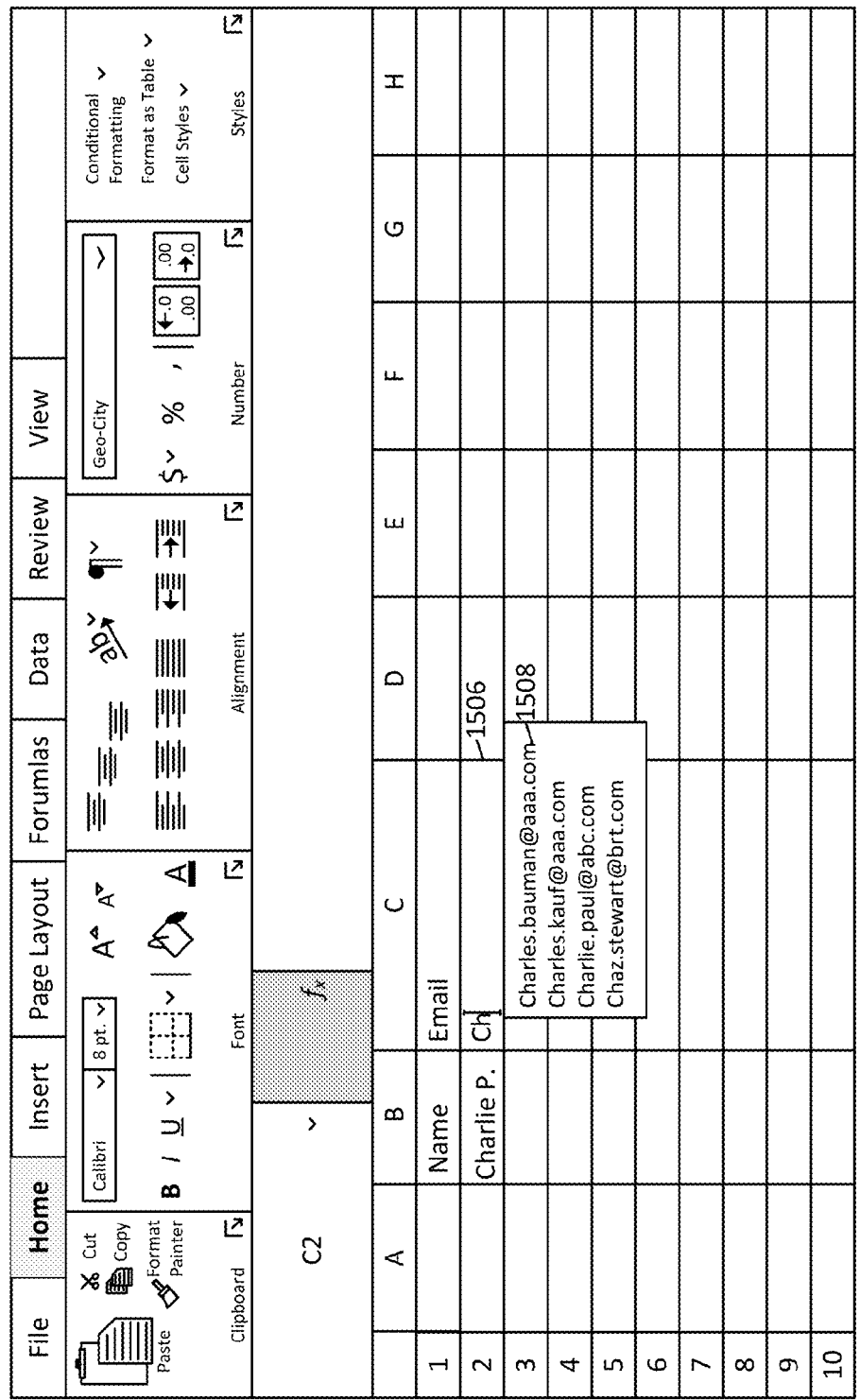
FIG. 15B illustrates leveraging rich data types to provide an enriched data experience in a spreadsheet application.

FIG. 15B illustrates leveraging rich data types to provide an enriched data experience in a spreadsheet application.

As described herein, the disclosed spreadsheet application 110 allows users to define data types (i.e., user defined extensible data types). The spreadsheet application 110 may also allow users to provide data that could be suggested for a given user-defined data type. This suggested data could be stored locally or may be provided from another application or an online service. In the example illustrated in FIG. 15B, "e-mail alias" is a user-defined type having email addresses that are derived from a local database, an email application different from the spreadsheet application 110, an online database, or a combination thereof. Accordingly, based on an entry into a cell having the "e-mail alias" type, the spreadsheet application 110 may provide a list of email addresses, for example. In this embodiment, cell C2 1506 (or one or more cells of the column C) may be set to the "e-mail alias" type. Accordingly, as the user enters the letters "Ch," corresponding email addresses are automatically populated in the autosuggestion drop-down menu 1508, wherein those email addresses are obtained from one or more of the listed sources. Still further, the list may be additionally prioritized based on an analysis of the data in the spreadsheet indicating, for example, that the listed names are all associated with colleagues. Accordingly, the list of email addresses provided in the autosuggestion drop-down menu 1504 may only include, or prioritize, those email addresses associated with colleagues. Additionally, if the spreadsheet application knows the type of the cell is 'E-mail address' and the user is filters to colleagues, the spreadsheet application can also enable the user to simply type a person's name into a cell, for example, and the spreadsheet application will perform a lookup of an email associated with the name of the entered person and suggest the email address.

Figure 16:
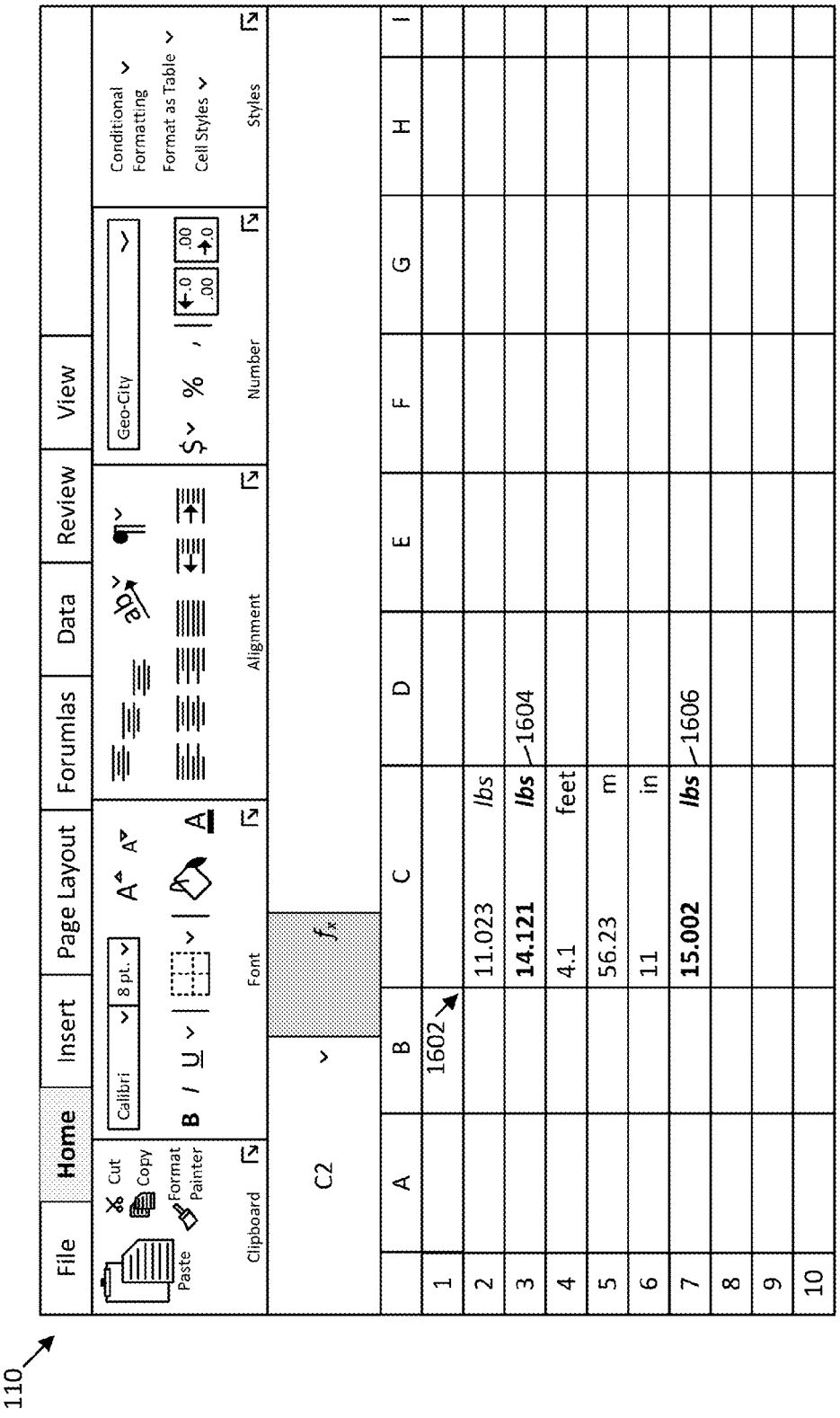
FIG. 16 illustrates enhanced layout control over rich data values in a spreadsheet application.

FIG. 16 illustrates enhanced layout control over rich data values in a spreadsheet application.

In particular, the disclosed spreadsheet application is capable of applying special formatting to rich data values. In an example, cells storing rich data values may be specially aligned such that unit labels are aligned in a particular column. In another example, unit labels may be of a different format, font, or color independent of the associated value (e.g., italicize or color the unit labels). The disclosed spreadsheet application 110 may also provide the ability to have different formats displayed for the same unit (e.g., "meter," "Meter," "m," "M" could be alternatively used for the same unit).

Aspects of the disclosed spreadsheet application 110 also provide the ability to apply formatting based on the unit or value of the cell. For example, a cell that stores a value in a particular unit may be highlighted (e.g., any cells having the unit "lbs" may be highlighted, bolded, or may have different textual coloring). Still further, another cell or cells that store a particular value may be highlighted, in the same or different color (e.g., highlight, color, bold, italicize, underline, or otherwise format all cells having values above, at, or below a particular value).

Referring back to FIG. 16, illustrated is a spreadsheet in which column C 1602 contains various values (weight in pounds and distances in meters, feet, and inches). The unit "lbs" is formatted differently from the associated value. In this particular example, the unit "lbs" is italicized. Still further, in this example, a formatting rule may have been applied to the present spreadsheet, wherein the rule provides that the text of each cell containing a weight greater than 14 lbs is bolded. Accordingly, cell C3 1604 and cell C7 1606, which each store values that are greater than 14 lbs, are provided in bolded text while the remaining values below 14 lbs or any non-weight value include no special formatting.

Accordingly, aspects of the present disclosure provide a user with the ability to apply enhanced layout control over rich data values. Such control provides the ability to quickly and easily understand the type of data stored in the spreadsheet.

Figure 17:
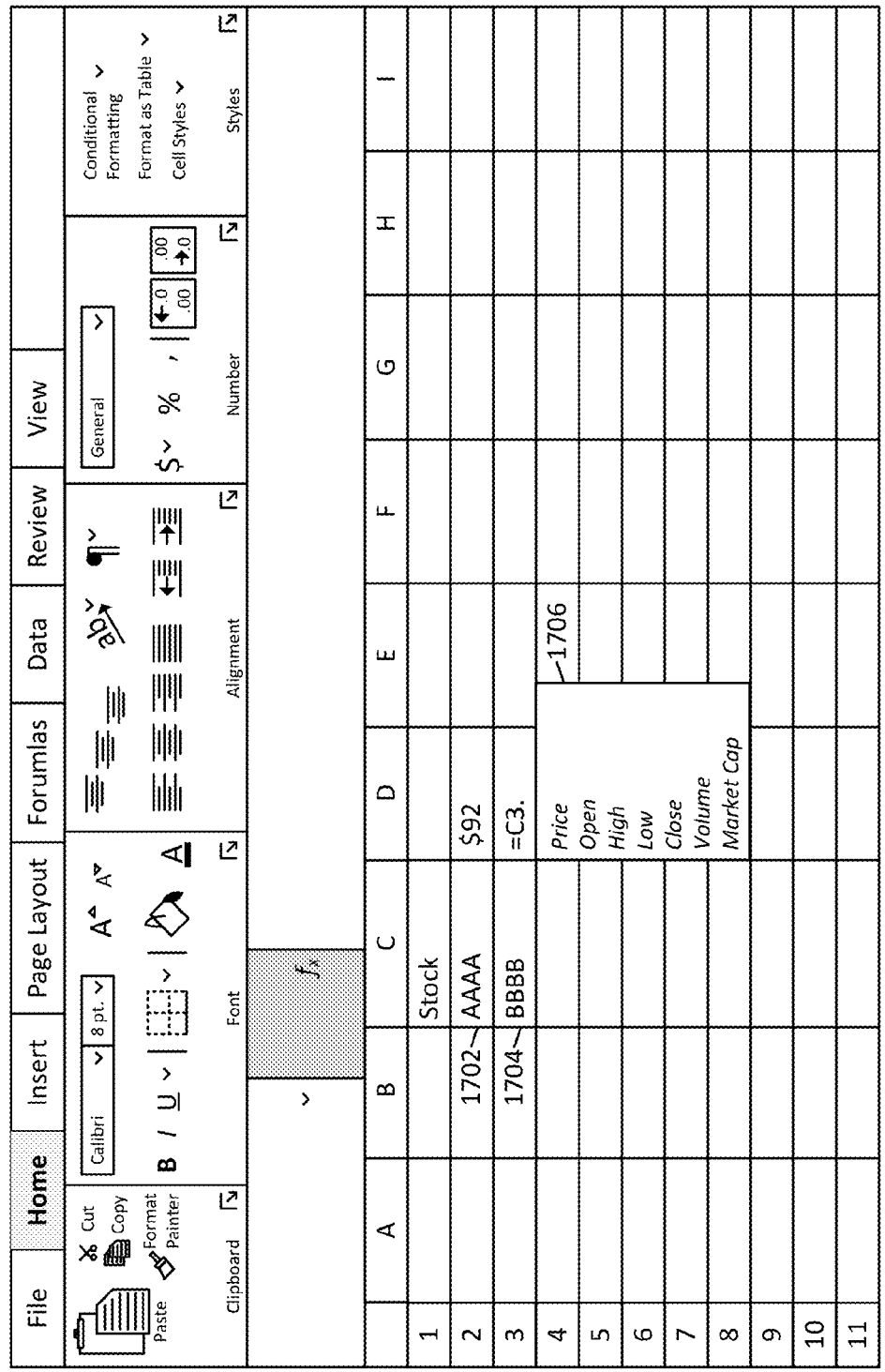
FIG. 17 illustrates treating rich data values as compound objects in a spreadsheet application.

FIG. 17 illustrates treating rich data values as compound objects in a spreadsheet application.

As described herein, a compound object is a value that stores multiple values in a single cell, wherein those multiple values are organized according to a defined structure. The compound object may store multiple values according to a known data In an example, cell A1 may store a compound object having multiple rich data values according to a data structure such as, for example, a record, table, array, vector, or matrix. Accordingly, any field in a record, array, or table contained in a compound object stored in a cell can be a value of a rich data type. In an example, a compound object storing multiple stock values (one or more of which are rich data values) can be stored in a cell, wherein those values are organized according to a table data structure. In that example, a value may be the 'high' price of the stock. That high price can be a currency rich data type and that currency rich data type can be dynamically updated via an API call to a service. In another example, a compound object storing multiple values according to an array data structure may include several values of the type "geo-location" and store information about a particular city. In this example, the "geo-location" type may be associated with further information, such as for example, the geographical coordinates of that city and the population of the city. Accordingly, in this example, the compound object may have at least three values: the name of the city, the geographical coordinates of the city, and the population of the city. Accordingly, a compound object may store multiple rich data values in a single cell. Furthermore, in this example, each rich data value stored in the compound object may be individually referenced and used in calculations. For example, a formula may be defined as, for example, "=A1.population," which returns the population stored in the compound object stored in cell A1. This example formula (e.g., "=A1.population") references the cell (e.g., "A1") in which the compound object is stored and a reference to the desired value (e.g., "population") stored in the compound object. Thus, such a formula can be used to reference a rich data value among multiple values (rich data values or non-rich data values) stored in a compound object, which is stored in a single cell. In this example, the value associated with the population attribute, for example may be a dynamic value and subject to change. Accordingly, the value may be derived from a local or online database to obtain most up-to-date population data associated with that city. Accordingly, the disclosed spreadsheet application 110 also allows users to enrich their spreadsheets by obtaining data stored locally or from an online database.

Referring back to FIG. 17, illustrated is a spreadsheet containing stock market information. In particular, cell C2 1702 stores the stock value "AAAA" and cell C3 1704 stores the stock value "BBBB." In this example, each stock stores, in a compound object, multiple values, including, the current price, high price, low price, and the past 52 weeks of closing prices. In some embodiments, each of the multiple values stored in the compound object is a rich data type and in other embodiments, one or more values are rich data types. In this example, the compound object values are arranged in a table data structure, wherein the past 52 weeks of closing prices is an array nested within the table. In this example, in order to obtain a value stored in either compound object, a particular formula referencing the cell and value may be provided. In this example, the formula "[Cell].[Reference]" will yield the referenced value. The spreadsheet application 110 can automatically update that value at predetermined time intervals. In other embodiments, the spreadsheet application 110 can receive a user instruction to update the value stored in the compound object. For example, the formula "C3.price" is a formula that yields the current price of the stock "BBBB" stored in cell C3 1704. As with the previously described example, for values that are subject to change over time, the spreadsheet application may periodically update that value, either automatically or in response to a request. In an example, the current stock price can be obtained by an API call to an online database, thereby providing the most up to date pricing information in the spreadsheet.

Furthermore, in the example illustrated in FIG. 17, a partial entry of the formula (e.g., "=C3") is provided in cell D3 1708. This partial entry of the formula (e.g., "=C3") may be used to reference a value of the multiple values stored in the compound object stored in cell C3 1704. In this example, in response to the partial entry of the formula, the spreadsheet application 110 displays a reference menu 1706 that displays each reference related to each value stored in the compound object stored in that cell. Accordingly, a user need not know each value stored in that compound object because the spreadsheet application 110 can guide the user in formula creation by providing options to the user. In other examples, a formula may reference individual parts of a rich data value. For example, if a compound object stores the value "3 meters," a formula may reference the value part (e.g., "3") or the unit part (e.g., "meters").

Although the examples illustrated herein describe a compound object that stores multiple values that are associated with an online database, it is understood that such association with an online database is not required and is merely exemplary. For example, a compound object may store values associated with a record of a person. In an example, a compound object may store two values: a person's first name and last name. Neither of those values represents volatile data that is subject to change and therefore would not be associated with an online database that updates the corresponding value.

FIGS. 18-21 and the associated descriptions provide a discussion of a variety of operating environments in which aspects of the disclosure may be practiced. However, the devices and systems illustrated and discussed with respect to FIGS. 18-21 are for purposes of example and illustration and are not limiting of a vast number of computing device configurations that may be utilized for practicing aspects of the disclosure, as described herein.

Figure 18:
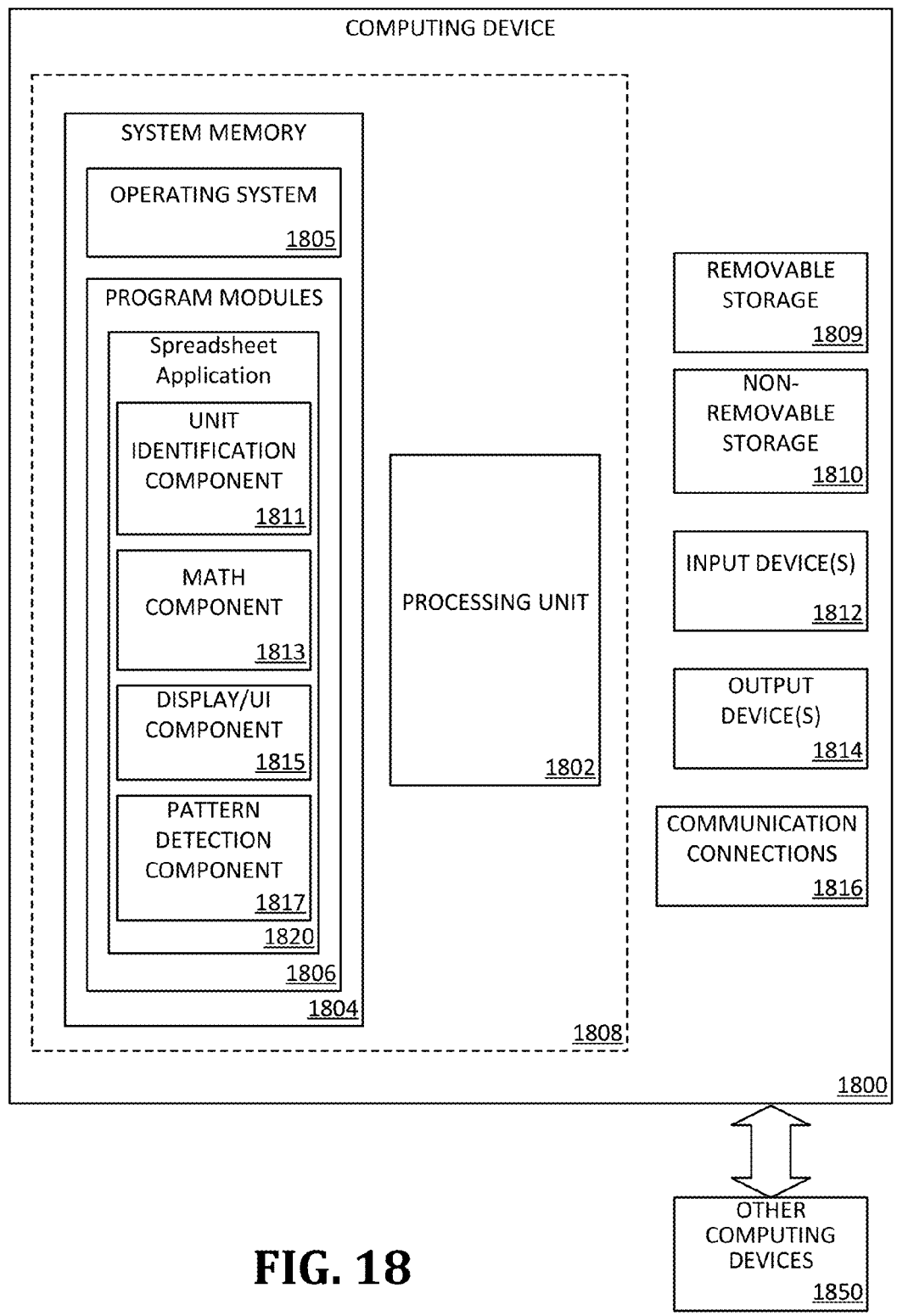
FIG. 18 is a block diagram illustrating physical components (e.g., hardware) of a computing device with which aspects of the disclosure may be practiced.

FIG. 18 is a block diagram illustrating physical components (e.g., hardware) of a computing device 1800 with which aspects of the disclosure may be practiced.

The computing device components described below may have computer executable instructions for implementing a spreadsheet application 1820 on a computing device (e.g., server computing device 108 and/or client computing device 104), including computer executable instructions for spreadsheet application 1820 that can be executed to implement the methods disclosed herein. In a basic configuration, the computing device 1800 may include at least one processing unit 1802 and a system memory 1804. Depending on the configuration and type of computing device, the system memory 1804 may comprise, but is not limited to, volatile storage (e.g., random access memory), non-volatile storage (e.g., read-only memory), flash memory, or any combination of such memories. The system memory 1804 may include an operating system 1805 and one or more program modules 1806 suitable for running spreadsheet application 1820, such as one or more components with regard to FIG. 1 and, in particular, identification component 1811 (e.g., corresponding to identification component 112), math component 1813 (e.g., corresponding to math component 114), display/UI component 1815 (e.g., corresponding to display/UI component 116), and/or pattern detection component 1817 (e.g., corresponding to pattern detection component 118).

The operating system 1805, for example, may be suitable for controlling the operation of the computing device 1800. Furthermore, embodiments of the disclosure may be practiced in conjunction with a graphics library, other operating systems, or any other application program and is not limited to any particular application or system. This basic configuration is illustrated in FIG. 18 by those components within a dashed line 1808. The computing device 1800 may have additional features or functionality. For example, the computing device 1800 may also include additional data storage devices (removable and/or non-removable) such as, for example, magnetic disks, optical disks, or tape. Such additional storage is illustrated in FIG. 18 by a removable storage device 1809 and a non-removable storage device 1810.

As stated above, a number of program modules and data files may be stored in the system memory 1804. While executing on the processing unit 1802, the program modules 1806 (e.g., spreadsheet application 1820) may perform processes including, but not limited to, the aspects, as described herein. Other program modules that may be used in accordance with aspects of the present disclosure, and in particular for implementing rich data types in a spreadsheet, may include identification component 1811, math component 1813, display/UI component 1815, pattern detection component 1817, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 18 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1800 may also have one or more input device(s) 1812 such as a keyboard, a mouse, a pen, a sound or voice input device, a touch or swipe input device, etc. The output device(s) 1814 such as a display, speakers, a printer, etc. may also be included. The aforementioned devices are examples and others may be used. The computing device 1800 may include one or more communication connections 1816 allowing communications with other computing devices 1850. Examples of suitable communication connections 1816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1804, the removable storage device 1809, and the non-removable storage device 1810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1800. Any such computer storage media may be part of the computing device 1800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 19A:
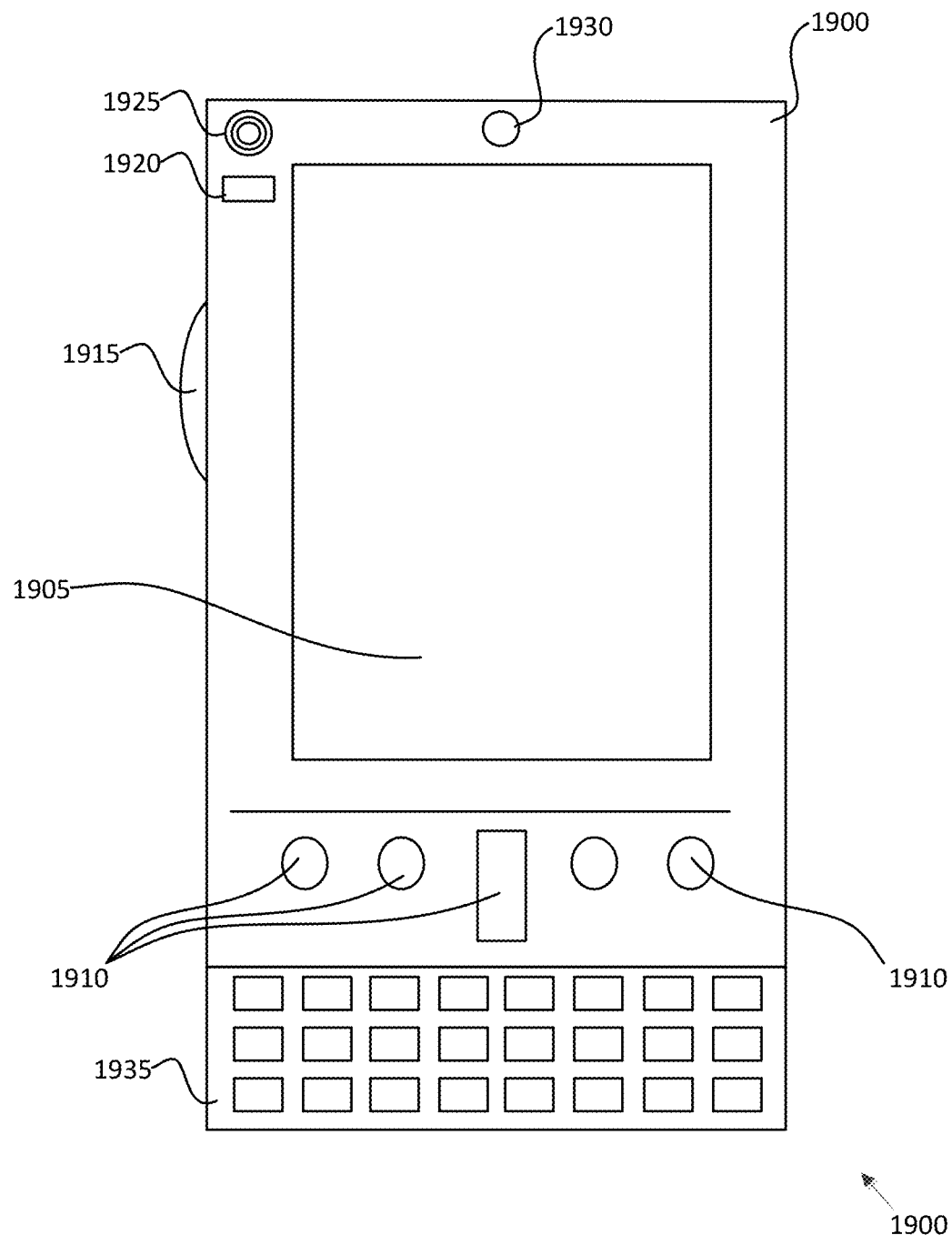
FIGS. 19A and 19B illustrate a mobile computing device, for example, a mobile telephone, a smart phone, wearable computer (such as a smart watch), a tablet computer, a laptop computer, and the like, with which embodiments of the disclosure may be practiced.
Figure 19B:
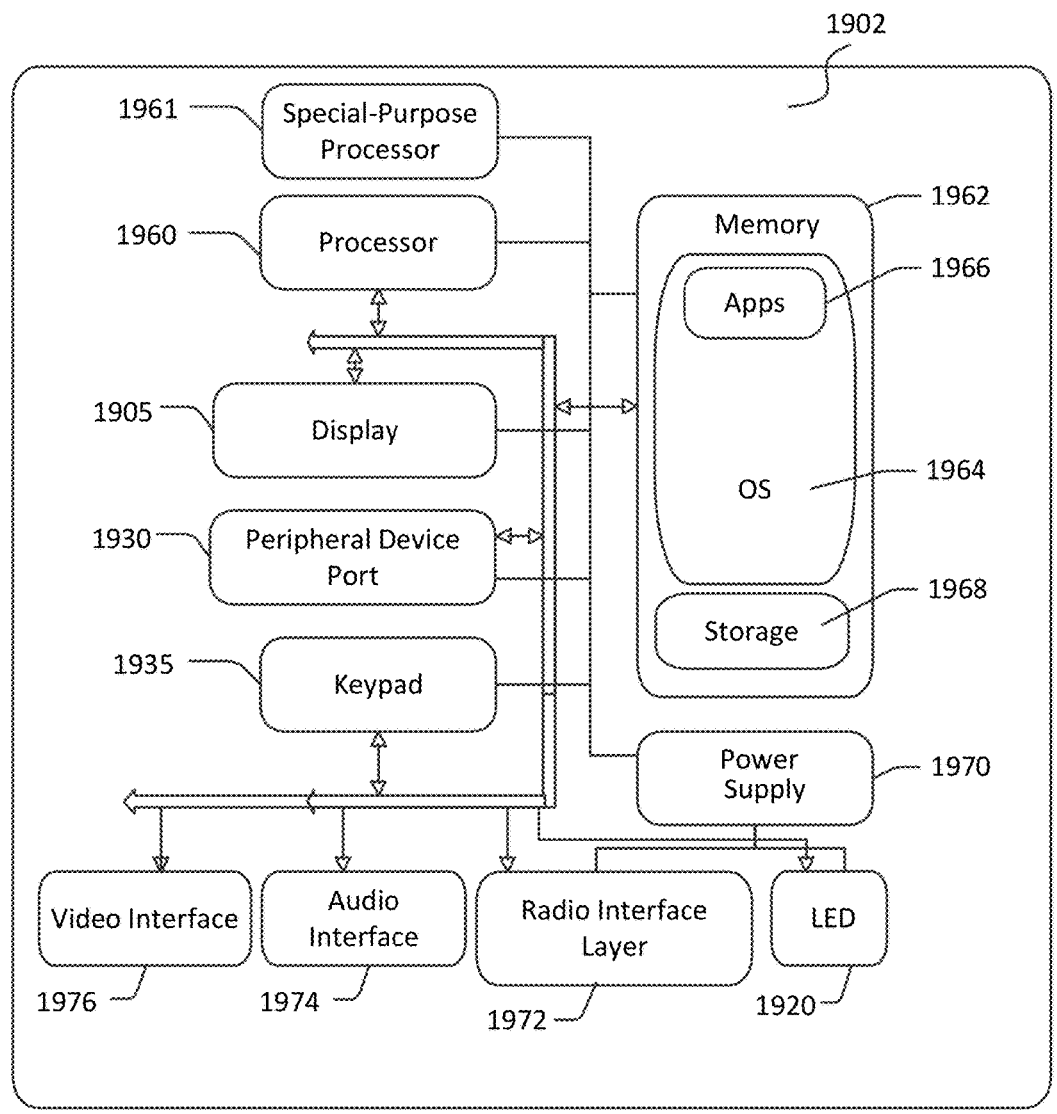

FIGS. 19A and 19B illustrate a mobile computing device 1900, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 19A, one aspect of a mobile computing device 1900 for implementing the aspects is illustrated. In a basic configuration, the mobile computing device 1900 is a handheld computer having both input elements and output elements. The mobile computing device 1900 typically includes a display 1905 and one or more input buttons 1910 that allow the user to enter information into the mobile computing device 1900. The display 1905 of the mobile computing device 1900 may also function as an input device (e.g., a touch screen display). If included, an optional side input element 1915 allows further user input. The side input element 1915 may be a rotary switch, a button, or any other type of manual input element. In alternative aspects, mobile computing device 1900 may incorporate more or less input elements. For example, the display 1905 may not be a touch screen in some embodiments. In yet another alternative embodiment, the mobile computing device 1900 is a portable phone system, such as a cellular phone. The mobile computing device 1900 may also include an optional keypad 1935. Optional keypad 1935 may be a physical keypad or a "soft" keypad generated on the touch screen display. In various embodiments, the output elements include the display 1905 for showing a graphical user interface (GUI), a visual indicator 1920 (e.g., a light emitting diode), and/or an audio transducer 1925 (e.g., a speaker). In some aspects, the mobile computing device 1900 incorporates a vibration transducer for providing the user with tactile feedback. In yet another aspect, the mobile computing device 1900 incorporates input and/or output ports, such as an audio input (e.g., a microphone jack), an audio output (e.g., a headphone jack), and a video output (e.g., a HDMI port) for sending signals to or receiving signals from an external device.

FIG. 19B is a block diagram illustrating the architecture of one aspect of a mobile computing device. That is, the mobile computing device 1900 can incorporate a system (e.g., an architecture) 1902 to implement some aspects. In one embodiment, the system 1902 is implemented as a "smart phone" capable of running one or more applications (e.g., browser, e-mail, calendaring, contact managers, messaging clients, games, and media clients/players). In some aspects, the system 1902 is integrated as a computing device, such as an integrated personal digital assistant (PDA) and wireless phone.

One or more application programs 1966 may be loaded into the memory 1962 and run on or in association with the operating system 1964. Examples of the application programs include phone dialer programs, e-mail programs, personal information management (PIM) programs, word processing programs, spreadsheet programs, Internet browser programs, messaging programs, and so forth. The system 1902 also includes a non-volatile storage area 1968 within the memory 1962. The non-volatile storage area 1968 may be used to store persistent information that should not be lost if the system 1902 is powered down. The application programs 1966 may use and store information in the non-volatile storage area 1968, such as email or other messages used by an email application, and the like. A synchronization application (not shown) also resides on the system 1902 and is programmed to interact with a corresponding synchronization application resident on a host computer to keep the information stored in the non-volatile storage area 1968 synchronized with corresponding information stored at the host computer. As should be appreciated, other applications may be loaded into the memory 1962 and run on the mobile computing device 1900, including the instructions for associating one or more images with one or more cells of a spreadsheet as described herein (e.g., identification component, math component, display/UI component, pattern detection component, etc.).

The system 1902 has a power supply 1970, which may be implemented as one or more batteries. The power supply 1970 may further include an external power source, such as an AC adapter or a powered docking cradle that supplements or recharges the batteries. The system 1902 may also include a radio interface layer 1972 that performs the function of transmitting and receiving radio frequency communications. The radio interface layer 1972 facilitates wireless connectivity between the system 1902 and the "outside world," via a communications carrier or service provider. Transmissions to and from the radio interface layer 1972 are conducted under control of the operating system 1964. In other words, communications received by the radio interface layer 1972 may be disseminated to the application programs 1966 via the operating system 1964, and vice versa.

The visual indicator 1920 may be used to provide visual notifications, and/or an audio interface 1974 may be used for producing audible notifications via an audio transducer 1925 (e.g., audio transducer 1925 illustrated in FIG. 19A). In the illustrated embodiment, the visual indicator 1920 is a light emitting diode (LED) and the audio transducer 1925 may be a speaker. These devices may be directly coupled to the power supply 1970 so that when activated, they remain on for a duration dictated by the notification mechanism even though the processor 1960 and other components might shut down for conserving battery power. The LED may be programmed to remain on indefinitely until the user takes action to indicate the powered-on status of the device. The audio interface 1974 is used to provide audible signals to and receive audible signals from the user. For example, in addition to being coupled to the audio transducer 1925, the audio interface 1974 may also be coupled to a microphone to receive audible input, such as to facilitate a telephone conversation. In accordance with embodiments of the present disclosure, the microphone may also serve as an audio sensor to facilitate control of notifications, as will be described below. The system 1902 may further include a video interface 1976 that enables an operation of peripheral device 1930 (e.g., on-board camera) to record still images, video stream, and the like.

A mobile computing device 1900 implementing the system 1902 may have additional features or functionality. For example, the mobile computing device 1900 may also include additional data storage devices (removable and/or non-removable) such as, magnetic disks, optical disks, or tape. Such additional storage is illustrated in FIG. 19B by the non-volatile storage area 1968.

Data/information generated or captured by the mobile computing device 1900 and stored via the system 1902 may be stored locally on the mobile computing device 1900, as described above, or the data may be stored on any number of storage media that may be accessed by the device via the radio interface layer 1972 or via a wired connection between the mobile computing device 1900 and a separate computing device associated with the mobile computing device 1900, for example, a server computer in a distributed computing network, such as the Internet. As should be appreciated such data/information may be accessed via the mobile computing device 1900 via the radio interface layer 1972 or via a distributed computing network. Similarly, such data/information may be readily transferred between computing devices for storage and use according to well-known data/information transfer and storage means, including electronic mail and collaborative data/information sharing systems.

As should be appreciated, FIGS. 19A and 19B are described for purposes of illustrating the present methods and systems and is not intended to limit the disclosure to a particular sequence of steps or a particular combination of hardware or software components.

Figure 20:
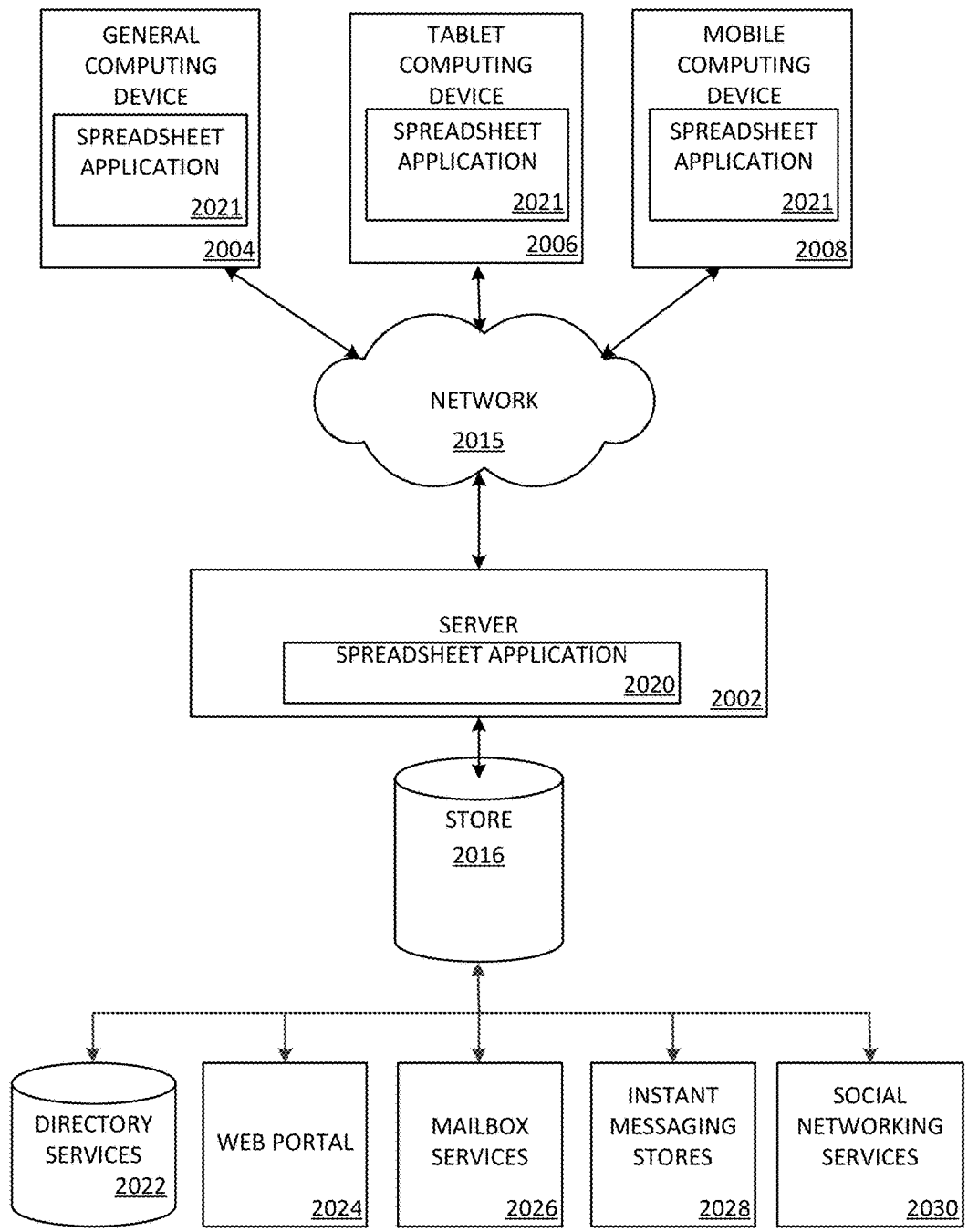
FIG. 20 illustrates one aspect of the architecture of a system for processing data received at a computing system from a remote source.

FIG. 20 illustrates one aspect of the architecture of a system for processing data received at a computing system from a remote source, such as a general computing device 2004 (e.g., personal computer), tablet computing device 2006, or mobile computing device 2008, as described above. Content displayed at server device 2002 may be stored in different communication channels or other storage types. For example, various documents may be stored using a directory service 2022, a web portal 2024, a mailbox service 2026, an instant messaging store 2028, or a social networking service 2030. The spreadsheet application 2021 may be employed by a client that communicates with server device 2002, and/or the spreadsheet application 2020 may be employed by server device 2002. The server device 2002 may provide data to and from a client computing device such as a general computing device 2004, a tablet computing device 2006 and/or a mobile computing device 2008 (e.g., a smart phone) through a network 2015. By way of example, the computer system described above with respect to FIGS. 1-9 may be embodied in a general computing device 2004 (e.g., personal computer), a tablet computing device 2006 and/or a mobile computing device 2008 (e.g., a smart phone). Any of these embodiments of the computing devices may obtain content from the store 2016, in addition to receiving graphical data useable to either be pre-processed at a graphic-originating system or post-processed at a receiving computing system.

As should be appreciated, FIG. 20 is described for purposes of illustrating the present methods and systems and is not intended to limit the disclosure to a particular sequence of steps or a particular combination of hardware or software components.

Figure 21:
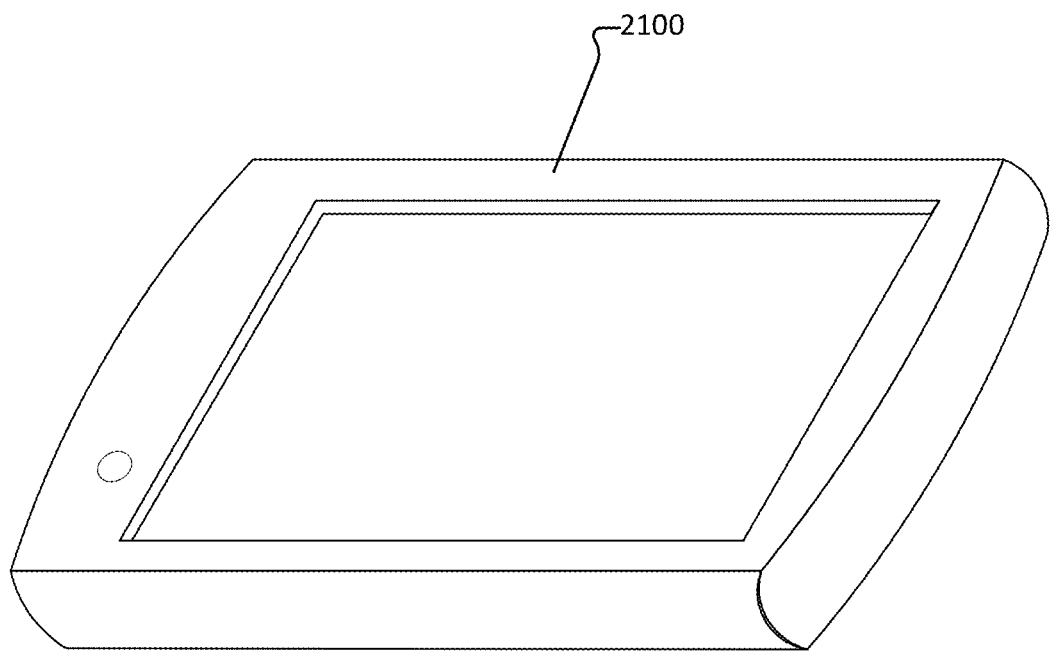
FIG. 21 illustrates an exemplary tablet computing device may execute one or more aspects disclosed herein.

FIG. 21 illustrates an exemplary tablet computing device 2100 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 21 is described for purposes of illustrating the present methods and systems and is not intended to limit the disclosure to a particular sequence of steps or a particular combination of hardware or software components.

Aspects of the present disclosure, for example, are described above with reference to block diagrams or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method for populating parameters of a formula of a spreadsheet with consistent values, comprising:
    receiving a formula, wherein the formula causes an operation to be performed on a first parameter and a second parameter;
    determining that the first parameter is associated with a first data type having a first context, wherein the first context comprises information about a category associated with the first data type;
    determining that the second parameter is associated with a second data type having a second context, wherein the second context comprises information about a category associated with the second data type;
    based on the first context, determining that a first cell contains a first data value of the first data type;
    displaying a visual indicator on the first cell indicating that the first data value is valid for populating the first parameter of the formula;

based on the second context, determining that a second cell contains a second data value of the second data type;
displaying a visual indicator on the second cell indicating that the second data value is valid for populating the second parameter of the formula.

2. The method of claim 1, further comprising determining whether a relationship exists between the first data type and the second data type.

3. The method of claim 2, further comprising:
when it is determined that the relationship does not exist providing a notification that the operation cannot be performed.

4. The method of claim 1, further comprising:
receiving a selection to convert one of the first data value and the second data value into a third data value.

5. The method of claim 1, further comprising:
automatically converting the first data value into a third data value in response to determining that the operation cannot be performed, wherein the third data value is associated with the second data type.

6. The method of claim 1, further comprising:
automatically converting the second data value into a third data value in response to determining that the operation cannot be performed, wherein the third data value is associated with the first data type.

7. The method of claim 1, further comprising:
converting one of the first data value and the second data value into a third data value comprising:
identifying a conversion factor between the first data unit and the second data unit; and
applying the conversion factor to one of the first data value and the second data value.

8. A system comprising:
at least one processing unit; and
at least one memory storing computer-executable instructions that, when executed by the at least one processing unit, cause the system to:
receive a formula, wherein the formula causes an operation to be performed on a first parameter and a second parameter;
determine that the first parameter is associated with a first data type having a first context, wherein the first context comprises information about a category associated with the first data type;
determine that the second parameter is associated with a second data type having a second context, wherein the second context comprises information about a category associated with the second data type;
based on the first context, determine that a first cell contains a first data value of the first data type;
display a visual indicator on the first cell indicating that the first data value is valid for populating the first parameter of the formula;
based on the second context, determining that a second cell contains a second data value of the second data type; and
display a visual indicator on the second cell indicating that the second data value is valid for populating the second parameter of the formula.

9. The system of claim 8, when executed by the at least one processing unit, further causing the system to:
determine whether a relationship exists between the first data type and the second data type.

10. The system of claim 9, when it is determined that the relationship does not exist, the computer-executable instructions further causing the system to:
provide a notification that the operation cannot be performed.

11. The system of claim 8, the computer-executable instructions further causing the system to:
receive a selection to convert one of the first data value and the second data value into a third data value.

12. The system of claim 8, the computer-executable instructions further causing the system to:
automatically convert the first data value into a third data value in response to determining that the operation cannot be performed, wherein the third data value is associated with the second data type.

13. The system of claim 8, the computer-executable instructions further causing the system to:
automatically convert the second data value into a third data value in response to determining that the operation cannot be performed, wherein the third data value is associated with the first data type.

14. The system of claim 8, the computer-executable instructions further causing the system to:
automatically convert one of the first data value and the second data value into a third data value comprising:
identifying a conversion factor between the first data unit and the second data unit; and
applying the conversion factor to one of the first data value and the second data value.

15. A computer storage media device comprising computer-executable instructions that, when executed by at least one processing unit, cause the processing unit to:
receive a formula, wherein the formula causes an operation to be performed on a first parameter and a second parameter;
determine that the first parameter is associated with a first data having a first context, wherein the first context comprises information about a category associated with the first data type;
determine that the second parameter is associated with a second data type having a second context, wherein the second context comprises information about a category associated with the second data type;
based on the first context, determine that a first cell contains a first data value of the first data type;
display a visual indicatory on the first cell indicating that the first data value is valid for populating the first parameter of the formula;
based on the second context, determine that a second cell contains a second data value of the second data type; and
display a visual indicator on the second cell indicating that the second data value is valid for populating the second parameter of the formula.

16. The computer storage media device of claim 15, the computer-executable instructions further causing the processing unit to:
determine whether a relationship exists between the first data type and the second data type.

17. The computer storage media device of claim 16, when it is determined that the relationship does not exist, the computer-executable instructions further causing the processing unit to:
provide a notification that the operation cannot be performed.

18. The computer storage media device of claim 15, the computer-executable instructions further causing the processing unit to:
receive a selection to convert one of the first data value and the second data value into a third data value.

19. The computer storage media device of claim 15, the computer-executable instructions further causing the processing unit to:
- automatically convert the first data value into a third data value in response to determining that the operation cannot be performed, wherein the third data value is associated with the second data type.

20. The computer storage media device of claim 15, the computer-executable instructions further causing the processing unit to:
- automatically convert the second data value into a third data value in response to determining that the operation cannot be performed, wherein the third data value is associated with the first data type.

21. The computer storage media device of claim 15, the computer-executable instructions further causing the processing unit to:
- automatically convert one of the first data value and the second data value into a third data value comprising:
    - identifying a conversion factor between the first data unit and the second data unit; and
    - applying the conversion factor to one of the first data value and the second data value.

* * * * *